US012725028B2

(12) United States Patent
Zhuang et al.

(10) Patent No.: US 12,725,028 B2
(45) Date of Patent: Sep. 1, 2026

(54) NEURAL NETWORK OBTAINING METHOD AND RELATED DEVICE

(71) Applicants: Huawei Technologies Co., Ltd., Shenzhen (CN); Tsinghua University, Beijing (CN)

(72) Inventors: Yuzheng Zhuang, Shenzhen (CN); Siyuan Li, Beijing (CN); Rui Wang, Beijing (CN); Wulong Liu, Beijing (CN); Chongjie Zhang, Beijing (CN)

(73) Assignees: Huawei Technologies Co., Ltd., Shenzhen (CN); Tsinghua University, Beijing (CN)

( * ) Notice: Subject to any disclaimer, the term of this patent is extended or adjusted under 35 U.S.C. 154(b) by 1297 days.

(21) Appl. No.: 17/181,810

(22) Filed: Feb. 22, 2021

(65) Prior Publication Data

US 2021/0174209 A1 Jun. 10, 2021

Related U.S. Application Data

(63) Continuation of application No. PCT/CN2020/092907, filed on May 28, 2020.

(30) Foreign Application Priority Data

Sep. 29, 2019 (CN) ........................ 201910935456.X

(51) Int. Cl.

| | |
|---|---|
| ***G06N 3/08*** | (2023.01) |
| ***G06F 16/23*** | (2019.01) |
| ***G06N 3/045*** | (2023.01) |

(52) U.S. Cl.

CPC .......... *G06N 3/08* (2013.01); *G06F 16/2379* (2019.01); *G06N 3/045* (2023.01)

(58) Field of Classification Search

CPC ....... G06N 3/08; G06N 3/045; G06F 16/2379

See application file for complete search history.

(56) References Cited

U.S. PATENT DOCUMENTS

| | | | | |
|---|---|---|---|---|
| 8,386,078 | B1 * | 2/2013 | Hickman | G05D 1/0246 318/568.1 |
| 9,486,918 | B1 * | 11/2016 | Earl | B25J 9/163 |

(Continued)

FOREIGN PATENT DOCUMENTS

| | | | |
|---|---|---|---|
| CN | 109726676 | A | 5/2019 |
| CN | 109733415 | A | 5/2019 |
| WO | 2019001649 | A1 | 1/2019 |

OTHER PUBLICATIONS

Tuomas Haarnoja, Vitchyr Pong, Kristian Hartikainen, Aurick Zhou, Murtaza Dalal, &Sergey Levine. Soft Actor Critic-Deep Reinforcement Learning with Real-World Robots. Berkeley Artificial Intelligence Research. Dec. 14, 2018. (Year: 2018).*

(Continued)

*Primary Examiner* — Jeremy L Stanley

(74) *Attorney, Agent, or Firm* — Leydig, Voit & Mayer, Ltd.

(57) ABSTRACT

A neural network obtaining method and a related device are provided. The method may be applied to a scenario in which reinforcement learning is performed on a neural network in the artificial intelligence field. After obtaining a first task, a server obtains a first success rate of completing the first task by using a first neural network. When the first success rate is less than a preset threshold, the server generates a second neural network and a new skill. The server trains, based on a simulated environment corresponding to the first task, the second neural network by using a reinforcement learning algorithm, until a second success rate of completing the first task by using the second neural network is greater than or (Continued)

equal to the preset threshold. The server stores the trained second neural network and the new skill.

18 Claims, 21 Drawing Sheets

(56) References Cited

U.S. PATENT DOCUMENTS

| | | | | |
|---|---|---|---|---|
| 9,679,258 | B2 * | 6/2017 | Mnih | A63F 13/67 |
| 9,811,074 | B1 * | 11/2017 | Aichele | B25J 9/1656 |
| 10,131,053 | B1 * | 11/2018 | Sampedro | B25J 9/1666 |
| 10,999,436 | B1 * | 5/2021 | Myers | G10L 25/90 |
| 11,031,013 | B1 * | 6/2021 | Myers | G10L 15/02 |
| 11,494,632 | B1 * | 11/2022 | Bai | G06N 3/09 |
| 11,983,645 | B2 * | 5/2024 | Volkov | G06N 7/01 |
| 2007/0093940 | A1 * | 4/2007 | Ng-Thow-Hing | B62D 57/028 700/245 |
| 2013/0066817 | A1 * | 3/2013 | Kawamoto | G06N 20/00 706/47 |
| 2013/0151442 | A1 * | 6/2013 | Suh | G06N 3/008 706/12 |
| 2016/0059412 | A1 * | 3/2016 | Oleynik | B25J 19/02 700/250 |
| 2017/0140273 | A1 * | 5/2017 | Sagher | G06N 3/045 |
| 2017/0323212 | A1 * | 11/2017 | Volkov | G06N 3/006 |
| 2017/0348854 | A1 * | 12/2017 | Oleynik | A47J 47/02 |
| 2018/0232639 | A1 * | 8/2018 | Lin | G06N 3/063 |
| 2018/0314562 | A1 * | 11/2018 | Kurian | G06Q 10/063112 |
| 2019/0126472 | A1 * | 5/2019 | Tunyasuvunakool | B25J 9/1697 |
| 2019/0228495 | A1 * | 7/2019 | Tremblay | B25J 9/1697 |
| 2019/0232488 | A1 * | 8/2019 | Levine | G05B 13/027 |
| 2019/0236482 | A1 * | 8/2019 | Desjardins | G06N 3/092 |
| 2019/0278282 | A1 * | 9/2019 | Palanisamy | G06N 5/01 |
| 2019/0291277 | A1 * | 9/2019 | Oleynik | B25J 9/1669 |
| 2019/0314984 | A1 * | 10/2019 | Gonzalez Aguirre | B25J 9/1664 |
| 2019/0317455 | A1 * | 10/2019 | Leon | G06N 3/042 |
| 2019/0337150 | A1 * | 11/2019 | Parikh | B25J 9/163 |
| 2019/0354813 | A1 * | 11/2019 | Riedmiller | G06F 18/2185 |
| 2019/0361456 | A1 * | 11/2019 | Zeng | G01C 21/20 |
| 2019/0370637 | A1 * | 12/2019 | Dunning | G06N 3/044 |
| 2019/0385022 | A1 * | 12/2019 | Jang | B25J 9/1697 |
| 2020/0016756 | A1 * | 1/2020 | Rus | B25J 9/161 |
| 2020/0086480 | A1 * | 3/2020 | Haddadin | B25J 9/1633 |
| 2020/0086483 | A1 * | 3/2020 | Li | B25J 9/1653 |
| 2020/0125586 | A1 * | 4/2020 | Rezaeian | G06F 3/048 |
| 2020/0167606 | A1 * | 5/2020 | Wohlhart | B25J 9/1697 |
| 2020/0175371 | A1 * | 6/2020 | Kursun | G06N 3/086 |
| 2020/0234178 | A1 * | 7/2020 | Florez Choque | G06N 3/006 |
| 2020/0265307 | A1 * | 8/2020 | Suh | G06F 16/2228 |
| 2020/0279134 | A1 * | 9/2020 | Bousmalis | G06N 3/006 |
| 2020/0280616 | A1 * | 9/2020 | Sim | H04L 67/60 |
| 2020/0282223 | A1 * | 9/2020 | Schwemmer | G06N 3/045 |
| 2020/0293883 | A1 * | 9/2020 | Budden | G06N 3/045 |
| 2020/0334531 | A1 * | 10/2020 | Swett | G06F 9/4881 |
| 2020/0344185 | A1 * | 10/2020 | Singaraju | G06N 3/008 |
| 2020/0398427 | A1 * | 12/2020 | Kupcsik | B25J 9/163 |
| 2021/0031364 | A1 * | 2/2021 | Groz | B25J 9/163 |
| 2021/0072734 | A1 * | 3/2021 | Hirota | G06F 18/217 |
| 2021/0078167 | A1 * | 3/2021 | Khansari Zadeh | G06T 7/90 |
| 2021/0086353 | A1 * | 3/2021 | Shah | B25J 9/161 |
| 2021/0086364 | A1 * | 3/2021 | Handa | G06T 1/0014 |
| 2021/0093968 | A1 * | 4/2021 | McCoy | A63F 13/5258 |
| 2021/0107144 | A1 * | 4/2021 | Takahashi | G06N 20/00 |
| 2021/0157858 | A1 * | 5/2021 | Stevens | G06F 40/237 |
| 2021/0182600 | A1 * | 6/2021 | Yu | G06N 5/022 |
| 2021/0334628 | A1 * | 10/2021 | Carbune | G06F 9/4843 |
| 2021/0357731 | A1 * | 11/2021 | Van de Wiele | G06N 3/084 |
| 2022/0032458 | A1 * | 2/2022 | Chu | B25J 11/0005 |
| 2022/0067115 | A1 * | 3/2022 | Zheng | G06N 5/04 |
| 2022/0105624 | A1 * | 4/2022 | Kalakrishnan | B25J 9/163 |
| 2022/0155752 | A1 * | 5/2022 | Søndergaard | G06F 30/00 |
| 2022/0331962 | A1 * | 10/2022 | Pirk | G06F 18/24143 |
| 2023/0031545 | A1 * | 2/2023 | Oleynik | G05B 19/42 |

OTHER PUBLICATIONS

Chen et al., "Incremental Reinforcement Learning—a New Continuous Reinforcement Learning Frame Based on Stochastic Differential Equation methods," IEEE Transactions on Cybernetics, arXiv:1908.02974v1 [cs.LG], total 13 pages (Aug. 8, 2019).

Florensa et al., "Stochastic Neural Networks for Hierarchical Reinforcement Learning," International Conference on Learning Representations 201, total 17 pages (Apr. 10, 2017).

Nachum et al., "Data-Efficient Hierarchical Reinforcement Learning," arXiv:1805.08296v4 [cs.LG], total 17 pages, (Oct. 5, 2018).

Eysenbach et al., "Diversity Is All You Need: Learning Skills Without a Reward Function," arXiv:1802.06070v6 [cs.AI], total 22 pages (Oct. 9, 2018).

Haarnoja et al., "Reinforcement Learning with Deep Energy-Based Policies," arXiv:1702.08165v2 [cs.LG] 21, total 16 pages (Jul. 21, 2017).

Hess et al.,"Learning and Transfer of Modulated Locomotor Controllers," arXiv:1610.05182v1 [cs.RO], total 13 pages (Oct. 17, 2016).

Kulkarni et al., "Hierarchical Deep Reinforcement Learning: Integrating Temporal Abstraction and Intrinsic Motivation," arXiv:1604.06057v2 [cs.LG], total 14 pages (May 31, 2016).

Levy et al., "Hierarchical Actor-Critic," arXiv:1712.00948v3 [cs.AI], total 10 pages (Feb. 28, 2018).

Andrychowicz et al., "Hindsight Experience Replay," arXiv:1707.01495v3 [cs.LG], total 15 pages (Feb. 23, 2018).

Berseth et al., "Progressive Reinforcement Learning With Distillation for Multi-Skilled Motion Control," arXiv:1802.04765v1 [cs.LG], total 15 pages (Feb. 13, 2018).

* cited by examiner

Second communications device 260

First communications device 250

200

Server 210

Intelligent device 230

Data obtaining device 220

Database 240

1600

Neural network obtaining apparatus

Obtaining unit 1601 — Training unit 1602 — Storage unit 1603

NEURAL NETWORK OBTAINING METHOD AND RELATED DEVICE

CROSS-REFERENCE TO RELATED APPLICATIONS

This application is a continuation of International Application No. PCT/CN2020/092907, filed on May 28, 2020, which claims priority to Chinese Patent Application No. 201910935456.X, filed on Sep. 29, 2019. The disclosures of the aforementioned applications are hereby incorporated by reference in their entireties.

TECHNICAL FIELD

This application relates to the artificial intelligence field, and in particular, to a neural network obtaining method and a related device.

BACKGROUND

Artificial intelligence (AI) is a theory, a method, a technology, or an application system that simulates, extends, and expands human intelligence by using a digital computer or a machine controlled by a digital computer, to perceive an environment, obtain knowledge, and achieve an optimal result by using the knowledge. In other words, the artificial intelligence is a branch of computer science, and is intended to understand the essence of intelligence and produce a new intelligent machine that can react in a manner similar to the human intelligence. The artificial intelligence is to study design principles and implementation methods of various intelligent machines, so that the machines have perceiving, reasoning, and decision-making functions. Researches in the artificial intelligence field include a robot, natural language processing, computer vision, decision-making and reasoning, human-computer interaction, recommendation and search, an AI basic theory, and the like.

Reinforcement learning (RL) is an important machine learning method in the artificial intelligence field, and is widely applied to fields such as self-driving, an intelligent control robot, and analysis and prediction. Specifically, a main problem to be resolved through reinforcement learning is how an intelligent device directly interacts with an environment to learn a skill to execute a specific task, so as to maximize a long-term reward for the specific task. In a current skill learning method, a series of large-span skills are obtained through training by using a random neural network and an information theory regularizer, so as to obtain a skill library including many skills. After a specific task is determined, a corresponding neural network is trained for the specific task. The neural network is used to select a proper skill from the foregoing skill library to execute the specific task, so as to maximize a long-term reward for the task.

However, the current skill learning method relies entirely on the skill library including a series of large-span skills to execute the specific task. In this case, skills in the skill library obtained in a pre-training phase need to be as comprehensive as possible. This imposes an extremely high requirement on a training environment in the pre-training phase. In addition, even if the skill library includes as many skills as possible, there is a possibility that some specific tasks cannot be completed. Consequently, the current skill learning method has some limitations.

SUMMARY

Embodiments of this application provide a neural network obtaining method and a related device, to incrementally learn skills to expand a skill library, thereby reducing a requirement for a training environment in a pre-training phase, achieving expandability of the skills in the skill library, and overcoming a limitation of a current skill learning method.

To resolve the foregoing technical problems, the embodiments of this application provide the following technical solutions.

According to a first aspect, an embodiment of this application provides a neural network obtaining method. The neural network obtaining method may be applied to a scenario in which reinforcement learning is performed on a neural network in the artificial intelligence field. A server obtains a first task. Specifically, the server may obtain a mature neural network from at least one neural network that is pre-obtained through training, and use the mature first neural network as a first neural network. The first neural network is a neural network obtained by performing training based on a simulated environment corresponding to a second task, and semantic information of the second task is similar to semantic information of the first task. Alternatively, the server initializes one first neural network after determining the first task. The first neural network is used to select, from a skill library, a skill used to complete the first task. A skill in the skill library may be a neural network or an operation rule. That semantic information of the second task is similar to semantic information of the first task may be as follows: The semantic information of the first task and the semantic information of the second task are obtained by using a neural network, and are compared to determine that the semantic information of the first task is similar to the semantic information of the second task; or constraints obtained by decomposing the first task and the second task are similar; or running environments of the first task and the second task are similar. Then, the server obtains a first success rate of completing the first task by using the first neural network. When the first success rate is less than a preset threshold, the server obtains a second neural network and a new skill, and adds the new skill to the skill library to obtain an updated skill library. The second neural network is used to select, from the updated skill library, a skill used to complete the first task. The new skill may be specifically a neural network. Further, the server trains, based on a simulated environment corresponding to the first task, the second neural network and the new skill by using reinforcement learning algorithms, until a second success rate of completing the first task by using the second neural network is greater than or equal to the preset threshold. Specifically, after initializing the second neural network and the new skill, the server trains, based on the simulated environment corresponding to the first task, the second neural network and the new skill by using the reinforcement learning algorithms, until both a loss function of the second neural network and a loss function of the new skill meet a convergence condition. Then, the server obtains the second success rate of completing the first task by using the second neural network; determines whether the second success rate is greater than or equal to the preset threshold; and if the second success rate is greater than or equal to the preset threshold, stores the trained second neural network and the updated skill library; or if the second success rate is less than the preset threshold, repeatedly performs operations of: generating a new skill and a new second neural network, adding the new skill to the updated skill library, to obtain a new updated skill library, training the new second neural network and the new skill, until both a loss function of the new second neural network and a loss function of the new skill meet the convergence condition, and determining whether a second success rate is greater than or equal to the preset threshold, until the second success rate of executing the second task by using the second neural network is greater than or equal to the preset threshold, and stores the final trained second neural network and the updated skill library.

In this implementation, after the first task is obtained, the first success rate of completing the first task by using the first neural network may be obtained. When the first success rate is less than the preset threshold, the second neural network and the new skill may be obtained; the new skill is added to the skill library to obtain the updated skill library; further, the second neural network is trained based on the simulated environment corresponding to the first task, until the second success rate of completing the first task by using the second neural network is greater than or equal to the preset threshold; and then the second neural network and the updated skill library are stored. In a process of learning how to complete the task, new skills may be incrementally learned to expand the skill library; therefore, dependence on a skill library obtained in a pre-training phase is greatly reduced, that is, requirements for a training environment in the pre-training phase are reduced. In addition, incrementally learning the new skills achieves expandability of the skills in the skill library, so that a capability of completing a new task can be obtained, and a limitation of the current skill learning method is overcome.

In a possible implementation of the first aspect, that the server trains the second neural network may include: The server selects, from the updated skill library by using the second neural network, the skill used to complete the first task. Specifically, the server may pre-configure a sequence number for each skill in the updated skill library, and the second neural network may output a sequence number, so that a corresponding skill selected by using the second neural network can be found based on the sequence number output by the second neural network. Then, the server may generate a control instruction by using the skill selected by using the second neural network, and further execute, by using the intelligent device, the control instruction corresponding to the skill selected by using the second neural network. In a process in which the intelligent device executes the control instruction corresponding to the skill selected by using the second neural network, the server performs, once at an interval of preset duration, an operation of obtaining an execution status of the skill selected by using the second neural network, until the execution status of the skill selected by using the second neural network is “end”. The server further obtains data for executing the first task by the intelligent device, that is, data generated in a process in which the server executes the control instruction corresponding to the skill selected by using the second neural network. The data may include any one or more pieces of information of: an operation path, an operation speed, or an operation destination of the intelligent device. After executing once the skill selected by using the second neural network, the server updates parameters of the second neural network based on the data for executing the first task by the intelligent device. In this implementation, a specific implementation in which the server trains the second neural network is provided, thereby improving implementability of this solution. In addition, the server determines, by obtaining, once at an interval of preset duration, an execution status of the skill selected by using the second neural network, whether execution of the skill selected by using the second neural network ends. In this way, the server can iteratively update a policy of the new skill and a parameter of the new skill in a timely manner based on operation behavior information of the intelligent device, and this helps improve accuracy of a training process.

In a possible implementation of the first aspect, after inputting environment status information into the second neural network to obtain the skill selected by using the second neural network, the server may determine whether the skill selected by using the second neural network is a new skill. When the skill selected by using the second neural network is a new skill, the server updates a parameter of the new skill based on the data for executing the first task by the intelligent device; or when the skill selected by using the second neural network is not a new skill, the server does not update a parameter of the skill selected by using the second neural network. In this implementation, a comparatively large degree of distinction can be maintained between different skills in the updated skill library, thereby reducing storage redundancy of the updated skill library. In addition, if a parameter of a skill that is not newly generated is also updated, an evolution direction of a skill in the updated skill library is out of control. Updating only the newly generated skill helps guide the new skill to learn a skill requirement gap between the first task and the second task.

In a possible implementation of the first aspect, that the server updates the parameters of the second neural network by using a reinforcement learning algorithm includes: The server updates the parameters of the second neural network by using a first reinforcement learning algorithm. Specifically, the server obtains, based on the data for executing the first task by the intelligent device, a feedback value obtained in a process in which the intelligent device executes once the control instruction corresponding to the skill selected by using the second neural network; determines a dominant function and a loss function of the second neural network based on the first reinforcement learning algorithm; and substitutes the feedback value into the dominant function of the second neural network, to obtain a function value of the loss function of the second neural network based on a function value of the dominant function of the second neural network. In this way, the parameters of the second neural network are updated in a gradient manner based on the function value of the loss function of the second neural network. The first reinforcement learning algorithm is a proximal policy optimization PPO algorithm, a trust region policy optimization TRPO algorithm, or a temporal-difference TD algorithm. In this implementation, a specific implementation of the reinforcement learning algorithm used by the second neural network is provided, so that implementability of this solution is improved. In addition, a person skilled in the art has more options, so that implementation flexibility of this solution is improved.

In a possible implementation of the first aspect, that the server updates the parameter of the new skill by using a reinforcement learning algorithm includes: The server updates the parameter of the new skill by using a second reinforcement learning algorithm. Specifically, when the skill selected by using the second neural network is the new skill, the server determines a loss function of the new skill based on the second reinforcement learning algorithm, and obtains a function value of the loss function of the new skill based on the data for executing the first task by the intelligent device, to update the parameter of the new skill in a gradient manner. The second reinforcement learning algorithm is a deep deterministic policy gradient DDPG algorithm, a DQN algorithm, a PPO algorithm, or a soft actor-critic SAC algorithm. In this implementation, a specific implementation of the reinforcement learning algorithm used by the new skill is provided, so that implementability of this solution is improved. In addition, a person skilled in the art has more options, so that implementation flexibility of this solution is improved.

In a possible implementation of the first aspect, after the server obtains the second neural network, the method further includes: The server initializes a parameter of the second neural network by using a parameter of the first neural network. The first neural network is obtained by performing, based on a simulated environment corresponding to the second task, training by using a reinforcement learning algorithm, and the semantic information of the second task is similar to the semantic information of the first task. Specifically, the server may initialize some parameters of the second neural network by using the parameter of the first neural network, and initialize a parameter that exists in the second neural network but does not exist in the first neural network. In this implementation, the parameter of the second neural network is initialized by using the parameter of the first neural network that has been obtained through training, so that a capability learned by the first neural network can be directly inherited, thereby shortening a time for training the second neural network, and improving efficiency of training the second neural network.

In a possible implementation of the first aspect, the first neural network and the skill library are neural networks obtained by performing, based on a simulated environment corresponding to a second task, training by using a reinforcement learning algorithm, and the semantic information of the second task is similar to the semantic information of the first task. The method further includes: When the first success rate is greater than or equal to the preset threshold, the server determines the first neural network as the neural network used to complete the first task, and stores the first neural network and the skill library, so that the first neural network and the skill library can be configured on the intelligent device that executes the first task. Specifically, the first neural network and the skill library may be sent in a wireless or wired manner to the intelligent device that executes the first task. In this implementation, when the first neural network is a neural network that performs training based on the simulated environment corresponding to the second task, an upper-layer neural network and a lower-layer skill library are reused, so that a neural network training time is reduced, training resources are saved, and neural network training efficiency is greatly improved.

In a possible implementation of the first aspect, that the server obtains a first success rate of completing the first task by using the first neural network includes: The server obtains the environment status information from the simulated environment corresponding to the first task, and inputs the environment status information into the first neural network, to obtain the skill selected from the skill library by using the first neural network. The environment status information includes status information of the intelligent device and information about a surrounding environment of the intelligent device in the simulated environment corresponding to the first task, and may specifically include map information surrounding the intelligent device, destination information of the intelligent device, movement information of a neighboring intelligent device, movement information or another type of environment information of a current intelligent device, and the like. Then, the server obtains a control instruction by using the skill selected by using the first neural network, and controls, according to the control instruction, the intelligent device to execute the first task. After determining that execution of a skill ends, the server determines whether the first task is completed. If the first task is not completed, the server selects a next skill from the skill library by using the first neural network, to execute the first task, until the first task is completed by using at least one skill. The server repeats the foregoing steps until a quantity of times the first task is completed by using the first neural network reaches a first quantity of times; counts a quantity of times a result of completing the first task is a success in the first quantity of times, to obtain a second quantity of times; and calculates the first success rate based on the first quantity of times and the second quantity of times. Specifically, a percentage of the second quantity of times in the first quantity of times may be determined as the first success rate. The result of completing the first task includes a success and a failure. In this implementation, in an experiment process, the server controls, in the simulator by using the first neural network, the intelligent device to repeatedly execute the first task, that is, obtains the first success rate by restoring a real scenario, to improve accuracy of the first success rate.

In a possible implementation of the first aspect, before obtaining the first success rate of completing the first task by using the first neural network, the server may further obtain a control instruction by using a skill selected by using the first neural network, to control the intelligent device to execute the first task. In a process in which the server executes the first task by using the first neural network, the server may determine whether a loss function of the first neural network is converged. The first neural network is obtained by performing training based on the simulated environment corresponding to the second task, and semantic information of the second task is similar to semantic information of the first task. When the loss function of the first neural network is not converged, the server trains the first neural network based on the simulated environment corresponding to the first task, until a convergence condition of the loss function of the first neural network is met, to obtain the mature first neural network. Further, the server may obtain the first success rate of executing the first task by using the mature first neural network. In this implementation, the first task and the second task are highly similar in some scenarios, that is, skills used to execute the first task and the second task are basically the same. In this case, a condition that the first success rate of completing the first task by using the first neural network is greater than or equal to the preset threshold can be met, provided that the first neural network is fine-tuned based on the simulated environment corresponding to the first task. That is, an objective of executing the first task by using the first neural network can be achieved, provided that the first neural network is trained again based on the simulated environment corresponding to the first task. Therefore, pre-training can increase a probability that the first success rate is greater than or equal to the preset threshold, thereby reducing a probability of generating a new second neural network and a new skill, avoiding an operation of training the second neural network and the new skill, saving resources of the server, and improving neural network and skill generation efficiency.

In a possible implementation of the first aspect, that the server obtains a first success rate of completing the first task by using the first neural network includes: The server obtains semantic information of the first task, and obtains semantic information of a second task. The semantic information of the second task is similar to the semantic information of the first task, and the first neural network is obtained by performing, based on a simulated environment corresponding to the second task, training by using a reinforcement learning algorithm. Specifically, the server may separately obtain the semantic information of the first task and the semantic information of the second task by using a neural network, and generate a similarity between the first task and the second task based on the semantic information of the first task and the semantic information of the second task. Alternatively, the server may decompose the first task to obtain at least one constraint, decompose the second task to obtain at least one constraint, and determine a similarity between the semantic information of the first task and the semantic information of the second task by comparing all constraints of the first task and all constraints of the second task one by one. Then, the server generates the first success rate based on the similarity. A higher similarity indicates a higher first success rate. In this implementation, the first success rate of completing the first task by using the first neural network is determined by obtaining the similarity between the first task and the second task. In this way, another implementation of obtaining the first success rate is provided, and an application scenario of this solution is extended. In addition, in this manner, the first task no longer needs to be executed repeatedly by using the first neural network, thereby improving efficiency of obtaining the first success rate.

In a possible implementation of the first aspect, the skill in the skill library is a driving skill, the skill in the skill library is a carrying skill, or the skill in the skill library is a grabbing skill. A plurality of specific implementations of the skill are provided in this implementation, extending an application scenario of this solution, and improving comprehensiveness of this solution.

In a possible implementation of the first aspect, the skill in the skill library is a driving skill, and the data, obtained by the server, for executing the first task by the intelligent device includes any one or more pieces of information: a driving speed, a driving path, a driving collision status, or a driving destination of the intelligent device. Alternatively, the skill in the skill library is a carrying skill, and the data, obtained by the server, for executing the first task by the intelligent device includes any one or more pieces of information: a carrying path, a carrying speed, or a collision status of the intelligent device. Alternatively, the skill in the skill library is a grabbing skill, and the data that, obtained by the server, for executing the first task by the intelligent device includes any one or more pieces of information: a grabbing path, a grabbing speed, or a grabbing destination location of the intelligent device. In this implementation, specific content of the operation behavior information is further provided, thereby improving executability of this solution. In addition, specific content of the operation behavior information in different fields is provided, thereby improving implementation flexibility of this solution.

According to a second aspect, an embodiment of this application provides a neural network obtaining method. The neural network obtaining method may be applied to a scenario in which reinforcement learning is performed on a neural network in the artificial intelligence field. The method may include: A server obtains a first success rate of completing a first driving task by using a first neural network. The first neural network is used to select, from a skill library, a driving skill used to complete the first driving task. When the first success rate is less than a preset threshold, the server obtains a second neural network and a new driving skill, and adds the new driving skill to the skill library to update the skill library. The second neural network is used to select, from an updated skill library, a driving skill used to complete the first driving task. The server trains, based on a simulated environment corresponding to the first driving task, the second neural network by using a reinforcement learning algorithm, until a second success rate of completing the first driving task by using the second neural network is greater than or equal to the preset threshold; and stores the trained second neural network and the updated skill library.

In a possible implementation of the second aspect, that the server trains, based on a simulated environment corresponding to the first driving task, the second neural network by using a reinforcement learning algorithm includes: The server inputs environment status information into the second neural network, to obtain a driving skill selected by using the second neural network. The environment status information includes status information of an automobile and information about a surrounding environment of the automobile in the simulated environment corresponding to the first driving task. The server obtains a control instruction by using the driving skill selected by using the second neural network, to control the automobile to execute the first driving task, and obtains data for executing the first driving task by the automobile; and updates, based on the obtained data for executing the first driving task by the automobile, parameters of the second neural network by using the reinforcement learning algorithm.

In a possible implementation of the second aspect, after the server inputs the environment status information into the second neural network, to obtain a driving skill selected by using the second neural network, the method may further include: When the driving skill selected by using the second neural network is the new driving skill, the server updates, based on the obtained data for executing the first driving task by the automobile, a parameter of the new driving skill by using a reinforcement learning algorithm.

In a possible implementation of the second aspect, that the server updates parameters of the second neural network by using the reinforcement learning algorithm includes: The server updates the parameters of the second neural network by using a first reinforcement learning algorithm. The first reinforcement learning algorithm is a proximal policy optimization (PPO) algorithm, a trust region policy optimization (TRPO) algorithm, or a temporal-difference (TD) algorithm.

In a possible implementation of the second aspect, that the server updates a parameter of the new driving skill by using a reinforcement learning algorithm includes: The server updates the parameter of the new driving skill by using a second reinforcement learning algorithm. The second reinforcement learning algorithm is a deep deterministic policy gradient (DDPG) algorithm, a deep Q-network (DQN) algorithm, a PPO algorithm, or a soft actor-critic (SAC) algorithm.

In a possible implementation of the second aspect, the method further includes: The server initializes a parameter of the second neural network by using a parameter of the first neural network. The first neural network is obtained by performing, based on a simulated environment corresponding to a second driving task, training by using a reinforcement learning algorithm, and semantic information of the second driving task is similar to semantic information of the first driving task.

In a possible implementation of the second aspect, the first neural network and the skill library are obtained by performing, based on a simulated environment corresponding to a second driving task, training by using a reinforcement learning algorithm, and the semantic information of the second driving task is similar to the semantic information of the first driving task. The method further includes: When the first success rate is greater than or equal to the preset threshold, the server determines the first neural network as a neural network used to complete the first driving task. The server stores the first neural network and the skill library.

In a possible implementation of the second aspect, that a server obtains a first success rate of completing a first driving task by using a first neural network includes: The server inputs the environment status information into the first neural network, to obtain a driving skill selected by using the first neural network, where the environment status information includes the status information of the automobile and the information about the surrounding environment of the automobile in the simulated environment corresponding to the first driving task; obtains a control instruction by using the driving skill selected by using the first neural network, to control the automobile to execute the first driving task; repeats the foregoing steps until a quantity of times the first driving task is completed by using the first neural network reaches a first quantity of times; counts a quantity of times a result of completing the first driving task is a success in the first quantity of times, to obtain a second quantity of times; and calculates the first success rate based on the first quantity of times and the second quantity of times.

In a possible implementation of the second aspect, before the server inputs the environment status information into the first neural network, the method further includes: The server obtains a control instruction by using a driving skill selected by using the first neural network, to control the automobile to execute the first driving task, so as to determine whether a loss function of the first neural network is converged in the simulated environment corresponding to the first driving task. The first neural network is obtained by performing, based on a simulated environment corresponding to a second driving task, training by using a reinforcement learning algorithm, and semantic information of the second driving task is similar to semantic information of the first driving task. When the loss function of the first neural network is not converged, the server trains, based on the simulated environment corresponding to the first driving task, the first neural network by using a reinforcement learning algorithm, until a convergence condition of the loss function of the first neural network is met, to obtain the mature first neural network. Further, that a server obtains a first success rate of completing a first driving task by using a first neural network may include: The server obtains a success rate of completing the first driving task by using the mature first neural network, and uses the success rate as the first success rate.

In a possible implementation of the second aspect, that a server obtains a first success rate of completing a first driving task by using a first neural network includes: The server obtains semantic information of the first driving task, and obtains semantic information of a second driving task. The semantic information of the second driving task is similar to the semantic information of the first driving task, and the first neural network is obtained by performing, based on a simulated environment corresponding to the second driving task, training by using a reinforcement learning algorithm. The server obtains the first success rate based on a similarity between the semantic information of the first driving task and the semantic information of the second driving task. A higher similarity indicates a higher first success rate.

For all of specific implementation steps of the second aspect of this application and the possible implementations of the second aspect and beneficial effects brought by each possible implementation, refer to descriptions in the possible implementations of the first aspect. Details are not described herein again.

According to a third aspect, an embodiment of this application provides a neural network obtaining method. The neural network obtaining method may be applied to a scenario in which reinforcement learning is performed on a neural network in the artificial intelligence field. The method may include: A server obtains a first success rate of completing a first task by using a first neural network. The first neural network is used to select, from a skill library, a skill used to complete the first task. The first neural network and the skill library are obtained by performing, based on a simulated environment corresponding to a second task, training by using a reinforcement learning algorithm. Semantic information of the second task is similar to semantic information of the first task. When the first success rate is greater than or equal to a preset threshold, the server determines the first neural network as a neural network used to complete the first task. The server stores the first neural network and the skill library.

In a possible implementation of the third aspect, the method further includes: When the first success rate is less than the preset threshold, the server obtains a second neural network and a new skill, and adds the new skill to the skill library to update the skill library. The second neural network is used to select, from an updated skill library, the skill used to complete the first task. The server trains, based on a simulated environment corresponding to the first task, the second neural network by using a reinforcement learning algorithm, until a second success rate of completing the first task by using the second neural network is greater than or equal to the preset threshold. The server stores the trained second neural network and the updated skill library.

In a possible implementation of the third aspect, that the server trains, based on a simulated environment corresponding to the first task, the second neural network by using a reinforcement learning algorithm may include: The server inputs environment status information into the second neural network, to obtain a skill selected by using the second neural network. The environment status information includes status information of an intelligent device and information about a surrounding environment of the intelligent device in the simulated environment corresponding to the first task. The server obtains a control instruction by using the skill selected by using the second neural network, to control the intelligent device to execute the first task, and obtains data for executing the first task by the intelligent device. The server updates, based on the obtained data for executing the first task by the intelligent device, parameters of the second neural network by using the reinforcement learning algorithm.

In a possible implementation of the third aspect, after the server inputs the environment status information into the second neural network to obtain the skill selected by using the second neural network, when the skill selected by using the second neural network is a new skill, the server may further update, based on the obtained data for executing the first task by the intelligent device, a parameter of the new skill by using a reinforcement learning algorithm.

In a possible implementation of the third aspect, that the server updates parameters of the second neural network by using the reinforcement learning algorithm may include: updating the parameters of the second neural network by using a first reinforcement learning algorithm. The first reinforcement learning algorithm is a proximal policy optimization (PPO) algorithm, a trust region policy optimization (TRPO) algorithm, or a temporal-difference (TD) algorithm.

In a possible implementation of the third aspect, that the server updates a parameter of the new skill by using a reinforcement learning algorithm may include: updating the parameter of the new skill by using a second reinforcement learning algorithm. The second reinforcement learning algorithm is a deep deterministic policy gradient (DDPG) algorithm, a deep Q-network (DQN) algorithm, a PPO algorithm, or a soft actor-critic SAC algorithm.

In a possible implementation of the third aspect, the method further includes: The server initializes a parameter of the second neural network by using a parameter of the first neural network.

In a possible implementation of the third aspect, that a server obtains a first success rate of completing a first task by using a first neural network may include: The server inputs the environment status information into the first neural network, to obtain a skill selected by using the first neural network, where the environment status information includes the status information of the intelligent device and the information about the surrounding environment of the intelligent device in the simulated environment corresponding to the first task; obtains a control instruction by using the skill selected by using the first neural network, to control the intelligent device to execute the first task; repeats the foregoing steps until a quantity of times the first task is completed by using the first neural network reaches a first quantity of times; counts a quantity of times a result of completing the first task is a success in the first quantity of times, to obtain a second quantity of times; and calculates the first success rate based on the first quantity of times and the second quantity of times.

In a possible implementation of the third aspect, before the server inputs the environment status information into the first neural network, the method may further include: The server obtains a control instruction by using a skill selected by using the first neural network, to control the intelligent device to execute the first task, so as to determine whether a loss function of the first neural network is converged in the simulated environment corresponding to the first task; and when the loss function of the first neural network is not converged, trains, based on the simulated environment corresponding to the first task, the first neural network by using a reinforcement learning algorithm, until a convergence condition of the loss function of the first neural network is met, to obtain the mature first neural network. That a server obtains a first success rate of completing a first task by using a first neural network further includes: obtaining a success rate of completing the first task by using the mature first neural network, and using the success rate as the first success rate.

In a possible implementation of the third aspect, that a server obtains a first success rate of completing a first task by using a first neural network includes: obtaining semantic information of the first task, and obtaining semantic information of a second task; and obtaining the first success rate based on a similarity between the semantic information of the first task and the semantic information of the second task. A higher similarity indicates a higher first success rate.

In a possible implementation of the third aspect, the skill in the skill library is a driving skill, the skill in the skill library is a carrying skill, or the skill in the skill library is a grabbing skill.

For all of specific implementation steps of the third aspect and the possible implementations of the third aspect of this application and beneficial effects brought by each possible implementation, refer to descriptions in the possible implementations of the first aspect. Details are not described herein again.

According to a fourth aspect, an embodiment of this application provides a neural network obtaining apparatus. The neural network obtaining apparatus may be applied to a scenario in which reinforcement learning is performed on a neural network in the artificial intelligence field, and includes an obtaining unit, a training unit, and a storage unit. The obtaining unit is configured to obtain a first success rate of completing a first task by using a first neural network. The first neural network is used to select, from a skill library, a skill used to complete the first task. The obtaining unit is further configured to: when the first success rate is less than a preset threshold, obtain a second neural network and a new skill, and add the new skill to the skill library to update the skill library. The second neural network is used to select, from an updated skill library, the skill used to complete the first task. The training unit is configured to train, based on a simulated environment corresponding to the first task, the second neural network by using a reinforcement learning algorithm, until a second success rate of completing the first task by using the second neural network is greater than or equal to the preset threshold. The storage unit is configured to store the trained second neural network and the updated skill library.

In the fourth aspect of this application, composition modules of the neural network obtaining apparatus may be further configured to perform the steps performed by the server in the possible implementations of the first aspect. For details, refer to the first aspect. Details are not described herein again.

According to a fifth aspect, an embodiment of this application provides a neural network obtaining apparatus. The neural network obtaining apparatus may be applied to a scenario in which reinforcement learning is performed on a neural network in the artificial intelligence field, and includes an obtaining unit, a training unit, and a storage unit. The obtaining unit is configured to a first success rate of completing a first driving task by using a first neural network. The first neural network is used to select, from a skill library, a driving skill used to complete the first driving task. The obtaining unit is further configured to: when the first success rate is less than a preset threshold, obtain a second neural network and a new driving skill, and add the new driving skill to the skill library to update the skill library. The second neural network is used to select, from an updated skill library, a driving skill used to complete the first driving task. The training unit is configured to train, based on a simulated environment corresponding to the first driving task, the second neural network by using a reinforcement learning algorithm, until a second success rate of completing the first driving task by using the second neural network is greater than or equal to the preset threshold. The storage unit is configured to store the trained second neural network and the updated skill library.

In the fifth aspect of this application, composition modules of the neural network obtaining apparatus may be further configured to perform the steps performed by the server in the possible implementations of the second aspect. For details, refer to the second aspect. Details are not described herein again.

According to a sixth aspect, an embodiment of this application provides a neural network obtaining apparatus. The neural network obtaining apparatus may be applied to a scenario in which reinforcement learning is performed on a neural network in the artificial intelligence field, and includes an obtaining unit, a determining unit, and a storage unit. The obtaining unit is configured to obtain a first success rate of completing a first task by using a first neural network. The first neural network is used to select, from a skill library, a skill used to complete the first task. The first neural network and the skill library are obtained by performing, based on a simulated environment corresponding to a second task, training by using a reinforcement learning algorithm. Semantic information of the second task is similar to semantic information of the first task. The determining unit is configured to: when the first success rate is greater than or equal to a preset threshold, determine the first neural network as a neural network used to complete the first task. The storage unit is configured to store the first neural network and the skill library.

In the sixth aspect of this application, composition modules of the neural network obtaining apparatus may be further configured to perform the steps performed by the server in the possible implementations of the third aspect. For details, refer to the third aspect. Details are not described herein again.

According to a seventh aspect, an embodiment of this application provides a server, including a processor. The processor is coupled to a memory. The memory stores a program instruction. When the program instruction stored in the memory is executed by the processor, the neural network obtaining method described in the first aspect, the second aspect, or the third aspect is performed.

According to an eighth aspect, an embodiment of this application provides a computer-readable storage medium. The computer-readable storage medium stores a computer program. When the computer program is run on a computer, the computer is enabled to perform the neural network obtaining method described in the first aspect, the second aspect, or the third aspect.

According to a ninth aspect, an embodiment of this application provides a circuit system. The circuit system includes a processing circuit, and the processing circuit is configured to perform the neural network obtaining method described in the first aspect, the second aspect, or the third aspect.

According to a tenth aspect, an embodiment of this application provides a computer program. When the computer program is run on a computer, the computer is enabled to perform the neural network obtaining method described in the first aspect, the second aspect, or the third aspect.

According to an eleventh aspect, this application provides a chip system. The chip system includes a processor, configured to support a server in implementing the functions in the foregoing aspects, for example, sending or processing data and/or information in the foregoing methods. In a possible design, the chip system further includes a memory. The memory is configured to store a program instruction and data that are necessary for the server or a communications device. The chip system may include a chip, or may include a chip and another discrete device.

DETAILED DESCRIPTION OF EMBODIMENTS

The embodiments of this application provide a neural network obtaining method and a related device, to incrementally learn skills to expand a skill library, thereby reducing a requirement for a training environment in a pre-training phase, achieving expandability of the skills in the skill library, and overcoming a limitation of a current skill learning method.

The following describes the embodiments of this application with reference to accompanying drawings. A person of ordinary skill in the art may learn that as a technology evolves and a new scenario emerges, technical solutions provided in the embodiments of this application are also applicable to similar technical problems.

In the specification, claims, and accompanying drawings of this application, terms such as "first" and "second" are intended to distinguish between similar objects, but do not necessarily indicate a specific order or sequence. It should be understood that the terms used in this way are interchangeable in proper circumstances, and this is merely a distinguishing manner used when objects with a same attribute are described in the embodiments of this application. In addition, terms "include", "comprise" and any other variants are intended to cover non-exclusive inclusion, so that a process, method, system, product, or device that includes a list of units is not necessarily limited to those units, but may include other units not expressly listed or inherent to such a process, method, system, product, or device.

Figures 1, 2:
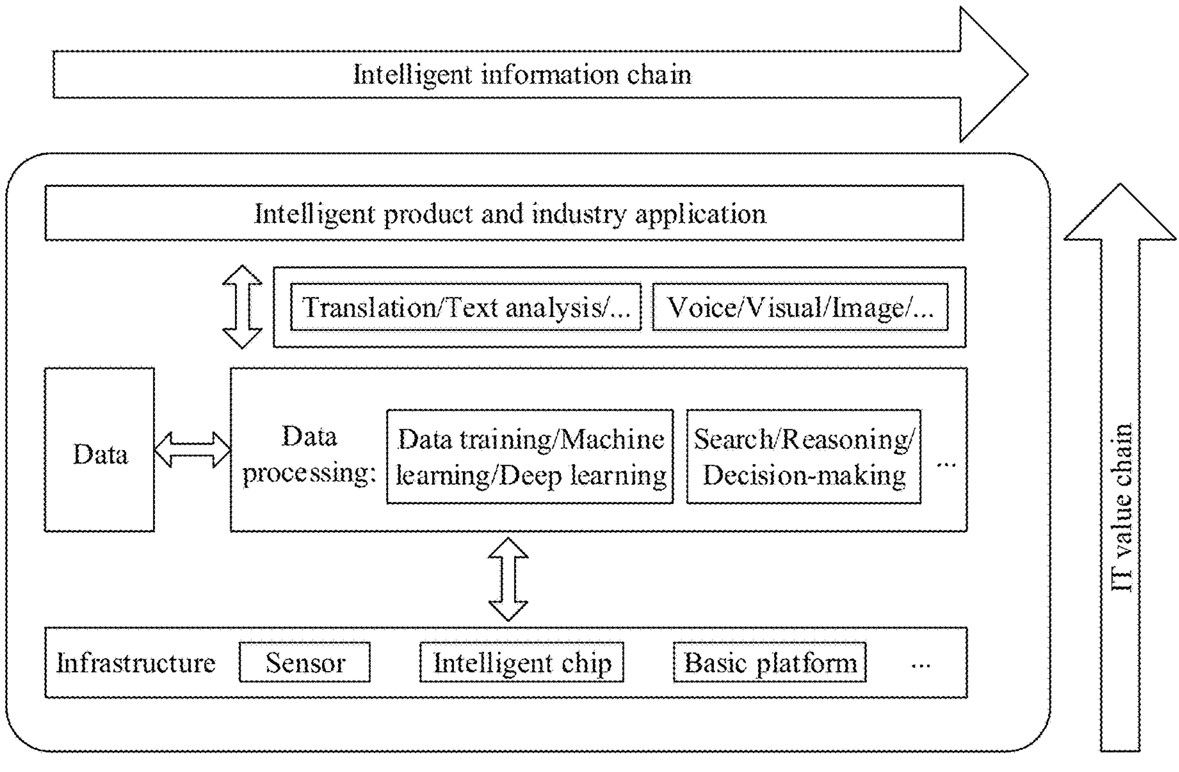
FIG. 1 is a schematic structural diagram of a main artificial intelligence framework according to an embodiment of this application.
FIG. 2 is a schematic diagram of a network architecture of a neural network obtaining system according to an embodiment of this application.

First, an overall working process of an artificial intelligence system is described. FIG. 1 is a schematic structural diagram of a main artificial intelligence framework. The main artificial intelligence framework is elaborated below from two dimensions of an "Intelligent information chain" (a horizontal axis) and an "IT value chain" (a vertical axis). The "Intelligent information chain" reflects a general process from data obtaining to data processing. For example, the process may be a general process of intelligent information perception, intelligent information representation and formation, intelligent reasoning, intelligent decision-making, and intelligent execution and output. In this process, data undergoes a condensation process of "data-information-knowledge-wisdom". The "IT value chain", from the underlying artificial intelligence infrastructure and information (provision and processing of technical realizations) to the system's industry ecosystem, reflects the value that artificial intelligence contributes to the information technology industry.

(1) Infrastructure

The infrastructure provides computing power support for the artificial intelligence system, achieves communication with the outside world, and achieves support through a basic platform. The infrastructure communicates with the outside by using a sensor. The computing power is provided by smart chips (a CPU, an NPU, a GPU, an ASIC, an FPGA, and other hardware acceleration chips). The basic platform includes related platform protection and support such as a distributed computing framework and a network, and may include cloud storage and computing, an interconnection and interworking network, and the like. For example, the sensor communicates with the outside to obtain data, and the data is provided, for computation, to a smart chip in a distributed computing system provided by the basic platform.

(2) Data

Data from a higher layer of the infrastructure is used to indicate a data source in the artificial intelligence field. The data relates to a graph, an image, a voice, and a text, further relates to Internet of things data of a conventional device, and includes service data of an existing system and perception data such as force, displacement, a liquid level, a temperature, humidity, and a distance between intelligent devices.

(3) Data Processing

Data processing usually includes manners such as data training, machine learning, reinforcement learning, deep learning, searching, reasoning, and decision-making.

In machine learning, reinforcement learning, and deep learning, intelligent information of the data is modeled, extracted, preprocessed, trained, or the like in a symbolized and formalized manner.

Reasoning is a process of simulating intelligent human reasoning methods in computers or intelligent systems and using, based on a reasoning control strategy, formalized information to carry out machine thinking and resolve problems, with search and matching being typical functions.

Decision-making is a process in which a decision is made after reasoning is applied to intelligent information, and usually provides functions such as skill selection, classification, sorting, and prediction.

(4) General Capabilities

After data processing mentioned above is performed on data, some general capabilities may be further formed based on a data processing result, for example, an algorithm or a general system, to perform selection of a driving skill, selection of a carrying skill, selection of a grabbing skill, translation, text analysis, computer vision processing, voice recognition, and image recognition.

(5) Intelligent Products and Industry Application

The intelligent products and industry application are products and application of an artificial intelligence system in various fields, respectively, are package of an overall solution of the artificial intelligence, achieve decision productization of intelligent information, and implement application. Application fields of the intelligent products mainly include: an intelligent terminal, intelligent manufacturing, intelligent transportation, intelligent home, intelligent healthcare, intelligent security protection, self-driving, a safe city, and the like.

With development of artificial intelligence, intelligent terminals gradually replace humans to complete many tasks. In this case, skills used to complete the tasks and neural networks specific for the tasks need to be configured on the intelligent terminals, to implement a function of completing specific tasks by using the intelligent terminals. Specifically, the intelligent products may be applied to a movable intelligent terminal. For example, in the self-driving field, a driving operation originally completed by a person may be performed by an intelligent automobile. In this case, a large quantity of driving skills and a neural network specific for the driving skills need to be configured in the intelligent automobile. For another example, in the freight field, a carrying operation originally completed by a person may be performed by a carrying robot. In this case, a large quantity of carrying skills and a neural network specific for the carrying skills need to be configured in the carrying robot. Alternatively, the intelligent products may be applied to an intelligent terminal that cannot be moved. For example, on a pipeline for accessory machining, a part grabbing operation originally completed by a person may be completed by an intelligent mechanical arm. In this case, a grabbing skill and a neural network specific for the grabbing skill need to be configured in the intelligent mechanical arm. Displacement of the intelligent mechanical arm and grabbing angles may vary with different grabbing skills. In another example, in the field of automatic cooking, a cooking operation originally completed by a person may be completed by an intelligent mechanical arm, and cooking skills such as a raw material grabbing skill and a stir-frying skill and a neural network specific for the cooking skills need to be configured in the intelligent mechanical arm. Other application scenarios are not listed herein.

The neural networks and the skills that are configured in the foregoing intelligent products such as the intelligent terminal, the intelligent automobile, and the intelligent mechanical arm need to be obtained through pre-learning. With reference to the foregoing descriptions, an embodiment of this application provides a neural network obtaining method. Specifically, a server obtains a first task, and obtains a first success rate of completing the first task by using a first neural network. When the first success rate is less than a preset threshold, the server obtains a second neural network and a new skill, and adds the new skill to a skill library to obtain an updated skill library. The server trains, based on a simulated environment corresponding to the first task, the second neural network by using a reinforcement learning algorithm, until a second success rate of completing the first task by using the second neural network is greater than or equal to the preset threshold. Then, the server stores the trained second neural network and the updated skill library. In this way, the trained second neural network and the updated skill library can be configured in various intelligent products.

It can be learned from the foregoing descriptions that both the server and the intelligent terminal are included in this embodiment of this application. The following describes a network architecture of a neural network obtaining system in an embodiment of this application with reference to FIG. 2. FIG. 2 is a diagram of a network architecture of a neural network obtaining system according to an embodiment of this application. In FIG. 2, the neural network obtaining system 200 includes a server 210, a data obtaining device 220, an intelligent device 230, a database 240, a first communications device 250, and a second communications device 260.

The server 210 is configured to: obtain a first task; and then obtain, by using environment status information obtained by the data obtaining device 220, a first success rate of completing the first task by using a first neural network. The first neural network is used to select, from a skill library, a skill used to complete the first task.

The data obtaining device 220 is configured to obtain the environment status information. Specifically, a simulator may be configured on the server 210. The data obtaining device 220 collects status information of a current surrounding environment existing in the simulator when the intelligent device 230 executes the first task.

The server 210 is further configured to: when the first success rate is less than a preset threshold, generate a second neural network, and add a new skill to the skill library, to obtain an updated skill library; train, based on a simulated environment corresponding to the first task, the second neural network by using the environment status information obtained by the data obtaining device 220, until a second success rate of completing the first task by using the second neural network is greater than or equal to the preset threshold; and then store the trained second neural network and the updated skill library to the database 240, and send the mature second neural network and the updated skill library to the first communications device 250. The database 240 may be configured in the server 210, or may be a storage device independent of the server 210. For example, in FIG. 2, the database 240 and the server 210 are storage devices independent of each other.

After the first communications device 250 receives the second neural network and the updated skill library, the mature second neural network and the updated skill library may be run on the first communications device 250. Alternatively, the mature second neural network and the updated skill library may be sent to the second communications device 260, or the mature second neural network and the updated skill library are loaded to the second communications device 260 and run by the second communications device 260.

The first communications device 250 may be specifically an intelligent device having a capability of directly executing a task, such as an intelligent automobile, a carrying robot, an intelligent mechanical arm, a chess and card robot, or a sweeping robot; or may be specifically a communications device configured to store the mature second neural network and the updated skill library, such as a personal computer, a computer workstation, a smartphone, or a tablet computer. This is not limited herein. The second communications device 260 may be an intelligent device having a capability of directly executing a task, such as an intelligent automobile, a carrying robot, an intelligent mechanical arm, a chess and card robot, or a sweeping robot.

Both a connection between the first communications device 250 and the server 210 and a connection between the first communications device 250 and the second communications device 260 may be implemented through a wireless network. A standard communications technology and/or protocol is used for the foregoing wireless network. The wireless network is usually the Internet; or may be any network, including but not limited to a local area network (LAN), a metropolitan area network (MAN), a wide area network (WAN), a mobile network, a private network, a virtual private network, or any combination thereof. In other embodiments, a customized or dedicated data communications technology may be used to replace or supplement the foregoing data communications technology.

Although FIG. 2 shows only one server 210, one first communications device 250, and one second communications device 260, it should be understood that the example in FIG. 2 is merely used to understand this solution. Specifically, a quantity of servers 210, a quantity of first communications devices 250, and a quantity of second communications devices 260 shall be flexibly determined depending on an actual situation.

With reference to the foregoing descriptions, the following starts to describe a specific implementation procedure of the neural network obtaining method provided in this embodiment of this application. Because the neural network obtaining method provided in this embodiment of this application relates to both a neural network training side and a neural network application side, the following separately describes a specific implementation process on the training side and a specific implementation process on the application side.

1. Training Side

Figure 3A:
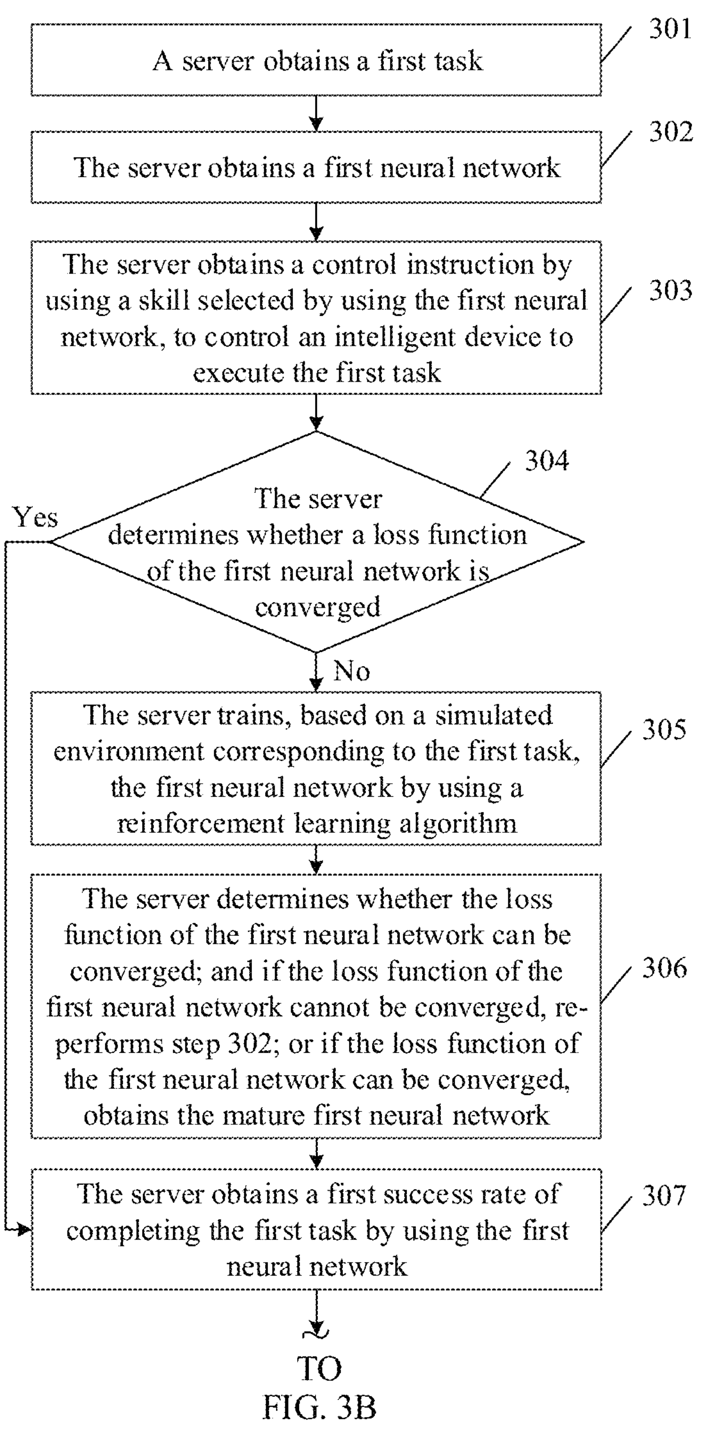
FIG. 3A and FIG. 3B are a schematic flowchart of a neural network obtaining method according to an embodiment of this application.
Figure 3B:
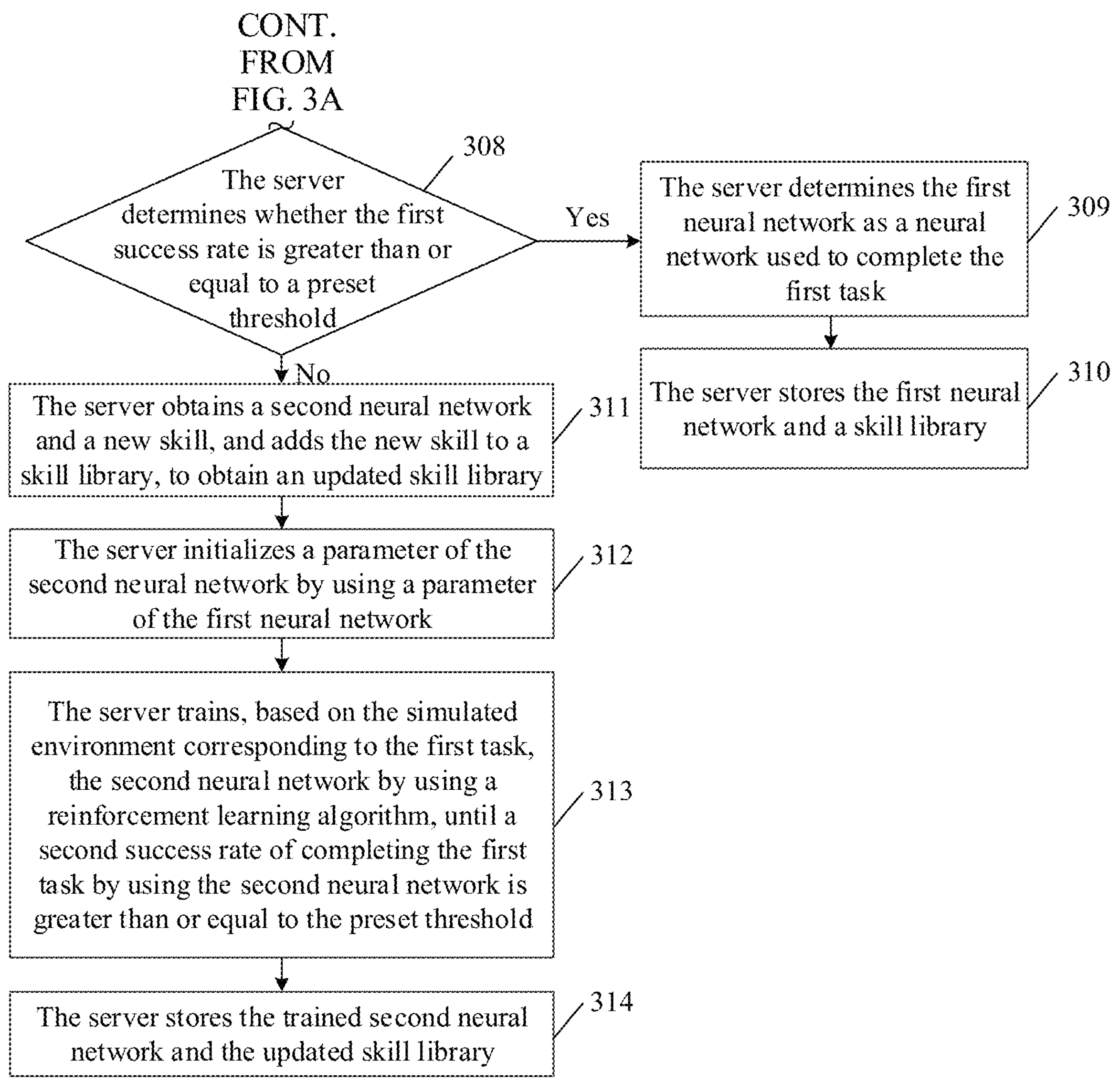

FIG. 3A and FIG. 3B show an embodiment of a neural network obtaining method according to an embodiment of this application. The method may include the following steps.

301. A server obtains a first task.

In this embodiment of this application, the server first obtains the first task. Specifically, the server may receive the first task input by a person skilled in the art, that is, the first task may be input by the person skilled in the art through a receiving interface of the server. Alternatively, a person skilled in the art may pre-input a large number of tasks, so that the server can select the first task from the pre-input tasks. Alternatively, a person skilled in the art may preset a task generation rule, so that the server can automatically generate the first task according to the generation rule. Further, the generation rule may be that difficulty of tasks is in ascending order. For example, an initial task is to drive an automobile out of a roundabout, where a traffic volume at an entrance of the roundabout is one automobile every 5 seconds, and the automobile can only travel in the outer lane of the roundabout, that is, cannot change the lanes. In this case, the first task that is generated by the server and that is more difficult than the initial task may be to drive the automobile out of the roundabout, where the traffic volume at the entrance of the roundabout is one automobile every 5 seconds, and the automobile can travel in any lane of the roundabout, that is, can change lanes. A first task that is generated by the server and whose difficulty further increases may be to drive the automobile out of the roundabout, where the traffic volume at the entrance of the roundabout is one automobile every 2.5 seconds, and the automobile can change lanes. For another example, an initial task is to put goods into a warehouse, and put the goods on a bottom shelf, where a carrying speed is one piece every two minutes. In this case, a first task that is generated by the server and that is more difficult than the initial task may be to put the goods in a warehouse and put the goods on the bottom shelf, where a carrying speed is one piece per minute. A first task that is generated by the server and whose difficulty further increases may be to put the goods in the warehouse and put the goods on an entire rack including four shelves, where a carrying speed is one piece per minute, and so on. It should be understood that a specific form in which the server obtains the first task is not limited herein.

302. The server obtains a first neural network.

In some embodiments of this application, after obtaining the first task, the server obtains the first neural network. The first neural network is used to select, from a skill library, a skill used to complete the first task. Further, the first neural network may be specifically a neural network. Each skill in the skill library may be specifically a neural network, or may be specifically an operation rule. For example, the skill in the skill library may be specifically: accelerating at a speed of 10 meters per second, turning right 30 degrees, moving 3 meters to the right, or another operation rule. This is not specifically limited herein. When the solution provided in this embodiment of this application is applied to the self-driving field, the skill in the skill library may be a driving skill. When the solution provided in this embodiment of this application is applied to the freight field, the skill in the skill library may be a carrying skill. When the solution provided in this embodiment of this application is applied to an intelligent mechanical arm, the skill in the skill library may be a grabbing skill, or the like. Specific representation forms of the skill are not listed herein. A plurality of specific implementations of the skill are provided in the foregoing manner, thereby extending application scenarios of this solution and improving comprehensiveness of this solution.

Specifically, in an implementation, the server is configured to train neural networks and skill libraries by using a plurality of different tasks, that is, the server may store a plurality of neural networks and a plurality of skill libraries. Therefore, the first neural network may be a neural network obtained by performing training based on a simulated environment corresponding to a second task, that is, the first neural network may be a mature neural network in at least one neural network pre-obtained through training. Correspondingly, the server may determine a skill library corresponding to the first neural network, as the skill library. More specifically, a person skilled in the art may select the first neural network from the at least one neural network pre-obtained through training, and the server further obtains the first neural network selected by the person skilled in the art. Alternatively, the server may automatically select the first neural network from at least one neural network pre-obtained through training. Semantic information of the first task is similar to semantic information of the second task. Specifically, that semantic information of the first task is similar to semantic information of the second task may mean that the semantic information of the first task and the semantic information of the second task are obtained by using a neural network and compared, to determine that the semantic information of the first task is similar to the semantic information of the second task. Alternatively, constraints obtained by decomposing the first task and the second task may be similar. For example, constraints obtained by decomposing the first task are driving out of a roundabout, a traffic volume of one vehicle every 5 seconds, and having a lane changing function. Constraints obtained by decomposing the second task are driving out of a roundabout, a traffic volume of one vehicle every 5 seconds, and having no lane changing function. In this case, it may be considered that the semantic information of the first task is similar to the semantic information of the second task. Alternatively, running environments of the first task and the second task may be similar. For example, a running environment of the first task is a roundabout on which a traffic volume is one vehicle every 5 seconds, and a vehicle can change lanes; and a running environment of the second task is an overpass on which a traffic volume is one vehicle every 5 seconds, and a vehicle can change lanes. In this case, it may be considered that the semantic information of the first task is similar to the semantic information of the second task. Certainly, another manner may alternatively be used to determine that the semantic information of the first task is similar to the semantic information of the second task. The example herein is merely used for ease of understanding of this solution, and all implementations are not listed.

In another implementation, after determining the first task and a neural network type of the first neural network, the server may initialize one first neural network, and initially train, based on a simulated environment corresponding to the first task, one skill library by using a reinforcement learning algorithm. In another implementation, after determining the first task and a neural network type of the first neural network, the server may initialize one first neural network, then a person skilled in the art configures at least one skill in the skill library based on the first task, and the like. In subsequent steps, the skills in the skill library can be expanded. Therefore, a quantity of skills in the skill library does not need to be particularly large.

More specifically, the server inputs environment status information into the first neural network, to obtain a skill selected from the skill library by using the first neural network. The environment status information may include status information of an intelligent device and information about a surrounding environment of the intelligent device in the simulated environment corresponding to the first task. The environment status information may specifically include surrounding map information of the intelligent device, destination information of the intelligent device, movement information of a neighboring intelligent device, movement information of the current intelligent device, other types of environment information, or the like. For example, when this embodiment of this application is applied to the self-driving field, the environment status information may include a distance to a neighboring vehicle, a driving direction of an opposite vehicle relative to the driving vehicle, a speed of the opposite vehicle relative to the driving vehicle, a speed of the driving vehicle, a direction of the driving vehicle, a distance between the driving vehicle and a destination, and the like.

Further, the environment status information may be input into the first neural network in a form of a picture, sequence data, or other data. A neural network type of the first neural network may be determined based on a data type of input data. For example, if the input data is picture data, a convolutional neural network (CNN) may be used as the first neural network. For example, if the input data is sequence data, a recurrent neural network (RNN) may be used as the first neural network. Other cases are not listed one by one herein. The first neural network may output a sequence number corresponding to a skill, that is, the server may pre-configure a sequence number for each skill in the skill library, so that a corresponding skill can be found based on the sequence number output by the first neural network, that is, the skill can be selected from the skill library. The server may store a mapping relationship between a sequence number and a single skill in a form of a table, an array, an index, or another form. The following provides descriptions by using an example in which a mapping relationship between a single skill and a sequence number is stored in a form of a table. Refer to Table 1.

TABLE 1

| Sequence number | Skill |
|---|---|
| 68 | Skill 1 |
| 69 | Skill 2 |
| 70 | Skill 3 |
| 71 | Skill 4 |

For example, Table 1 shows four rows of data in the table of the mapping relationship between a single skill and a sequence number. In an actual case, a mapping relationship between a single skill and a sequence number may include more or less data. Four consecutive sequence numbers are shown in the example in Table 1. However, in an actual product, inconsecutive sequence numbers may be configured for different skills. In addition, the skill 1 to the skill 4 in Table 1 are all substitute names. In an actual case, the skill 1 to the skill 4 may be specific operation rules, neural networks, interface numbers for invoking specific skills, or the like. It should be understood that the example in Table 1 is merely used to intuitively display the mapping relationship between a single skill and a sequence number, so as to understand this solution more easily; and is not used to limit this solution.

When the skill is specifically a neural network, an input of the skill may be environment status information. In this case, similar to that of the first neural network, a neural network type of the skill is also related to a data type of the input of the skill. An output of the skill may directly correspond to an operation rule. For example, when the output of the skill is 60, it indicates that an automobile moves at a speed of 60 meters per second. Alternatively, the output of the skill may be a sequence number that has a mapping relationship with an operation rule, that is, the server stores a mapping relationship between a sequence number of an output of a skill and an operation rule represented by the skill. For example, when the output of the skill is 2.23, it indicates that an automobile needs to turn a steering wheel 23 degrees to the right. For another example, when the output of the skill is 1.58, it indicates that an automobile needs to turn a steering wheel 58 degrees to the left. Details are not listed herein. Correspondingly, the server may alternatively store, in a form of a table, an array, an index, or another form, the mapping relationship between a sequence number of an output of a skill and an operation rule represented by the skill. The following provides descriptions only by using an example in which a mapping relationship between a sequence number of an output of a skill and an operation rule represented by the skill is stored in a form of a table.

TABLE 2

| | | | |
|---|---|---|---|
| Sequence number | 1.2 | 1.3 | 1.4 |
| Operation Rule | Turn a steering wheel 20 degrees to the left | Turn a steering wheel 30 degrees to the left | Turn a steering wheel 40 degrees to the left |
| Sequence number | 3.4 | 3.45 | 3.5 |
| Operation Rule | Control a vehicle speed to 40 m/s | Control a vehicle speed to 45 m/s | Control a vehicle speed to 50 m/s |

Figure 4:
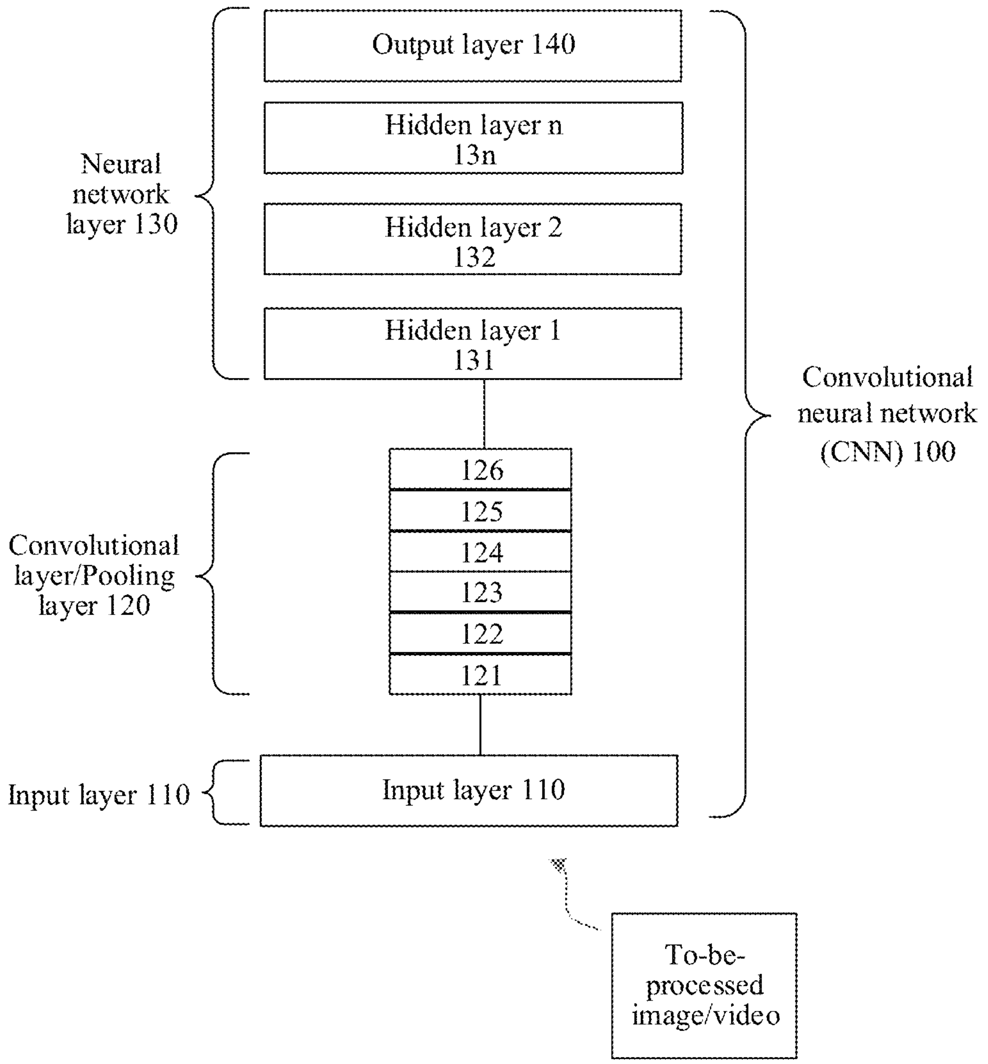
FIG. 4 is a schematic structural diagram of a convolutional neural network according to an embodiment of this application.

Table 2 shows some data of a mapping relationship between a sequence number of an output of a skill and an operation rule represented by the skill. It should be understood that the foregoing example is merely used to facilitate understanding of this solution, and is not intended to limit this solution. To further understand this solution, concepts of a convolutional neural network and a recurrent neural network are further described herein. The convolutional neural network is first described. FIG. 4 is a schematic structural diagram of a convolutional neural network according to an embodiment of this application. The convolutional neural network (CNN) is a deep neural network with a convolution structure, and is a deep learning architecture. According to the deep learning architecture, multi-layer learning is performed at different abstraction levels by using machine learning algorithms. As a deep learning architecture, the convolutional neural network is a feedforward (feed-forward) neural network. The feedforward neural network is an artificial neural network in which connections between the nodes do not form a cycle. As shown in FIG. 4, the convolutional neural network 100 may include an input layer 110, a convolutional layer/pooling layer 120, and a neural network layer 130. The pooling layer is optional.

Convolutional Layer/Pooling Layer 120:

Convolutional Layer:

As shown in FIG. 4, the convolutional layer/pooling layer 120 may include, for example, layers 121 to 126. In an implementation, the layer 121 is a convolutional layer, the layer 122 is a pooling layer, the layer 123 is a convolutional layer, the layer 124 is a pooling layer, the layer 125 is a convolutional layer, and the layer 126 is a pooling layer. In another implementation, the layers 121 and 122 are convolutional layers, the layer 123 is a pooling layer, the layers 124 and 125 are convolutional layers, and the layer 126 is a pooling layer. To be specific, an output of a convolutional layer may be used as an input of a subsequent pooling layer, or may be used as an input of another convolutional layer to continue a convolution operation.

The convolutional layer 121 is used as an example. The convolutional layer 121 may include many convolution operators. The convolution operator is also referred to as a kernel. In image processing, the convolution operator functions as a filter that extracts specific information from an input image matrix. The convolution operator may essentially be a weight matrix, and the weight matrix is usually predefined. In a process of performing a convolution operation on an image, the weight matrix usually processes pixels at a granularity of one pixel (or two pixels, where a quantity of pixels depends on a value of a stride) in a horizontal direction on the input image, to extract a specific feature from the image. A size of the weight matrix should be related to a size of the image. It should be noted that a depth dimension of the weight matrix is the same as a depth dimension of the input image. During a convolution operation, the weight matrix extends to an entire depth of the input image. Therefore, a convolution output of a single depth dimension is generated by performing convolution with a single weight matrix. However, in most cases, a plurality of weight matrices of a same dimension rather than a single weight matrix are applied. Outputs of the weight matrices are stacked to form a depth dimension of a convolutional image. Different weight matrices may be used to extract different features from the image. For example, a weight matrix is used to extract edge information of the image, another weight matrix is used to extract a specific color of the image, still another weight matrix is used to blur unnecessary noise in the image, and so on. All weight matrices are not listed herein. Dimensions of the plurality of weight matrices are the same, and dimensions of feature graphs extracted by using the plurality of weight matrices that have the same dimensions are also the same. Then, the plurality of extracted feature graphs that have the same dimensions are combined to form an output of a convolution operation.

Weight values in these weight matrices need to be obtained in actual application through massive training. The weight matrices that are formed based on the weight values obtained through training may be used to extract information from the input image, to help the convolutional neural network 100 perform correct prediction.

When the convolutional neural network 100 includes a plurality of convolutional layers, a larger quantity of general features are usually extracted at an initial convolutional layer (for example, the convolutional layer 121). The general features may also be referred to as low-level features. As a depth of the convolutional neural network 100 increases, a feature extracted at a more subsequent convolutional layer (for example, the convolutional layer 126) is more complex, for example, a high-level semantic feature. A feature with higher semantics is more applicable to a to-be-resolved problem.

Pooling Layer:

A quantity of training parameters often needs to be reduced. Therefore, a pooling layer often needs to be periodically introduced after a convolutional layer. For the layers 121 to 126 shown in 120 in FIG. 4, one convolutional layer may be followed by one pooling layer, or a plurality of convolutional layers may be followed by one or more pooling layers. During image processing, the pooling layer is only used to reduce a space size of an image. The pooling layer may include an average pooling operator and/or a maximum pooling operator, to perform sampling on an input image to obtain an image of a smaller size. The average pooling operator may calculate a pixel value in an image in a specific range, to generate an average value. The maximum pooling operator may be used to select a pixel with a maximum value in a specific range as a maximum pooling result. In addition, just as the size of the weight matrix should be related to the size of the image at the convolutional layer, an operator also needs to be related to a size of an image at the pooling layer. A size of an image output after processing at the pooling layer may be less than a size of an image input into the pooling layer. Each pixel in the image output from the pooling layer represents an average value or a maximum value of values corresponding to sub-regions of the image input into the pooling layer.

Neural Network Layer 130:

After processing is performed at the convolutional layer/pooling layer 120, the convolutional neural network 100 cannot output required output information, because only a feature is extracted at the convolutional layer/pooling layer 120 as described above, and parameters resulting from the input image are reduced. However, to generate final output information (required type information or other related information), the convolutional neural network 100 needs to use the neural network layer 130 to generate an output of one required type or a group of required types. Therefore, the neural network layer 130 may include a plurality of hidden layers (131, 132, to **13*n* shown in FIG. 4) and an output layer 140**. Parameters included in the plurality of hidden layers may be pre-obtained through training based on related training data of a specific task type. For example, the task type may include image processing and skill selection performed after the image processing. The image processing may include image recognition, image classification, image super-resolution reconstruction, and the like. After an image is processed, a skill may be selected based on obtained image information. For example, when this application is applied to the self-driving field, a neural network is specifically a convolutional neural network, and a task is driving out of a roundabout, that is, an environmental image is input into a convolutional neural network of the neural network, the convolutional neural network needs to recognize information in the environmental image, such as an automobile, an exit of the roundabout, and a lane in which the automobile is located, so as to obtain information such as information about a distance between vehicles, information about a distance to the exit of the roundabout, and a lane changing operation that needs to be performed, and further determine, with reference to the foregoing environment status information, a driving skill for executing the task of driving out of the roundabout. Optionally, when a pixel of a collected image is excessively low, an image super-resolution reconstruction operation further needs to be performed, so as to improve accuracy of the image, and the like. In another example, for example, this application is applied to a mechanical arm for grabbing a part, a neural network is specifically a convolutional neural network, and a task is putting proper parts into a correct container at a speed of 20 parts per minute. In this case, an environmental image may be input into the convolutional neural network, the convolutional neural network needs to recognize various types of parts (with different features such as specifications and materials) and different part containers in the environmental image, so as to obtain information such as information about types of parts and part containers, a correspondence between a part and a part container, and a distance between a part and a part container. Then, the convolutional neural network further needs to select, from a skill library with reference to the foregoing information, a grabbing skill for completing a part grabbing task, and the like. Details are not listed herein.

At the neural network layer 130, the plurality of hidden layers are followed by the output layer 140, namely, the last layer of the entire convolutional neural network 100. The output layer 140 has a loss function similar to categorization cross entropy, and the loss function is specifically used to calculate a prediction error. Once forward propagation (that is, propagation in a direction from 110 to 140, as shown in FIG. 4) of the entire convolutional neural network 100 is completed, back propagation (that is, propagation in a direction from 140 to 110, as shown in FIG. 4) is started to update a weight value and a deviation of each layer mentioned above, so as to reduce a loss of the convolutional neural network 100 and an error between a result output by the convolutional neural network 100 through the output layer and an ideal result.

Figure 5:
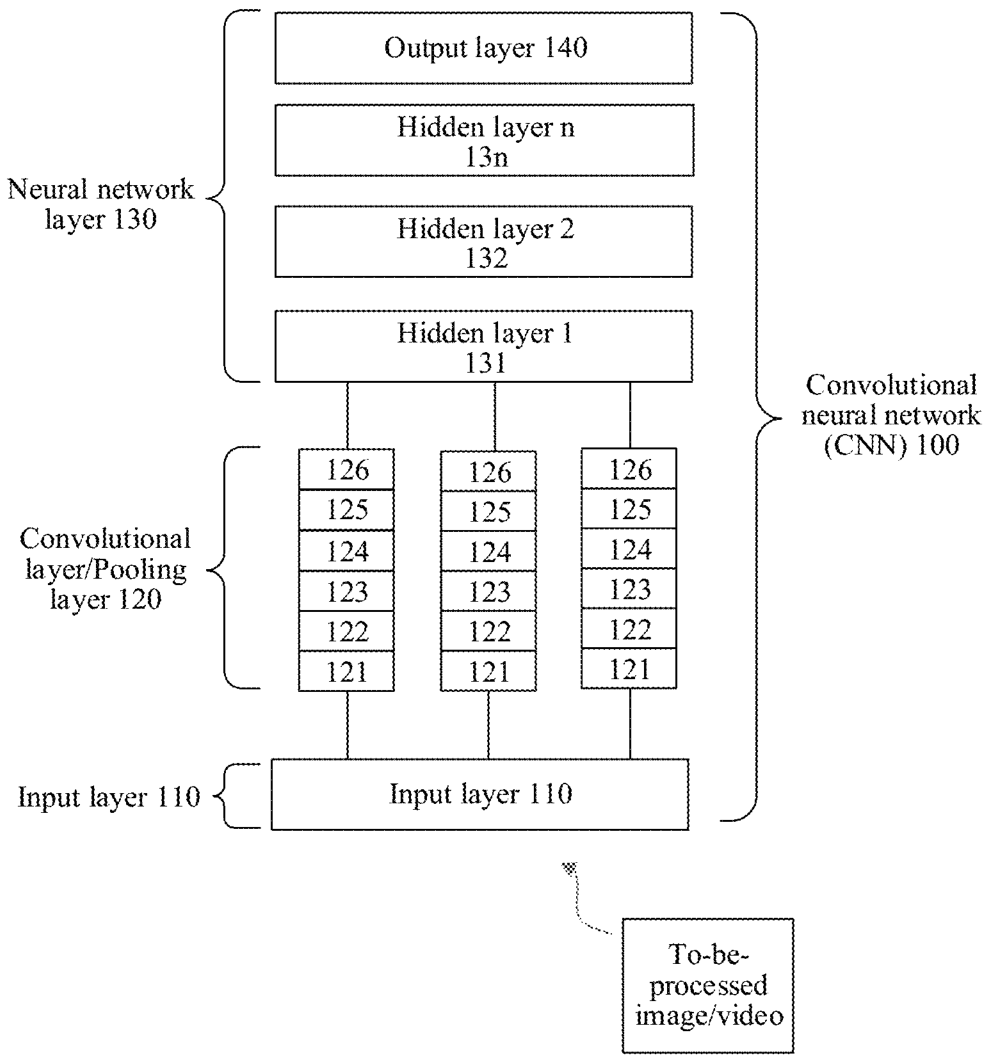
FIG. 5 is another schematic structural diagram of a convolutional neural network according to an embodiment of this application.

It should be noted that the convolutional neural network 100 shown in FIG. 4 is merely used as an example of a convolutional neural network. In specific application, the convolutional neural network may alternatively exist in a form of another network model. For example, a plurality of convolutional layers or pooling layers shown in FIG. 5 are concurrent, extracted features are all input to the neural network layer 130 and processed.

Next, a recurrent neural network (RNN) is described. Recurrent neural networks (RNNs) are neural networks used to process sequence data. Theoretically, the RNNs can process sequence data of any length. In a conventional neural network model, from an input layer to a hidden layer and then to an output layer, all of the layers are connected, but none of nodes at each layer is connected. However, this common neural network is powerless for many problems. For example, if you are expected to predict a word in a sentence, a previous word usually needs to be used, because adjacent words in the sentence are not independent. The reason why the RNNs are referred to as recurrent neural networks is that a current output of a sequence in a recurrent neural network is also related to a previous output. A specific representation form is that the network memorizes previous information and applies the previous information to calculation of the current output. To be specific, nodes at a hidden layer are connected, and an input of the hidden layer not only includes an output of the input layer, but also includes an output of the hidden layer at a previous moment. Specifically, for example, when this application is applied to the self-driving field, a neural network is specifically a recurrent neural network, and a task is driving out of a roundabout. That is, an obtained environmental image is preprocessed to obtain sequence data that carries environment status information. In this case, the foregoing sequence data may be input into a recurrent neural network of the neural network, so that the recurrent neural network can directly obtain, by using the input environment status information, information such as information about a distance between vehicles, information about a distance to an exit of the roundabout, and a lane changing operation that needs to be performed, further determine a task execution skill with reference to the foregoing environment status information, and the like. It should be understood that a server may further implement a function of a neural network by using another type of neural network. Other types of neural networks are not described one by one herein.

303. The server obtains a control instruction by using the skill selected by using the first neural network, to control the intelligent device to execute the first task.

In some embodiments of this application, after obtaining the first task and the first neural network, the server may first obtain the control instruction by using the skill selected by using the first neural network, to control the intelligent device to execute the first task, so as to determine whether a loss function of the first neural network is converged in the simulated environment corresponding to the first task. Specifically, the server inputs the environment status information into the first neural network, to obtain a skill selected by using the first neural network. The environment status information includes the status information of the intelligent device and the information about the surrounding environment of the intelligent device in the simulated environment corresponding to the first task. The server obtains the control instruction by using the skill selected by using the first neural network, to control the intelligent device to execute the first task. More specifically, the server may input the obtained environment status information into the first neural network to obtain a first sequence number output by the first neural network; then select, from the skill library based on the first sequence number output by the first neural network, a skill that matches the first sequence number; and further control the intelligent device to execute the first task by executing the control instruction corresponding to the skill selected by using the first neural network. Certainly, the server may complete the first task by using one or at least two skills. When the server uses at least two skills to complete the first task, after determining that execution of a skill ends, the server determines whether the first task is completed. If the first task is completed, execution of the first task ends. If the first task is not completed, a next skill is selected from the skill library by using the first neural network; and when execution of the next skill is completed, the server further determines whether the first task is completed. The foregoing steps are repeated until the first task is completed by using at least two skills.

Figure 6:
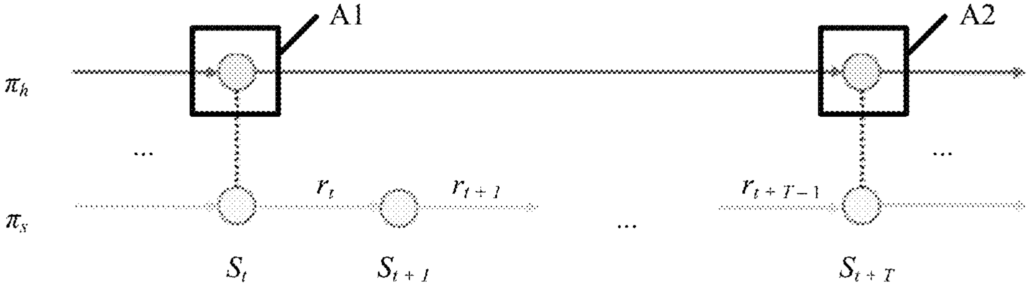
FIG. 6 is a schematic diagram of executing a first task by using a skill in a neural network obtaining method according to an embodiment of this application.

More specifically, the server may preset execution duration of each skill. The execution duration of the skill may be T timestamps, where a value of T may be 6, 8, 10, 12, 15, 18, 20, or the like. A specific value of T may be determined based on an actual application scenario, and is not limited herein. To understand this solution more intuitively, refer to FIG. 6. FIG. 6 is a schematic diagram of executing a first task by using a skill in a neural network obtaining method according to an embodiment of this application. That the first task is executed by using at least two skills is used as an example in FIG. 6. $\pi_h$ represents a running process of a first neural network, $\pi_s$ represents a running process of at least two skills, $S_t$ represents an environment status at a moment t, $S_{t+1}$ represents an environment status at a moment (t+1), $S_{t+T}$ represents an environment status at a moment (t+T), A1 represents a skill selected by the server at the moment t by using the first neural network, and A2 represents a skill selected by the server at the moment (t+T) by using the first neural network. Because A1 selected at the moment t has been run for T timestamps, the server needs to select the new skill A2 at the moment (t+T) by using the first neural network, to continue to execute the first task.

In addition, $r_t$ represents a feedback value obtained after A1 is used for execution from the moment t to the moment (t+1), $r_{t+1}$ represents a feedback value obtained after A1 is used for execution from the moment (t+1) to a moment (t+2), and $r_{t+1-1}$ represents a feedback value obtained after A1 is used for execution from a moment (t+T−1) to the moment (t+T). $r_t$, $r_{t+1}$, and $r_{t+T-1}$ all may directly come from an environment, or may be obtained based on a feedback value obtained after a skill is used for execution. Because a manner of generating $r_t$, $r_{t+1}$, and $r_{t+T-1}$ is described in detail in the following description. Details are not described herein. It should be understood that the example in FIG. 6 is merely used to facilitate understanding of the concept of selecting a new skill at an interval of T timestamps, and is not used to limit this solution. A manner in which the server determines that execution of a skill ends may be as follows: The server performs, once at an interval of preset duration, an operation of obtaining a skill execution status, until the skill execution status is "end". A length of the preset duration may be 0.1 second, 800 hertz, 600 hertz, another length, or the like. A specific length of the preset duration may be determined with reference to an actual application scenario, and is not limited herein.

Further, a simulator may be configured on a server side. The simulator is configured to provide an environment for executing the first task. In other words, the server collects the environment status information from the simulator, and the intelligent device is a virtual object running in the simulated environment. For example, in a simulated scenario of driving out of a toll station in self-driving, a scenario in which a plurality of automobiles (an example of the intelligent device) drive out of the toll station may be demonstrated through the simulator. For another example, in a simulated scenario of carrying goods by a warehouse robot (an example of the intelligent device), a scenario in which a plurality of warehouse robots execute carrying tasks in a warehouse may be demonstrated through the simulator. Other scenarios are not described one by one herein.

The environment status information input by the server into the first neural network may be specifically environment image information, environment status information in a form of sequence data, environment status information in another data form, or the like, and is not limited herein. An example in which the environment status information corresponding to the first task is input into the first neural network is used in the foregoing descriptions of the convolutional neural network and the recurrent neural network. Therefore, details are not described herein again.

304. The server determines whether the loss function of the first neural network is converged; and if the loss function is not converged, performs step 305; or if the loss function is converged, performs step 307.

In some embodiments of this application, after completing the first task at least once by using the first neural network, the server may determine whether the loss function of the first neural network is converged; and if the loss function is not converged, may perform step 305; or if the loss function is converged, may directly perform step 307. A convergence condition of the loss function of the first neural network may be that a function value increases to a stable value range, that a function value decreases to a stable value range, or the like. The loss function of the first neural network may be determined based on a type of a reinforcement learning algorithm used when the first neural network is trained. Different reinforcement learning algorithms correspond to different loss functions. Specifically, the server may present the function value of the loss function of the first neural network in a form of a line graph, so that whether the loss function of the first neural network is converged can be intuitively perceived. A specific presentation manner is not limited herein. More specifically, types of reinforcement learning algorithms used when the first neural network is trained may include a proximal policy optimization (PPO) algorithm, a trust region policy optimization (TRPO) algorithm, a temporal-difference learning (TD) algorithm, or another on-policy reinforcement learning algorithm. A PPO algorithm used for the first neural network is used as an example. In an example of the loss function used by the first neural network, a formula of the loss function may be specifically as follows:

$$J(\theta) = \sum_{t=1}^{T} \frac{\pi_{h,\theta}(\pi_{s,t}|s_t)}{\pi_{h,old}(\pi_{s,t}|s_t)} \hat{A}_t - \beta KL[\pi_{h,old}|\pi_{h,\theta}].$$

T represents a quantity of timestamps included in execution duration of one skill. $\pi_{h,\theta}$ and $\theta$ each represent a parameter of the first neural network. $\pi_{s,t}$ represents a skill selected at a moment t by using the first neural network. $S_t$ represents environment status information at the moment t. $\pi_{h,old}$ represents a network model of the first neural network saved before a previous training operation. $\hat{A}_t$ is a function value of a dominant function output by a neural network after the skill is used for execution from the moment t to a moment (t+T), and may be specifically expressed as $\hat{A}_t=R+\gamma V_{\pi_h}(S_{t+T})-V_{\pi_h}-V_{\pi_h}(S_t)$, where R represents a feedback value obtained after the skill is used for execution from the moment t to the moment (t+T), and $\gamma$ represents a discount factor (discount factor). A value interval of $\gamma$ ranges from 0 to 1, and may be specifically a continuous value. In actual implementation, a value of $\gamma$ may approximate to 1, $S_{t+1}$ represents environment status information at the moment (t+T), $V_{\pi_h}$ represents a status value function of a neural network, and KL divergence (kullback-leibler divergence, KL divergence) represents a measure of how one probability distribution is different from other probability distribution, and is used to limit a variation between two training operations, $\beta$ represents a hyperparameter of the KL divergence, and is used to control a magnitude of the limit.

It should be understood that the foregoing example of the loss function of the first neural network is merely used to prove implementability of this solution. When another type of reinforcement learning algorithm is used for the first neural network, another loss function is correspondingly selected. A specific representation form of the loss function of the first neural network is not limited herein.

It should be noted that a relationship between a quantity of execution times of step 303 and a quantity of execution times of step 304 is not limited in this embodiment of this application. Step 304 may be performed once after step 303 is performed at least twice. That is, after the first task is performed at least twice by using the first neural network, it is determined whether the loss function of the first neural network is converged. Alternatively, step 304 may be directly performed after step 303 is performed once.

305. The server trains, based on the simulated environment corresponding to the first task, the first neural network by using a reinforcement learning algorithm.

In some embodiments of this application, if it is determined, by performing step 304, that the loss function of the first neural network is not converged, the first neural network is trained, a plurality of times based on the simulated environment corresponding to the first task, by using the reinforcement learning algorithm. A quantity of times the first neural network is trained by the server shall be determined with reference to an actual situation, and is not limited herein. Specifically, in a process in which the server trains, based on the simulated environment corresponding to the first task, the first neural network once by using the reinforcement learning algorithm, the server first completes the first task by using at least one skill selected by using the first neural network. In a process in which the server controls the intelligent device to execute the first task, the server obtains data for executing the first task by the intelligent device, and updates the parameter of the first neural network by using a third reinforcement learning algorithm.

More specifically, the server inputs the environment status information into the first neural network, to obtain a skill selected by using the first neural network, where the environment status information includes the status information of the intelligent device and the information about the surrounding environment of the intelligent device in the simulated environment corresponding to the first task; and obtains the control instruction by using the skill that is selected by using the first neural network and that is used for executing the first task. Then, the intelligent device may be controlled, in the simulator, to perform an operation corresponding to the control instruction. In an execution process, the server performs, at an interval of preset duration, an execution status obtaining operation once for the skill selected by using the first neural network, until the execution status of the skill selected by using the first neural network is "end". The server obtains data generated in a process in which the intelligent device performs the operation corresponding to the control instruction. The data includes any one or more pieces of information of an operation path, an operation speed, or an operation destination of the intelligent device. The server updates the parameter of the first neural network based on the data by using the third reinforcement learning algorithm. Concepts of the intelligent device, the preset duration, and the execution status are all described in detail in the foregoing descriptions, and details are not described herein again. In this embodiment of this application, the server determines, by obtaining once at an interval of preset duration the execution status of the skill selected by using the first neural network, whether execution of the skill selected by using the first neural network ends, so that the server can iteratively update a new skill policy and a parameter of a new skill in a timely manner based on operation behavior information of the intelligent device. This helps improve accuracy of a training process.

Further, the server obtains, based on the data generated in the process in which the intelligent device performs the operation corresponding to the control instruction, a feedback value (R) obtained in a process in which the intelligent device performs once the operation corresponding to the skill selected by using the first neural network; determines a dominant function and a loss function of the first neural network based on the third reinforcement learning algorithm; and substitutes the feedback value (R) into the dominant function of the first neural network, to obtain a function value of the loss function of the first neural network based on a function value of the dominant function of the first neural network. In this way, the parameter of the first neural network is updated in a gradient manner based on the function value of the loss function of the first neural network. The third reinforcement learning algorithm may be a proximal policy optimization (PPO) algorithm, a trust region policy optimization (TRPO) algorithm, a temporal-difference (TD) algorithm, another on-policy reinforcement learning algorithm, or the like; and is not specifically limited herein. Because the dominant function and the loss function that are used by the first neural network when the third reinforcement learning algorithm is a PPO algorithm have been described in detail in step 304, no examples are described herein again.

306. The server determines whether the loss function of the first neural network can be converged; and if the loss function of the first neural network cannot be converged, re-performs step 302; or if the loss function of the first neural network can be converged, obtains the mature first neural network.

In some embodiments of this application, because in some implementations, the first neural network is obtained by performing training based on a simulated environment corresponding to the second task, in a process in which the server trains the first neural network based on the simulated environment corresponding to the first task, the loss function of the first neural network may not be converged. Specifically, for example, when implementations of the first task and the second task differ greatly, the loss function of the first neural network may not be converged. For example, both the first task and the second task are applied to the self-driving field, the first task is driving out of a roundabout, and the second task is driving out of a toll station. In this case, the server trains, based on a simulated environment corresponding to the driving out of the roundabout, the first neural network (a neural network obtained by performing training based on a simulated environment corresponding to the driving out of a toll station) again by using a reinforcement learning algorithm; consequently, there may be a possibility that the loss function of the first neural network cannot be converged. Certainly, in other cases, there is also a possibility that the loss function of the first neural network cannot be converged. The other cases are not listed one by one herein.

In this case, in the process of training the first neural network, the server may determine whether the loss function of the first neural network can be converged. If the loss function of the first neural network cannot be converged, the server may abandon the first neural network whose loss function cannot be converged, and re-perform step 302, so that the server can select a new first neural network by performing step 302. If the loss function of the first neural network can be converged, the server trains the first neural network until the convergence condition of the loss function of the first neural network is met, so that the mature first neural network can be obtained. Specifically, the server may determine, based on a function value trend of the loss function of the first neural network, whether the loss function of the first neural network can be converged. If function values of the loss function of the first neural network are randomly distributed, it may be considered that the loss function of the first neural network cannot be converged, and the server may perform step 301 to obtain a new first neural network. If function values of the loss function of the first neural network presents a stable rising trend or falling trend, the first neural network may be trained until the convergence condition of the loss function of the first neural network is met, so that the mature first neural network can be obtained.

It should be understood that step 302 to step 306 are optional steps. If the first neural network is obtained by performing training based on the simulated environment corresponding to the second task, step 307 may be directly performed after step 301 is performed. If the first neural network is a neural network obtained through initialization performed by the server by using the first task as a target, none of step 303, step 304, and step 306 may be performed. Instead, after step 302 is performed, the first neural network is directly trained by performing step 305, until the convergence condition of the loss function of the first neural network is met. In this case, the mature first neural network is obtained. When the first neural network is a neural network obtained by performing training based on the simulated environment corresponding to the second task, the obtained first neural network may not be suitable for executing the first task. A neural network whose loss function has not been converged is unstable; consequently, a subsequent task execution process is instable. Therefore, removing the first neural network whose loss function cannot be converged, that is, an unstable neural network, helps improve security of a finally obtained neural network, that is, improve security of an intelligent product on which a neural network is run.

307. The server obtains a first success rate of completing the first task by using the first neural network.

In this embodiment of this application, after obtaining the first task, the server needs to obtain the first success rate of completing the first task by using the first neural network. Further, if step 302 to step 306 are all performed, step 307 may specifically include: obtaining a success rate of completing the first task by using the mature first neural network, and using the success rate as the first success rate.

Specifically, in an implementation, the server may input the environment status information into the first neural network, to obtain a skill selected by using the first neural network, where the environment status information includes the status information of the intelligent device and the information about the surrounding environment of the intelligent device in the simulated environment corresponding to the first task; obtain the control instruction by using the skill selected by using the first neural network, to control the intelligent device to execute the first task; repeat the foregoing steps until a quantity of times the first task is completed by using the first neural network reaches a first quantity of times; count a quantity of times a result of completing the first task is a success in the first quantity of times, to obtain a second quantity of times; and calculate the first success rate based on the first quantity of times and the second quantity of times. Results of completing the first task include a success and a failure. For example, the first task is to drive an automobile from an intersection of a crossroad to another intersection. In this case, when the automobile safely travels out of the correct intersection, it is considered that the result is a success; or if the automobile collides with another automobile, leaves a road, travels out of a wrong intersection, or the like when passing through the crossroad, it is considered that the result is a failure. A value of the first quantity of times may be determined with reference to factors such as processing efficiency of the simulator and a degree of complexity of the first task. For example, the value of the first quantity of times may be 500, 600, or another value. It should be understood that the example herein is merely for ease of understanding.

More specifically, a specific implementation in which the server completes the first task by using the first neural network each time is similar to step 303, and details are not described herein again. After obtaining the second quantity of times, the server may calculate a percentage of the second quantity of times in the first quantity of times, and may further determine the percentage of the second quantity of times in the first quantity of times as the first success rate. Alternatively, there may be a mapping relationship between a percentage of the second quantity of times in the first quantity of times and the first success rate, and then the server determines the first success rate based on the percentage of the second quantity of times in the first quantity of times and the mapping relationship. In this implementation, the simulator may be disposed on the server. In an experiment process, the server controls, in the simulator by using the first neural network, the intelligent device to repeatedly execute the first task. In other words, the first success rate is obtained by restoring a real scenario, to improve accuracy of the first success rate.

In another implementation, the first neural network is obtained by performing, based on the simulated environment corresponding to the second task, training by using the third reinforcement learning algorithm, and semantic information of the first task is similar to semantic information of the second task. That the server obtains the first success rate of completing the first task by using the first neural network includes: The server obtains the semantic information of the first task, obtains the semantic information of the second task, and obtains the first success rate based on a similarity between the semantic information of the first task and the semantic information of the second task. A higher similarity indicates a higher first success rate.

More specifically, in an implementation, after obtaining the first task and the second task, the server may separately obtain the semantic information of the first task and the semantic information of the second task by using the neural network, and generate the similarity between the first task and the second task based on the semantic information of the first task and the semantic information of the second task. In another implementation, after obtaining the first task and the second task, the server may further decompose the first task to obtain at least one constraint, decompose the second task to obtain at least one constraint, and determine the similarity between the semantic information of the first task and the semantic information of the second task by comparing all constraints of the first task and the second task one by one. For example, the first task is to drive an automobile out of a roundabout, where a traffic volume at an entrance of the roundabout is one automobile every 5 seconds, and the automobile can travel in any lane of the roundabout, that is, can change lanes. The second task is to drive an automobile out of a roundabout, where a traffic volume at an entrance of the roundabout is one automobile every 2.5 seconds, and the automobile can change lanes. Constraints obtained after the first task is decomposed are driving out of the roundabout, a traffic volume of one automobile every 5 seconds, and a lane changing function. Constraints obtained after the second task is decomposed are driving out of the roundabout, a traffic volume of one automobile every 2.5 seconds, and a lane changing function. In this case, all the constraints of the first task and all the constraints of the second task may be compared to determine the similarity between the semantic information of the first task and the semantic information of the second task, and the like. Certainly, the similarity between the semantic information of the first task and the semantic information of the second task may be determined in another manner. Examples are not listed one by one herein. After obtaining the similarity between the semantic information of the first task and the semantic information of the second task, the server may generate the first success rate based on the similarity. A higher similarity indicates a higher first success rate. Specifically, the server may directly determine the similarity between the first task and the second task as the first success rate. Alternatively, there may be a mapping relationship between the similarity and the first success rate; in this case, after the similarity is obtained, the first success rate may be determined based on the mapping relationship between the similarity and the first success rate. In this implementation, the first success rate of completing the first task by using the first neural network is determined by obtaining the similarity between the semantic information of the first task and the semantic information of the second task. In this way, still another implementation of obtaining the first success rate is provided, and an application scenario of this solution is extended. In addition, in this manner, the first task no longer needs to be executed repeatedly by using the first neural network, thereby improving efficiency of obtaining the first success rate.

308. The server determines whether the first success rate is greater than or equal to a preset threshold; and if the first success rate is greater than or equal to the preset threshold, performs step 309; or if the first success rate is less than the preset threshold, performs step 311.

In this embodiment of this application, the preset threshold is set on the server. After obtaining the first success rate, the server may determine whether the first success rate is greater than or equal to the preset threshold. If the first success rate is greater than or equal to the preset threshold, the server performs step 309; or if the first success rate is less than the preset threshold, the server performs step 312. The preset threshold on the server may be expressed as $1-\varepsilon$. A value of $\varepsilon$ approximates to 0 but is not equal to 0. For example, the preset threshold may be 99%, 98%, another value, or the like, and is not specifically limited herein.

309. The server determines the first neural network as a neural network used to complete the first task.

In some embodiments of this application, when determining that the first success rate is greater than or equal to the preset threshold, it proves that the first neural network can directly execute the first task, so that the server can determine the first neural network as the neural network used to execute the first task, and determine the skill library as a skill library used to execute the first task.

310. The server stores the first neural network and the skill library.

In some embodiments of this application, after determining the first neural network as the neural network used to complete the first task, and determining the skill library as the skill library used to complete the first task, the server may store the first neural network and the skill library, and further configure the first neural network and the skill library on the intelligent device that executes the first task. The intelligent device is the intelligent product described in the embodiment corresponding to FIG. 1. Specifically, the server may send the first neural network and the skill library to the intelligent product in a wireless manner. Alternatively, before delivery, the intelligent device may be connected to the server in a wired manner, and the server configures the first neural network and the skill library on the intelligent device. Alternatively, the server may store the first neural network and the skill library into a removable storage device, for example, Bluetooth or a removable hard disk, so that the first neural network and the skill library can be configured on the intelligent device through the removable storage device. A specific manner is not limited herein. For example, the intelligent device is an intelligent automobile, and the first task is driving out of a roundabout in a self-driving process; in this case, the server may send, to the intelligent automobile, the first neural network and the skill that are used to execute the task of driving out of the roundabout. The example herein is merely for ease of understanding of this solution.

In this embodiment of this application, after obtaining the first task, the server may obtain the first success rate of completing the first task by using the first neural network. When the first success rate is greater than or equal to the preset threshold, the first neural network may be directly determined as the neural network used to execute the first task, and the first neural network and the skill library may be stored, so that the first neural network and the skill library are configured in the intelligent device that executes the first task, thereby improving integrity of this solution. When the first neural network is a neural network obtained by performing training based on the simulated environment corresponding to the second task, an upper-layer neural network and a lower-layer skill library are reused, so that a neural network training time is reduced, training resources are saved, and neural network training efficiency is greatly improved.

311. The server obtains a second neural network and a new skill, and adds the new skill to the skill library, to obtain an updated skill library.

In some embodiments of this application, when the server determines that the first success rate is less than the preset threshold, it is proved that the first neural network cannot be used directly to complete the first task, that is, skills in the skill library cannot be used to successfully complete the first task; in this case, the server can generate the new skill, and add the new skill to the skill library to obtain the updated skill library. The new skill is specifically a neural network. A type of the neural network corresponding to the new skill needs to be determined based on a data type of the environment status information. For details, refer to the foregoing descriptions of the type of the neural network of the skill in the skill library. Details are not described herein. After determining the network type of the new skill, the server generates the new skill. For example, the second task is to drive an automobile out of a roundabout, where a traffic volume at an entrance of the roundabout is one automobile every 5 seconds, and the automobile can only travel in the outer lane of the roundabout, that is, cannot change lanes. The first task is to drive an automobile out of the roundabout, a traffic volume at the entrance of the roundabout is one automobile every 5 seconds, and the automobile can travel in any lane of the roundabout, that is, can change lanes. In this case, the new skill may be specifically a lane changing skill. The example herein is not used to limit this solution.

Correspondingly, because a quantity of skills in the skill library increases, the original first neural network is not enough to implement a selection operation for the skills in the new updated skill library. The server needs to generate a new second neural network. The second neural network is used to select, from the updated skill library, a skill used to complete the first task. A neural network type of the second neural network is the same as a network type of the first neural network, and details are not described herein. However, a quantity of skills in the updated skill library is greater than a quantity of skills in the skill library that is not updated. In other words, a quantity of to-be-processed objects of the second neural network is greater than a quantity of to-be-processed objects of the first neural network. Therefore, a quantity of output channels at an output layer of the second neural network is greater than a quantity of output channels at an output layer of the first neural network, and there is a high probability that a quantity of parameters of the second neural network is greater than a quantity of parameters of the first neural network. The skill selected by using the second neural network may be specifically the new skill, or may not be the new skill.

312. The server initializes a parameter of the second neural network by using the parameter of the first neural network.

In some embodiments of this application, after generating the second neural network, the server may obtain the parameter of the first neural network, and initialize a parameter of the second neural network by using the parameter of the first neural network. Specifically, because a quantity of parameters of the second neural network may be greater than a quantity of parameters of the first neural network, the server may initialize some parameters of the second neural network by using the parameter of the first neural network, and initialize a parameter that exists in the second neural network but does not exist in the first neural network. Further, when the first neural network is a neural network obtained by performing training based on the simulated environment corresponding to the second task, in the foregoing manner, the parameter of the second neural network is initialized by using the parameter of the first neural network that has been obtained through training, so that a capability learned by the first neural network can be directly inherited. In this way, a process of training the second neural network is shortened, and efficiency of training the second neural network is improved.

It should be understood that step 312 is an optional step. If step 312 is not performed, after the second neural network is generated, the parameters of the second neural network may not be initialized by using the parameter of the first neural network, and all the parameters of the second neural network are directly initialized.

313. The server trains, based on the simulated environment corresponding to the first task, the second neural network by using a reinforcement learning algorithm, until a second success rate of completing the first task by using the second neural network is greater than or equal to the preset threshold.

In some embodiments of this application, after initializing the second neural network and the new skill, the server needs to train, based on the simulated environment corresponding to the first task, the second neural network by using a first reinforcement learning algorithm, until a loss function of the second neural network meets a convergence condition. Then, the server determines, based on the second success rate of completing the first task by using the second neural network, whether the second success rate is greater than or equal to the preset threshold. Optionally, when selecting, from the updated skill library by using the second neural network, the skill used to complete the first task, the server may determine whether the skill selected by using the second neural network is a new skill; therefore, when the skill selected by using the second neural network is a new skill, the server may further iteratively train, based on the simulated environment corresponding to the first task, the new skill by using a second reinforcement learning algorithm. In this case, after both the loss function of the second neural network and a loss function of the new skill meet the convergence condition, the server may obtain the second success rate of completing the first task by using the second neural network, and determine whether the second success rate is greater than or equal to the preset threshold. A specific implementation in which the server selects, from the updated skill library by using the second neural network, the skill used to complete the first task is similar to a specific implementation in which the server selects the skill from the skill library by using the first neural network. A difference only lies in that a quantity of skills in the updated skill library is greater than a quantity of skills in the skill library. Therefore, for a specific implementation, refer to the foregoing descriptions. Details are not described herein again.

If the second success rate is greater than or equal to the preset threshold, the server determines the trained mature second neural network as the neural network used to execute the first task, and then may perform step 314. If the second success rate is less than the preset threshold, re-performs step 312. To be specific, the server generates a new skill and a new second neural network again; adds the new skill to the updated skill library to obtain a new updated skill library; initializes and trains the new second neural network and the new skill until both a loss function of the new second neural network and a loss function of the new skill meet a convergence condition; obtains again a second success rate of executing the second task by using the new second neural network; determines again whether the second success rate is greater than or equal to the preset threshold; and if the second success rate is greater than or equal to the preset threshold, performs step 314; or if the second success rate is less than the preset threshold, performs step 312 again. The foregoing steps are repeatedly performed until the second success rate of completing the first task by using the second neural network is greater than or equal to the preset threshold. In this case, a final second neural network and the updated skill library corresponding to the final second neural network are obtained.

In this embodiment of this application, a process in which the server trains the second neural network may include: The server trains the second neural network once. Specifically, the server inputs the environment status information into the second neural network, to obtain a skill selected by using the second neural network, where the environment status information includes the status information of the intelligent device and the information about the surrounding environment of the intelligent device in the simulated environment corresponding to the first task; obtains a control instruction by using the skill selected by using the second neural network, to control the intelligent device to execute the first task; obtain data for executing the first task by the intelligent device; and update, based on the obtained data for executing the first task by the intelligent device, the parameters of the second neural network by using the first reinforcement learning algorithm. In this embodiment of this application, a specific implementation in which the server trains the second neural network is provided, thereby improving executability of this solution. A specific implementation in which the server trains the second neural network once is similar to a specific implementation in which the server trains the first neural network once. A difference lies in that a to-be-processed object for the former is the first neural network, while a to-be-processed object for the latter is the second neural network. For the specific implementation in which the server trains the second neural network once, refer to the descriptions in step 305. Details are not described herein again.

Further, when this embodiment of this application is applied to the self-driving field, data generated in a process in which the intelligent device performs an operation corresponding to the control instruction may include a driving speed, a driving path, a driving collision status, a driving destination, other driving behavior information, or the like of the intelligent device. When this embodiment of this application is applied to the freight field, data generated in a process in which the intelligent device performs an operation corresponding to the control instruction may include a carrying path, a carrying speed, a collision status, or other carrying behavior information of the intelligent device. When this embodiment of this application is applied to an intelligent mechanical arm, data generated in a process in which the intelligent device performs an operation corresponding to the control instruction may include any one or more pieces of information of a grabbing path, a grabbing speed, a grabbing destination location of the intelligent device, or the like. In the foregoing manner, specific content of the operation behavior information is further provided, thereby further improving executability of this solution. In addition, specific content of operation behavior information in different fields is provided, thereby improving implementation flexibility of this solution. The first reinforcement learning algorithm may be a proximal policy optimization (PPO) algorithm, a trust region policy optimization (TRPO) algorithm, a temporal-difference (TD) algorithm, another on-policy reinforcement learning algorithm, or the like; and is not specifically limited herein. In the foregoing manner, a specific implementation of the reinforcement learning algorithm used by the second neural network is provided, thereby improving implementability of this solution. In addition, a person skilled in the art has more options, thereby improving implementation flexibility of this solution. In addition, the dominant function and the loss function that are used by the first neural network when the first reinforcement learning algorithm is the PPO algorithm have been described in detail in step 304, and a dominant function and the loss function that are used by the second neural network may also be the same as the dominant function and the loss function that are used by the first neural network. Therefore, no example is provided for description herein.

In a process in which the server trains the second neural network, after selecting, from the updated skill library by using the second neural network, the skill used to execute the first task, the server determines whether the skill selected by using the second neural network is a new skill; and if the skill selected by using the second neural network is a new skill, updates, based on the obtained data for executing the first task by the intelligent device, the parameter of the new skill by using the second reinforcement learning algorithm. When the skill selected by using the second neural network is not a new skill, the server does not update the parameter of the skill selected by using the second neural network. In the foregoing implementation, a comparatively large degree of distinction can be maintained between different skills in the updated skill library, thereby reducing storage redundancy of the updated skill library. In addition, if a parameter that is not a newly generated skill is also updated, an evolution direction of a skill in the updated skill library is out of control. Updating only the newly generated skill helps guide the new skill to learn a skill requirement gap between the first task and the second task.

Specifically, when obtaining data obtained in a process in which the intelligent device executes once a control instruction corresponding to a skill (that is, a new skill) selected by using the second neural network, the server may determine a loss function of the new skill based on a second reinforcement learning algorithm used when the new skill is trained. After obtaining a function value of the loss function of the new skill, the server updates a parameter of the new skill in a gradient manner. The second reinforcement learning algorithm used by the new skill may be an on-policy reinforcement learning algorithm or an off-policy reinforcement learning algorithm, for example, a deep deterministic policy gradient (DDPG) algorithm, a deep Q-network (DQN) algorithm, a PPO algorithm, or a soft actor-critic (SAC) algorithm; and is not specifically limited herein. In the foregoing manner, a specific implementation of the reinforcement learning algorithm used for the new skill is provided, thereby improving implementability of the solution. In addition, a person skilled in the art has more options, thereby improving implementation flexibility of this solution.

That the second reinforcement learning algorithm is a PPO algorithm is used as an example; a dominant function and a loss function that are used for the new skill are used as an example. When the second reinforcement learning algorithm is a PPO algorithm, a loss function used for the new skill is also consistent with the loss function used for the first neural network; therefore, the loss function used for the new skill is not used as an example herein, but a calculation manner of $\hat{A}_t$ in the loss function of the new skill is different from a calculation manner of $\hat{A}_t$ in the loss function of the first neural network. The following describes in detail the calculation manner of $\hat{A}_t$ in the loss function of the new skill, and $\hat{A}_t$ may be obtained by using the following formula:

$$\hat{A}_t = r + \gamma V_{\pi_s}(s_{t+1}) - V_{\pi_s}(s_t).$$

r represents a feedback value obtained after the new skill is used for execution from the moment t to the moment (t+1). r may be directly calculated based on operation behavior information obtained by the server from the moment t to the moment (t+1) when the intelligent device executes an operation corresponding to the new skill, or may be calculated based on the feedback value obtained after the new skill selected by using the second neural network is used for execution from the moment t to the moment (t+T). Herein, if r is calculated based on the feedback value obtained after the new skill selected by using the second neural network is used for execution, a value of r may be a ratio of a function value of a dominant function output by a neural network after the skill selected by using the second neural network is executed from the moment t to the moment (t+T), to T. In this case, after a feedback value (R) obtained in a process in which the intelligent device performs once the operation corresponding to the skill selected by using the second neural network is obtained based on the operation behavior information of the intelligent device, the function value of the dominant function of the neural network output by the neural network when the skill selected by using the second neural network is executed from the moment t to the moment (t+T) may be obtained, r is further obtained, and $\hat{A}_t$ in the loss function used for the new skill is obtained. $S_{t+1}$ represents environment status information at the moment (t+1). Vas represents a status value function of the new skill.

It should be understood that, even if the second reinforcement learning algorithm is still a PPO algorithm, in another implementation, a value of $\hat{A}_t$ may be directly r. When the second reinforcement learning algorithm is another algorithm, the dominant function and the loss function that are used for the new skill may change accordingly. The foregoing manner of calculating the function value of the dominant function used for the new skill is merely used as an example to prove implementability of this solution, but is not used to limit this solution.

Further, a manner in which the server obtains, based on the obtained data for executing the first task by the intelligent device, the feedback value (R) obtained in the process in which the intelligent device performs once the operation corresponding to the skill selected by using the second neural network may be specifically: The server compares each type of information in the operation behavior information of the intelligent device that is obtained from the moment t to the moment (t+T), with an expected status; and if the expected status is satisfied, provides a positive feedback; or if the expectation is not satisfied, provides a negative feedback. Specifically, a positive feedback is provided when an operation path of the intelligent device satisfies an expected operation path, or a negative feedback is provided when an operation path of the intelligent device does not satisfy an expected operation path. A positive feedback is provided when an operation speed of the intelligent device satisfies an expected operation speed, or a negative feedback is provided when an operation speed of the intelligent device does not satisfy an expected operation speed. A positive feedback is provided when an operation destination of the intelligent device satisfies an expected operation destination, or a negative feedback is provided when an operation destination of the intelligent device does not satisfy an expected operation destination. For example, when this embodiment of this application is applied to the self-driving field, a positive feedback is provided when an automobile in a simulator maintains an expected average speed, a positive feedback is provided when the automobile travels along a correct route, a negative feedback is provided when an automobile collision happens, a negative feedback is provided when the automobile leaves a road, a positive feedback is provided when the automobile arrives at a right destination, and so on. For another example, when this embodiment of this application is applied to the freight field, a positive feedback is provided when a carrying robot in a simulator maintains an expected average speed, a positive feedback is provided when the carrying robot runs along a correct route, a negative feedback is provided when a carrying-robot collision happens, a positive feedback is provided when the carrying robot puts goods on a right shelf, and so on. Other application scenarios are not described one by one herein. In addition, if r is directly calculated based on operation behavior information obtained by the server from the moment t to the moment (t+1) when the intelligent device executes the operation corresponding to the new skill, a calculation manner of r is similar to a calculation manner of R, but a difference lies in that R is calculated based on the operation behavior information of the intelligent device obtained from the moment t to the moment (t+T), but r is calculated based on the operation behavior information obtained from the moment t to the moment (t+1). A manner of obtaining r is not described herein again.

314. The server stores the trained second neural network and the updated skill library.

In some embodiments of this application, step 314 is similar to step 309. After determining the second neural network as the neural network used to execute the first task, and determining the updated skill library as the skill library used to execute the first task, the server may store the second neural network and the updated skill library, and may further configure the second neural network and the updated skill library on the intelligent device that executes the first task. For a specific implementation in which the server configures the second neural network and the updated skill library on the intelligent device that executes the first task, refer to the descriptions in step 309. Details are not described herein again.

It should be understood that step 302 to step 306 are all optional steps. If step 302 to step 306 are not performed, step 307 may be directly performed after step 301 is performed. If step 302 to step 306 are performed, when the first neural network is a neural network obtained by performing training based on the simulated environment corresponding to the second task, because the first task and the second task are highly similar in some scenarios, that is, skills used to execute the first task and the second task are basically the same, a condition that the first success rate of completing the first task by using the first neural network is greater than or equal to the preset threshold can be implemented only by performing fine adjustment on the first neural network based on the simulated environment corresponding to the first task. In other words, an objective of executing the first task by using the first neural network can be achieved only by training the first neural network again based on the simulated environment corresponding to the first task. In this way, a probability that the first success rate is greater than or equal to the preset threshold can be increased in a pre-training manner, thereby reducing a probability of generating a new second neural network and a new skill, avoiding an operation of training the second neural network and the new skill, saving resources of the server, and improving neural network and skill generation efficiency.

In this embodiment of this application, after obtaining the first task, the server obtains the first success rate used by the first neural network to complete the first task; generates the second neural network and the new skill when the first success rate is less than the preset threshold; trains, based on the simulated environment corresponding to the first task, the second neural network by using the reinforcement learning algorithm, until the second success rate of completing the first task by using the second neural network is greater than or equal to the preset threshold; and stores the second neural network and the new skill. In a process of learning how to complete the task, the new skills may be incrementally learned to expand the skill library; therefore, dependence on a skill library obtained in a pre-training phase is greatly reduced, that is, requirements for a training environment in the pre-training phase are reduced. In addition, incrementally learning the new skills achieves expandability of the skills in the skill library, so that a capability of completing a new task can be obtained, and a limitation of the current skill learning method is overcome.

2. Application Side

Figure 7:
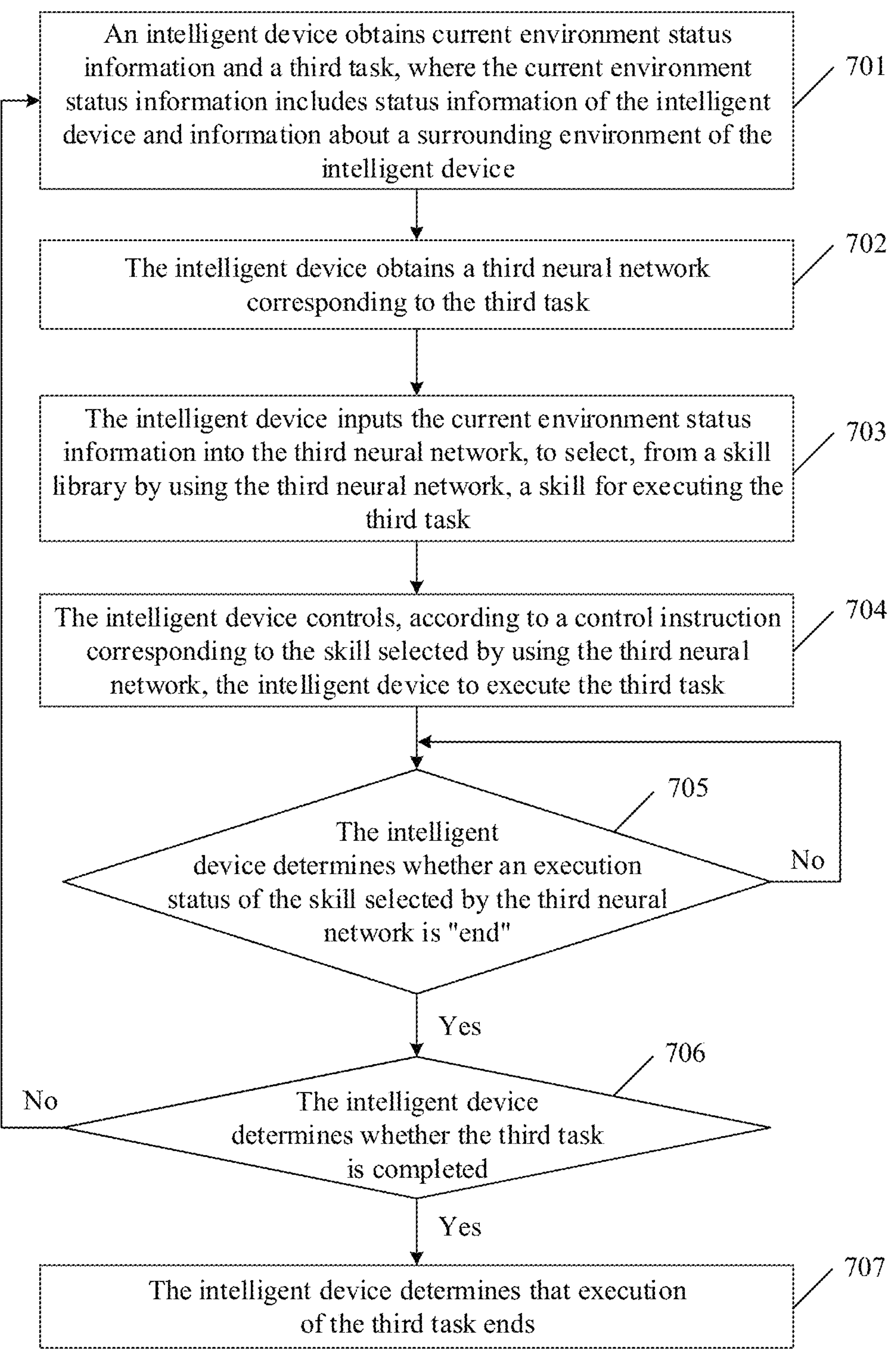
FIG. 7 is another schematic flowchart of a neural network obtaining method according to an embodiment of this application.

FIG. 7 shows an embodiment of a neural network processing method according to an embodiment of this application. The method may include the following steps.

701. An intelligent device obtains current environment status information and a third task, where the current environment status information includes status information of the intelligent device and information about a surrounding environment of the intelligent device.

In this embodiment, an information collection module of the intelligent device may collect the status information of the intelligent device and the information about the surrounding environment of the intelligent device in real time, and a processing module of the intelligent device may determine a first task based on the surrounding environment information. Optionally, map data corresponding to the information about the surrounding environment of the intelligent device may be further configured on the intelligent device, so that the processing module may determine the first task with reference to the collected surrounding environment information and the map data; or a navigation interaction application is configured on the intelligent device, so that the processing module may determine the first task with reference to the collected environment information and map data obtained by the navigation interaction application. Specifically, the intelligent device may perform, once at an interval of preset duration, operations of obtaining current environment status information and determining the first task. For a value of the preset duration, refer to the foregoing embodiment. Details are not described herein again.

More specifically, the third task is a task generated by the processing module of the intelligent device. A difference between the third task, and the first task and the second task lies in that the first task and the second task are tasks determined by a server in a neural network training phase, while the third task is a task determined by the intelligent device when a trained mature neural network is applied. The information collection module may be any type of sensors such as a distance sensor, a speed sensor, or another sensor configured to collect environment information and status information. The processing module may be specifically a main processor, an AI processor, an image processor, or the like in the intelligent device. This is not limited herein. In an example, the intelligent device herein is a vehicle, and a map of a road on which the vehicle travels is configured on the intelligent device. It may be determined, based on map data on the vehicle, that a current task of the vehicle is to exit from an entrance/exit D of a roundabout, a traffic volume on the roundabout is one vehicle every 5 seconds, and current environment status information may include information about road signs along the roundabout, a position for entry of the driving vehicle (for example, an outer lane of an entrance/exit A of the roundabout), information about a lane in which the vehicle is located, a driving speed of a neighboring vehicle, a distance between the driving vehicle or a neighboring vehicle, a speed of the driving vehicle, a driving direction of the driving vehicle, or any one or a combination of a plurality of pieces of information in other current environment status information. The processing module may determine that the first task is to enter the roundabout from the entrance/exit A and exit the roundabout from the entrance/exit D, a traffic volume is one vehicle every 5 seconds, and the vehicle has a lane change requirement. It should be understood that the example herein is merely used to facilitate understanding of this solution, and is not intended to limit this solution.

702. The intelligent device obtains a third neural network corresponding to the third task.

In this embodiment, a plurality of different skill libraries and a neural network corresponding to each skill library may be preconfigured on the intelligent device, and the different skill libraries and neural networks are used to execute different tasks. Therefore, after obtaining the third task, the processing module of the intelligent device may obtain the third neural network corresponding to the third task. The third neural network is configured to select a skill from a skill library. The skill selected by using the third neural network is used to obtain a control instruction for controlling the intelligent device to execute the third task, and both the third neural network and the skill library are configured on the intelligent terminal device after training is performed. For example, five skill libraries and five neural networks that one-to-one correspond to the five skill libraries are configured on the intelligent device, and are used to execute five tasks: automatic parking, driving out of a toll station, driving out of a roundabout, driving out of an overpass, and high-speed driving, respectively. In the case that the third task determined by the processing module of the intelligent device is driving out of a roundabout, the intelligent device needs to obtain a neural network corresponding to the driving out of the roundabout. The example herein is not used to limit this solution.

703. The intelligent device inputs the current environment status information into the third neural network, to select, from the skill library by using the third neural network, the skill for executing the third task.

In this embodiment, after determining the third neural network used to execute the third task, the intelligent device determines the skill library that corresponds to the third neural network. The intelligent device inputs the current environment status information into the third neural network, to obtain a sequence number output by the third neural network and select, from the skill library, a skill indicated by the sequence number. For a specific mapping relationship between the sequence number output by the third neural network and the skill selected by using the third neural network, refer to Table 1. Details are not described herein again.

704. The intelligent device controls, according to the control instruction corresponding to the skill selected by using the third neural network, the intelligent device to execute the third task.

In this embodiment, after obtaining the skill selected by using the third neural network, if the skill selected by using the third neural network is specifically a neural network, the intelligent device needs to input the current environment status information into the skill selected by using the third neural network, to obtain the control instruction that is output based on the skill selected by using the third neural network; or if a sequence number corresponding to the control instruction is output based on the skill selected by using the third neural network, a mapping relationship between a sequence number and an operation rule needs to be preconfigured on the intelligent device. After the sequence number is obtained, an operation rule corresponding to the sequence number is found from the mapping relationship, and then the control instruction for the intelligent device is generated according to the operation rule. For a specific presentation manner of the operation rule, refer to the foregoing embodiment. For the mapping relationship between a sequence number and an operation rule, refer to Table 2. Details are not described herein again. If the skill selected by using the third neural network is specifically an operation rule, the intelligent device may directly generate a control instruction corresponding to the operation rule.

After obtaining the control instruction, the processing module of the intelligent device may control the intelligent device to execute an operation corresponding to the control instruction, so as to execute the third task. Specifically, the third task may be controlling, within T timestamps, the intelligent device to perform the operation corresponding to the control instruction. For example, the control instruction includes controlling a running speed to decrease to 40 m/s. In this case, the processing module of the intelligent device may control an engine of the intelligent device to drive wheels to gradually decrease, within eight timestamps, the running speed of the intelligent device to 40 m/s. It should be understood that the example herein is merely for ease of understanding of this solution.

705. The intelligent device determines whether an execution status of the skill selected by using the third neural network is "end"; and if the execution is completed, performs step 706; or if the execution does not end, re-performs step 705.

In this embodiment, the intelligent device may perform step 705 once at an interval of preset duration, and execution duration of one skill selected by using the third neural network may be T timestamps. Therefore, after the intelligent device starts to perform the operation corresponding to the skill selected by using the third neural network, an operation of obtaining an execution status of the skill selected by using the third neural network is performed once at an interval of preset duration. If the execution ends, step 706 continues to be performed. If the execution does not end, step 705 is re-performed, and the operation of obtaining an execution status of the skill selected by using the third neural network is performed again once at an interval of preset duration, until the execution status of the skill selected by using the third neural network is "end". It should be understood that step 705 is an optional step. If the intelligent device may determine, in another manner, whether execution of the skill ends, step 705 does not need to be performed. After step 704 is performed and it is determined, in another manner, that execution of the skill selected by using the third neural network ends, step 706 may be directly performed.

706. The intelligent device determines whether the third task is completed; and if the third task is not completed, re-performs step 701; or if the third task is completed, performs step 707.

In this embodiment, after determining that execution of a skill selected from the skill library by using the third neural network has ended, the intelligent device needs to determine whether the third task is completed. If the third task is completed, it is determined that an execution process of the third task ends. If the third task is not completed, the intelligent device re-performs step 701, re-obtains current environment status information, and inputs the current environment status information into the third neural network corresponding to the third task, to select a new skill from the skill library by using the third neural network, and further control, according to a control instruction corresponding to the skill selected by using the third neural network, the intelligent device again to execute the third task until the third task is completed by using at least two skills.

Specifically, the intelligent device may determine, based on the current environment status information collected by the information collection module, whether the third task is completed. For example, if the third task is to drive the vehicle out of an entrance/exit C of the roundabout, a current location of the vehicle needs to be determined based on the current environment status information, to determine whether the vehicle has left the entrance/exit C. If the current location of the vehicle indicates that the vehicle has left the entrance/exit C, it is determined that the third task is completed; or if the current location of the vehicle indicates that the vehicle is still in the roundabout, it is determined that the third task is not completed. Other scenarios are not listed herein.

707. The intelligent device determines that execution of the third task ends.

In this embodiment of this application, in the foregoing manner, a specific application manner used when the skill library and a mature neural network obtained by the server through training are applied to the intelligent device is provided, thereby improving integrity of this solution. On a server side, incrementally learning the new skill implements skill expandability of the skill library. In this way, a capability of completing a new task can be obtained, and an application scenario of the intelligent device is extended.

Figure 8:
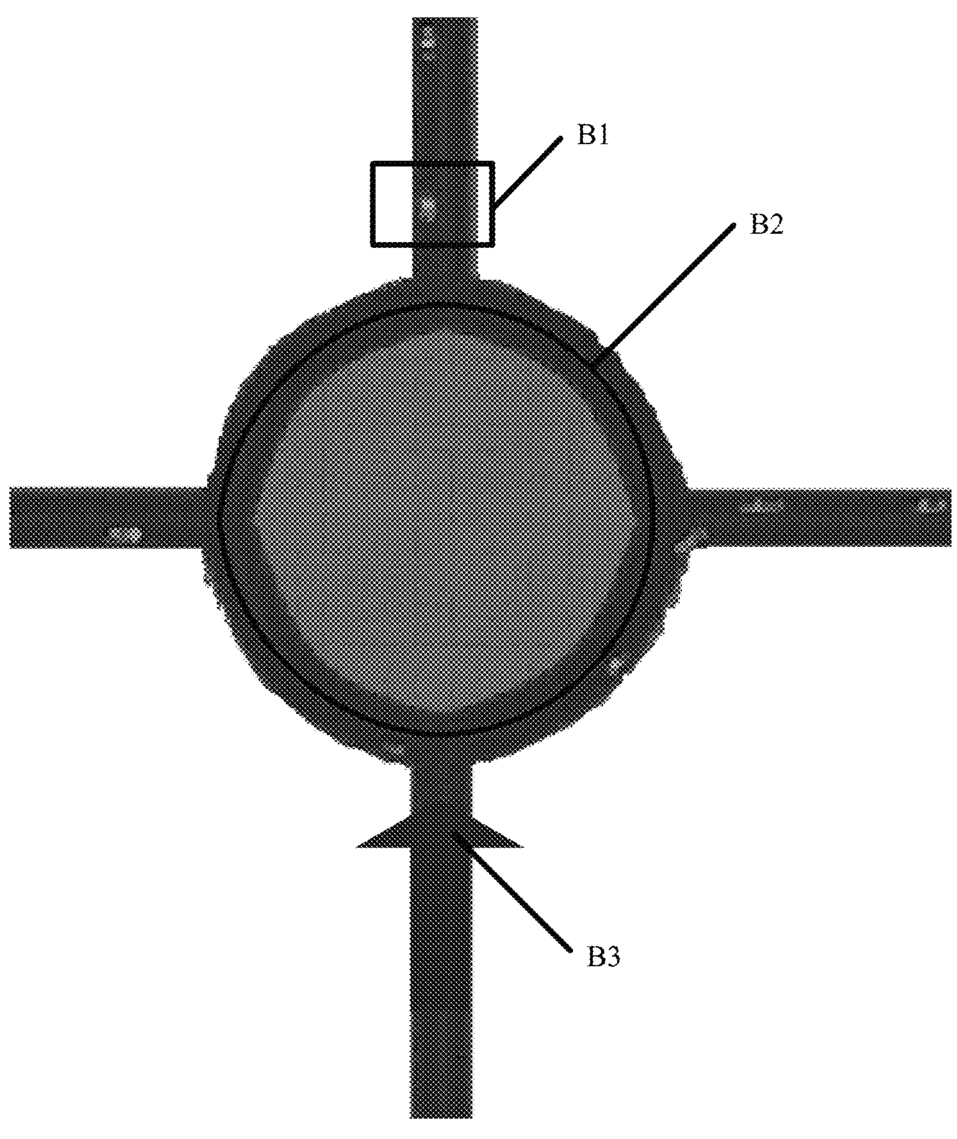
FIG. 8 is a schematic diagram of a driving task in a neural network obtaining method according to an embodiment of this application.
Figure 9:
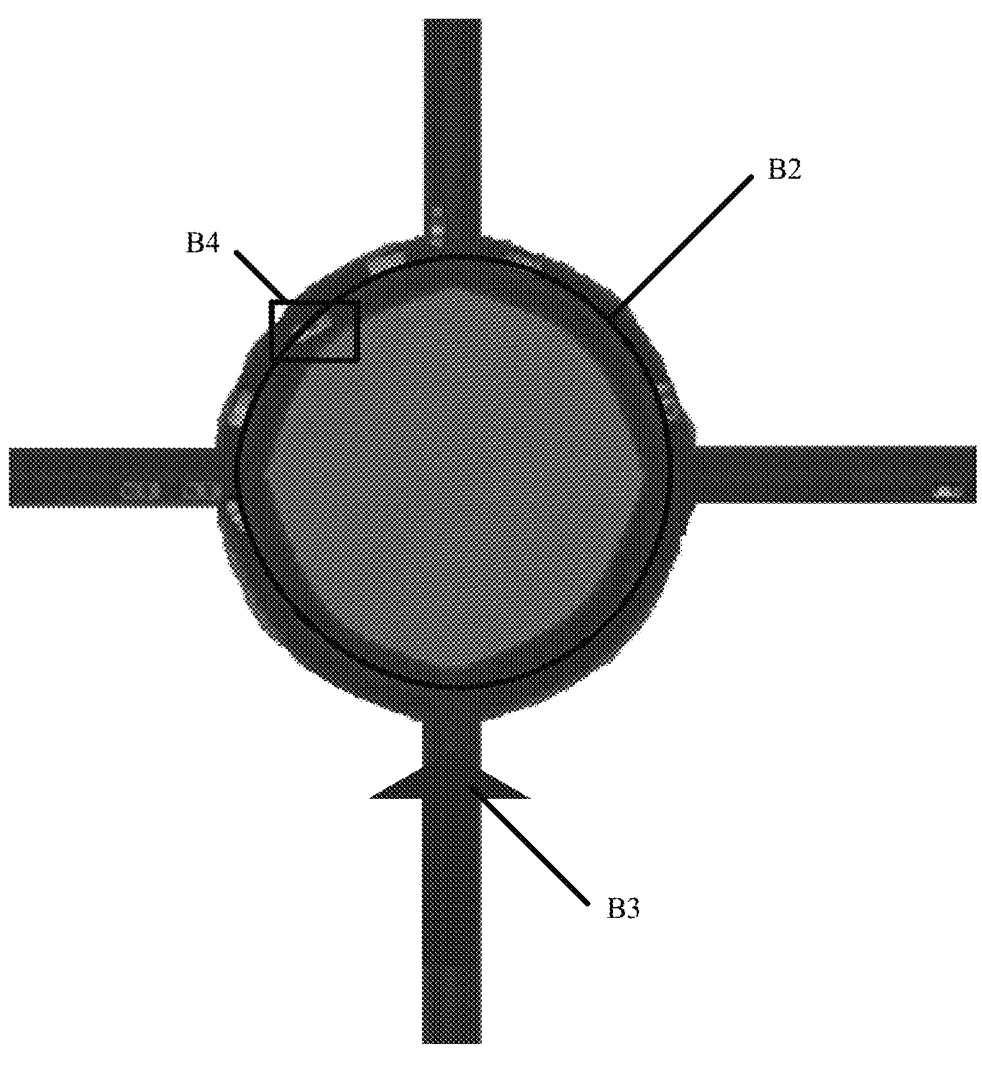
FIG. 9 is another schematic diagram of a driving task in a neural network obtaining method according to an embodiment of this application.
Figure 10:
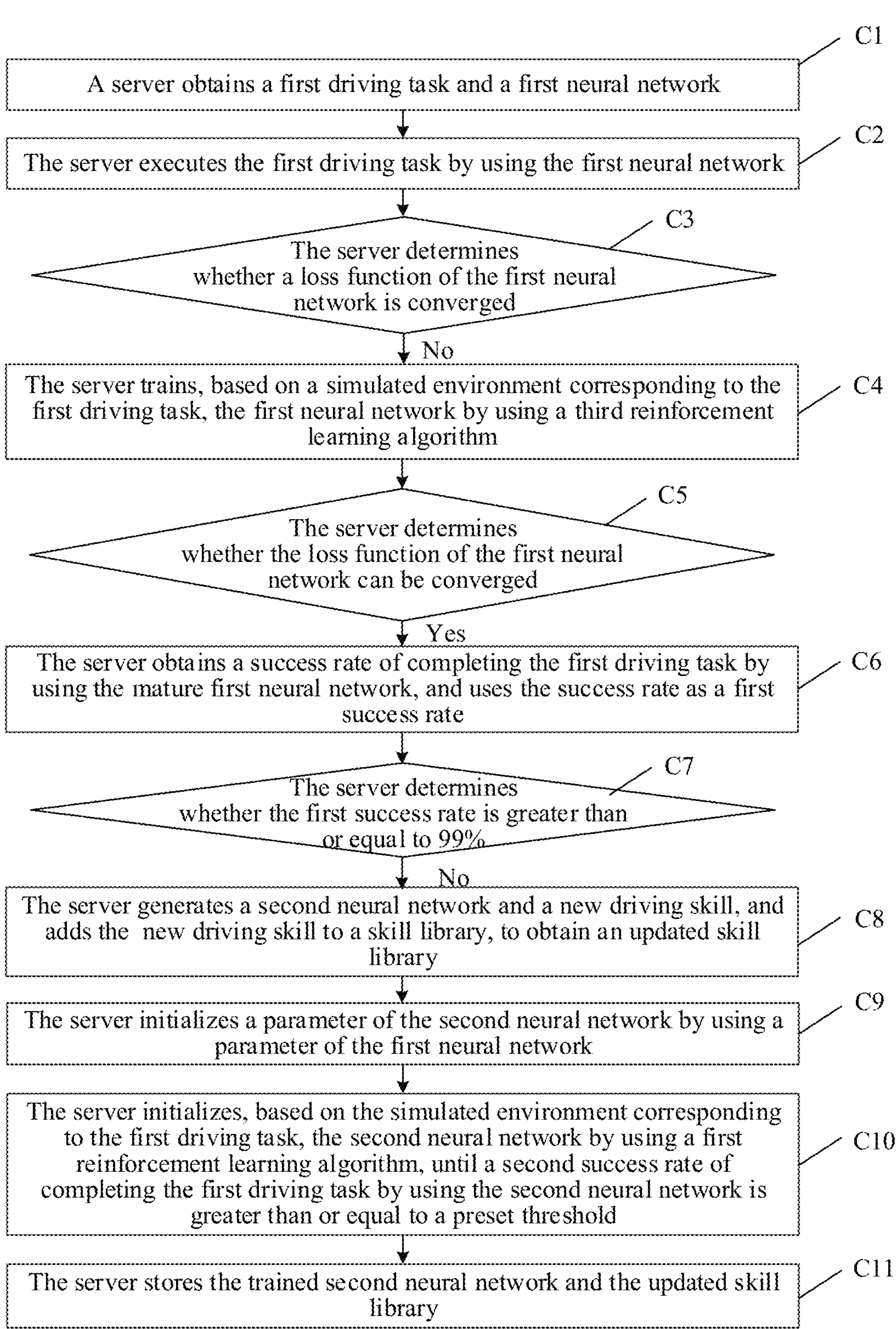
FIG. 10 is still another schematic flowchart of a neural network obtaining method according to an embodiment of this application.

The following uses two specific embodiments as examples to further describe in detail implementations, on a training side, of the neural network obtaining method provided in the embodiments of this application. In the two embodiments, the method is applied to the self-driving field, a first neural network is a neural network obtained through training based on a simulated environment corresponding to a second task, both a first driving task and a second driving task are driving out of a roundabout, and a preset threshold of a success rate is 99%, and constraints for driving out of the roundabout are different. The foregoing content is used as an example for description. In an embodiment, the second driving task is similar to but different from the first driving task. For example, the second driving task is to drive an automobile out of a roundabout, where a traffic volume at an entrance of the roundabout is one automobile every 5 seconds, and the automobile can only travel in the outer lane of the roundabout, that is, cannot change lanes. For details, refer to FIG. 8. In FIG. 8, B1 represents a vehicle traveling in the roundabout, B2 represents a boundary between an outer lane and an inner lane on the roundabout, and B3 represents an entrance of the roundabout. It is not difficult to learn that the vehicles in FIG. 8 are traveling in the outer lane, and a vehicle density of the roundabout shown in FIG. 8 is not very high. For example, the first driving task is to drive an automobile out of a roundabout, where a traffic volume at an entrance of the roundabout is one automobile every 5 seconds, and the automobile can travel in any lane of the roundabout, that is, can change lanes. For details, refer to FIG. 9. The traffic volume in FIG. 9 is similar to that in FIG. 8. However, B4 in FIG. 9 is traveling from the outer lane to the inner lane, that is, the automobile in FIG. 9 can change lanes. FIG. 10 is a schematic flowchart of a neural network obtaining method according to an embodiment of this application. The method may include the following steps.

C1. A server obtains a first driving task and a first neural network.

In this embodiment, both the first neural network and a skill library corresponding to the first neural network are obtained by the server by performing training based on a simulated environment corresponding to a second driving task.

C2. The server executes the first driving task by using the first neural network.

C3. The server determines whether a loss function of the first neural network is converged.

In this embodiment, the server determines whether the loss function of the first neural network is converged, and an obtained determining result is that the loss function of the first neural network is not converged.

C4. The server trains, based on a simulated environment corresponding to the first driving task, the first neural network by using a third reinforcement learning algorithm.

C5. The server determines whether the loss function of the first neural network can be converged.

In this embodiment, the server determines whether the loss function of the first neural network can be converged, and the obtained determining result is that the loss function of the first neural network can be converged. In this case, the first neural network is trained until a mature first neural network is obtained.

C6. The server obtains a success rate of completing the first driving task by using the mature first neural network, and uses the success rate as a first success rate.

C7. The server determines whether the first success rate is greater than or equal to 99%.

In this embodiment, the server determines whether the first success rate is greater than or equal to 99%, and a determining result is that the first success rate is less than 99%.

C8. The server generates a second neural network and a new driving skill, and adds the new driving skill to a skill library, to obtain an updated skill library.

C9. The server initializes a parameter of the second neural network by using a parameter of the first neural network.

C10. The server trains, based on the simulated environment corresponding to the first driving task, the second neural network by using a first reinforcement learning algorithm, until a second success rate of completing the first driving task by using the second neural network is greater than or equal to a preset threshold.

C11. The server stores the trained second neural network and the updated skill library.

In this embodiment, the server obtains the first success rate of completing the first task by using the first neural network. Because the first success rate is less than the preset threshold, the server generates the second neural network and the new driving skill, adds the new driving skill to the skill library to obtain the updated skill library, and further trains the second neural network, until the second success rate of completing the first driving task by using the second neural network is greater than or equal to the preset threshold. Then, the server stores the trained second neural network and the updated skill library. In a process of learning how to complete a task, a new driving skill may be incrementally learned to expand the skill library. Therefore, dependence on a skill library obtained in a pre-training phase is reduced, that is, requirements for a training environment in the pre-training phase are reduced. In addition, incremental learning a new driving skill achieves skill expandability of the skill library and overcomes a limitation of a current skill learning method.

Figure 11:
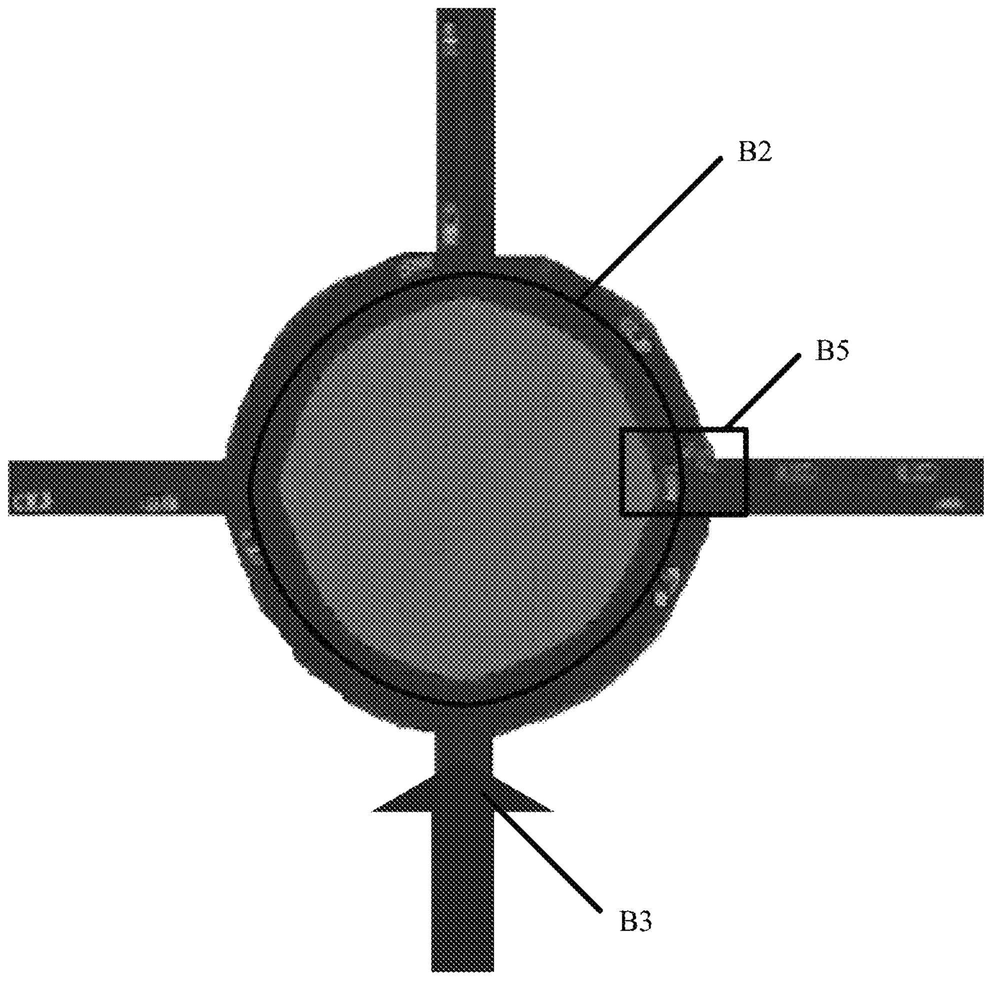
FIG. 11 is still another schematic diagram of a driving task in a neural network obtaining method according to an embodiment of this application.
Figure 12:
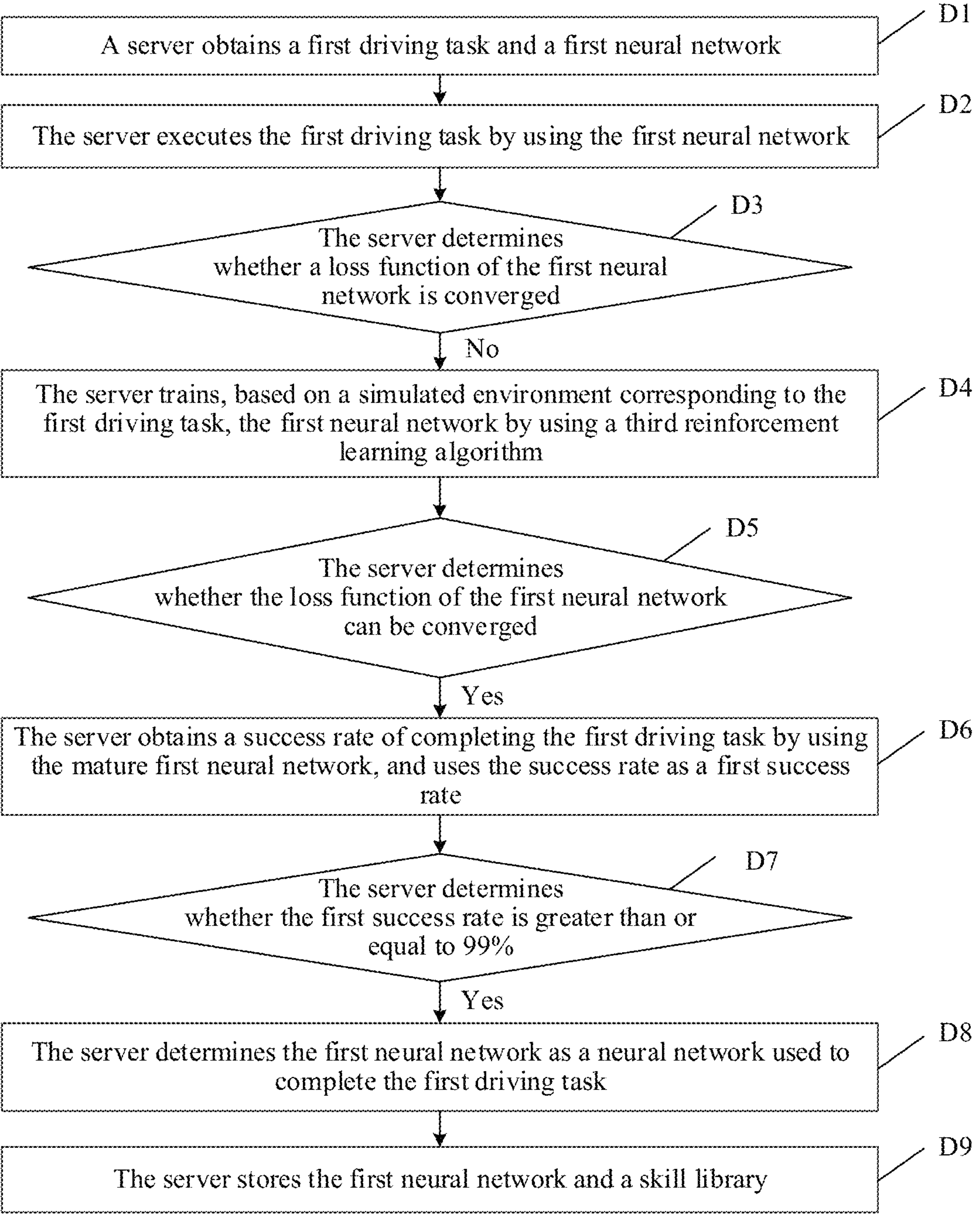
FIG. 12 is yet another schematic flowchart of a neural network obtaining method according to an embodiment of this application.

In another embodiment, the second driving task is similar to but different from the first driving task. For example, the second driving task is to drive an automobile out of a roundabout, where a traffic volume at an entrance of the roundabout is one automobile every 5 seconds, and the automobile can travel in any lane of the roundabout, that is, can change lanes. For details, refer to FIG. 9. For example, the first driving task is to drive an automobile out of a roundabout, where a traffic volume at an entrance of the roundabout is one automobile every 2.5 seconds, and the automobile can travel in any lane of the roundabout, that is, can change lanes. For details, refer to FIG. 11. In B5 in FIG. 11, there are both an automobile traveling in the outer lane and an automobile traveling in the inner lane, that is, can change lanes. In addition, a density of vehicles in FIG. 11 is obviously larger than that in FIG. 9. FIG. 12 is a schematic flowchart of a neural network obtaining method according to an embodiment of this application. The method may include the following steps.

D1. A server obtains a first driving task and a first neural network.

In this embodiment, both the first neural network and a skill library corresponding to the first neural network are obtained by the server by performing training based on a simulated environment corresponding to a second driving task.

D2. The server executes the first driving task by using the first neural network.

D3. The server determines whether a loss function of the first neural network is converged.

In this embodiment, the server determines whether the loss function of the first neural network is converged, and an obtained determining result is that the loss function of the first neural network is not converged.

D4. The server trains, based on a simulated environment corresponding to the first driving task, the first neural network by using a third reinforcement learning algorithm.

D5. The server determines whether the loss function of the first neural network can be converged.

In this embodiment, the server determines whether the loss function of the first neural network can be converged, and the obtained determining result is that the loss function of the first neural network can be converged. In this case, the first neural network is trained until a mature first neural network is obtained.

D6. The server obtains a success rate of completing the first driving task by using the mature first neural network, and uses the success rate as a first success rate.

D7. The server determines whether the first success rate is greater than or equal to 99%.

In this embodiment, the server determines whether the first success rate is greater than or equal to 99%, and a determining result is that the first success rate is greater than 99%.

D8. The server determines the first neural network as a neural network used to complete the first driving task.

D9. The server stores the first neural network and the skill library.

In this embodiment, a similarity between the first task and the second task is very high, and the first neural network is trained again based on the simulated environment corresponding to the first task, so that an objective that the first success rate is greater than or equal to the preset threshold is achieved. Therefore, a pre-training manner can improve a probability that the first success rate is greater than or equal to the preset threshold, thereby reducing a probability of generating the new second neural network and the new skill. In this case, an operation of training the second neural network and the new skill can be avoided, thereby saving resources of the server, and improving neural network and skill generation efficiency.

It should be understood that the foregoing two embodiments are merely used to prove implementability of this solution, but are not intended to limit this solution.

Figure 13A:
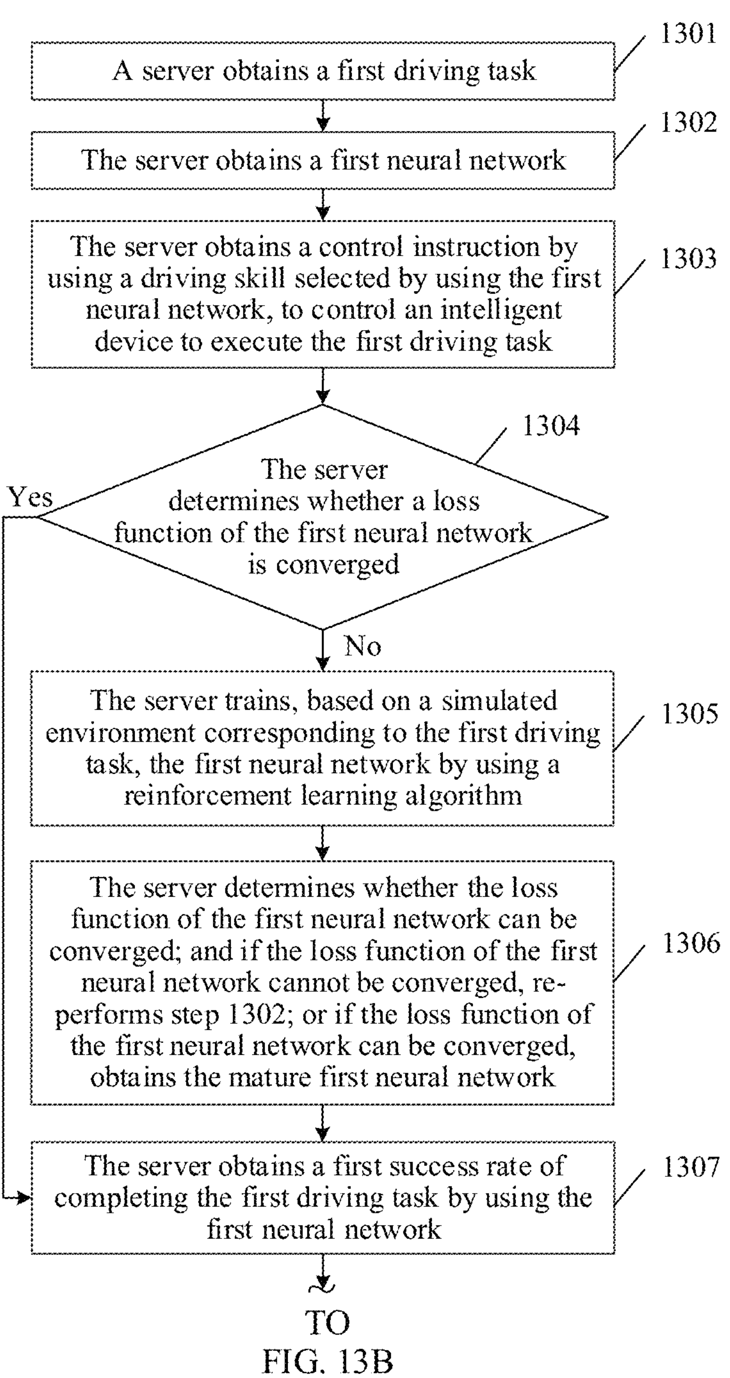
FIG. 13A and FIG. 13B are still yet another schematic flowchart of a neural network obtaining method according to an embodiment of this application.
Figure 13B:
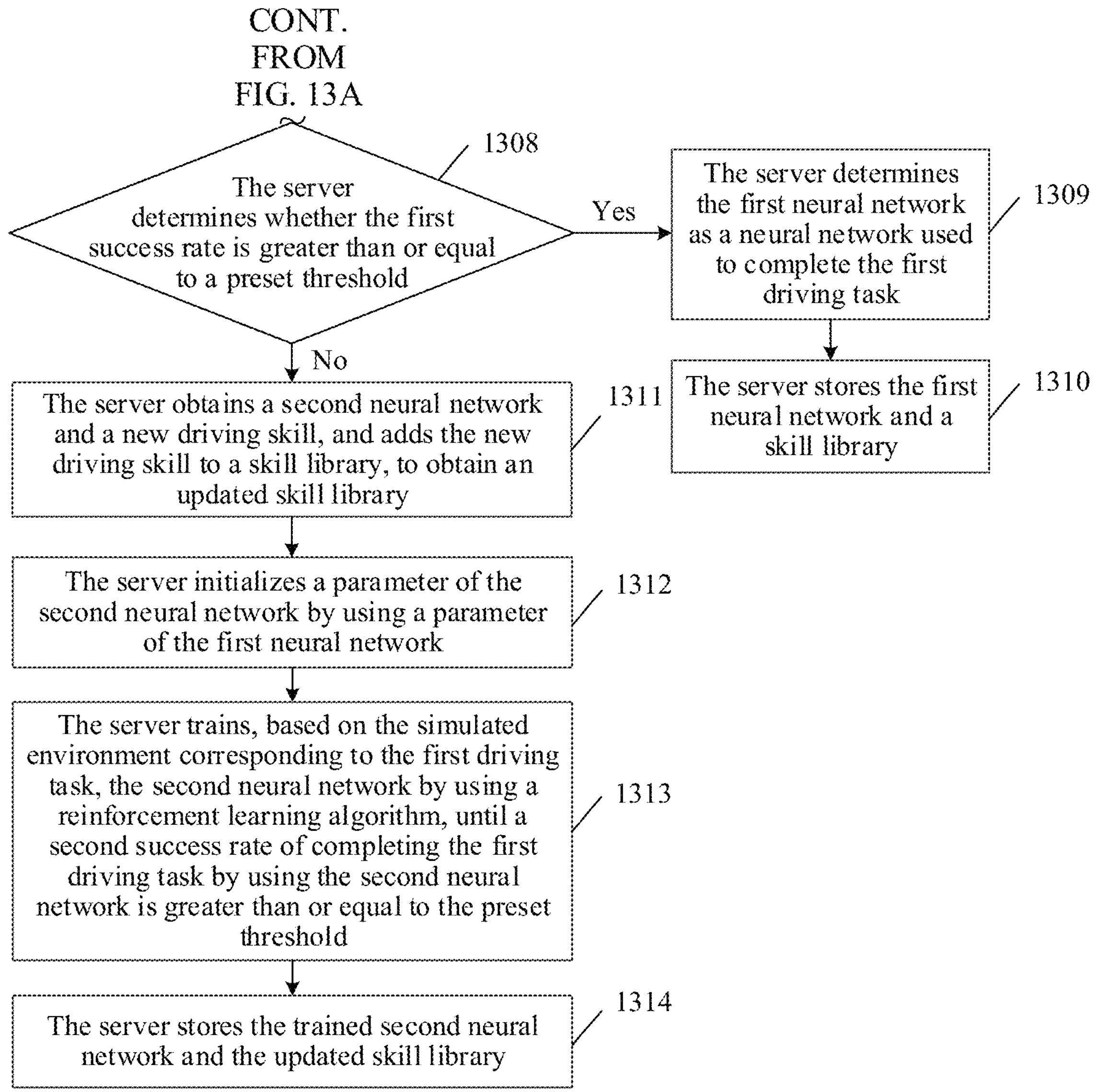

Based on the descriptions of the foregoing embodiments, an embodiment of this application further provides a neural network obtaining method, to show an implementation used when the neural network obtaining method provided in any one of FIG. 3A to FIG. 12 is applied to the self-driving field. FIG. 13A and FIG. 13B are a schematic flowchart of a neural network obtaining method according to an embodiment of this application. The method may include the following steps.

1301. A server obtains a first driving task.

1302. The server obtains a first neural network.

1303. The server obtains a control instruction by using a driving skill selected by using the first neural network, to control an intelligent device to execute the first driving task.

1304. The server determines whether a loss function of the first neural network is converged; and if the loss function is not converged, performs step 1305; or if the loss function is converged, performs step 1307.

1305. The server trains, based on a simulated environment corresponding to the first driving task, the first neural network by using a reinforcement learning algorithm.

1306. The server determines whether the loss function of the first neural network can be converged; and if the loss function of the first neural network cannot be converged, re-performs step 1302; or if the loss function of the first neural network can be converged, obtains the mature first neural network.

1307. The server obtains a first success rate of completing the first driving task by using the first neural network.

1308. The server determines whether the first success rate is greater than or equal to a preset threshold; and if the first success rate is greater than or equal to the preset threshold, performs step 1309; or if the first success rate is less than the preset threshold, performs step 1311.

1309. The server determines the first neural network as a neural network used to complete the first driving task.

1310. The server stores the first neural network and a skill library.

1311. The server obtains a second neural network and a new driving skill, and adds the new driving skill to a skill library, to obtain an updated skill library.

1312. The server initializes a parameter of the second neural network by using a parameter of the first neural network.

1313. The server trains, based on the simulated environment corresponding to the first driving task, the second neural network by using a reinforcement learning algorithm, until a second success rate of completing the first driving task by using the second neural network is greater than or equal to the preset threshold.

1314. The server stores the trained second neural network and the updated skill library.

In this embodiment of this application, step 1301 to step 1314 are similar to step 301 to step 314 in the embodiment corresponding to FIGS. 3A and 3B, but a difference lies in that the driving skill in step 1301 to step 1314 is a hyponym of the skill in the skill library. For specific implementations of step 1301 to step 1314, refer to the descriptions of step 301 to step 314 in FIGS. 3A and 3B. Details are not described herein again.

In this embodiment of this application, in the foregoing manner, in a process of learning how to complete a driving task, the new driving skills may be incrementally learned to expand the driving skill library. Therefore, dependence on a driving skill library obtained in a pre-training phase is greatly reduced, that is, requirements for a training environment in the pre-training phase are reduced. In addition, incrementally learning the new driving skill implements driving-skill expandability of the driving skill library, so that a capability of completing a new driving task can be obtained, and a limitation of a current driving skill learning method is overcome.

Figure 14A:
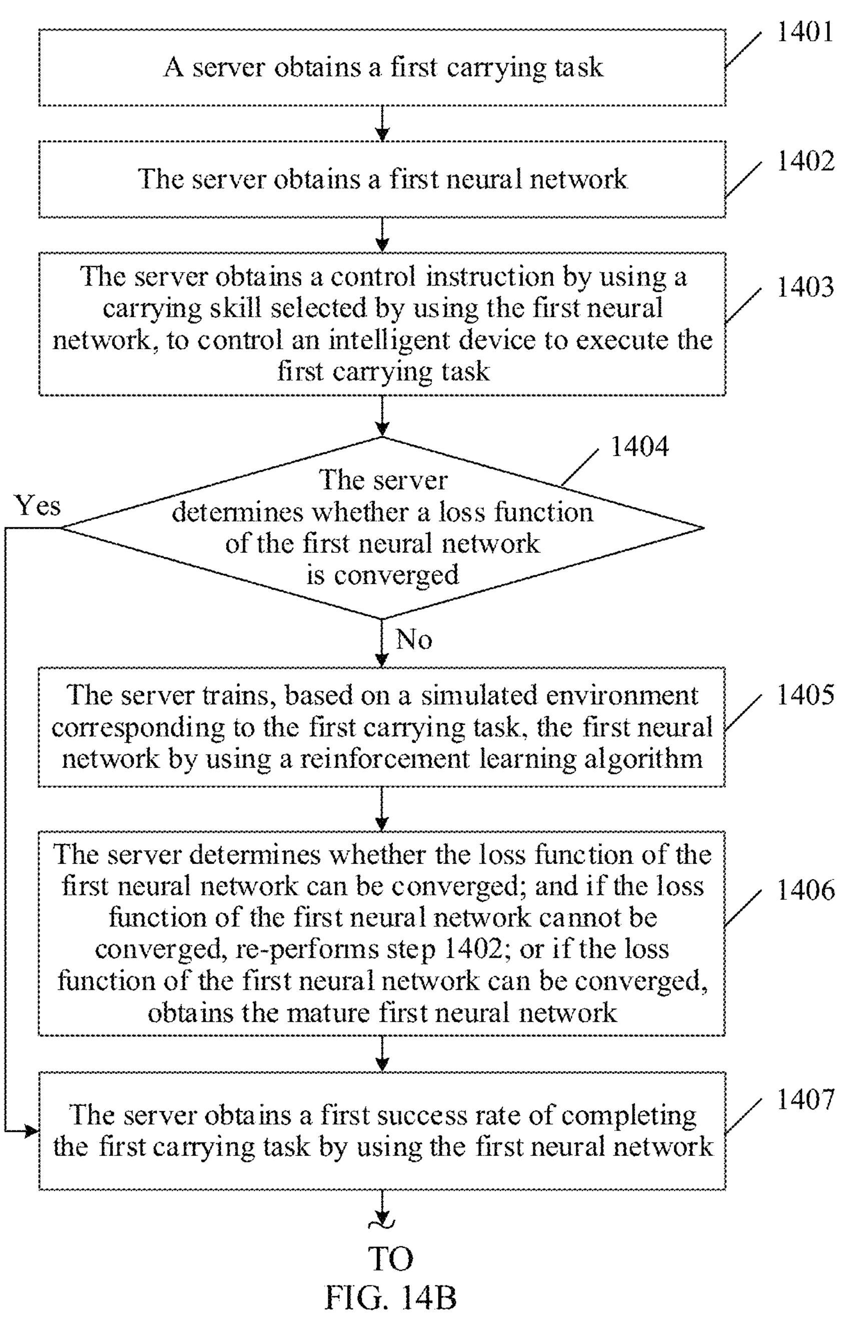
FIG. 14A and FIG. 14B are a further schematic flowchart of a neural network obtaining method according to an embodiment of this application.
Figure 14B:
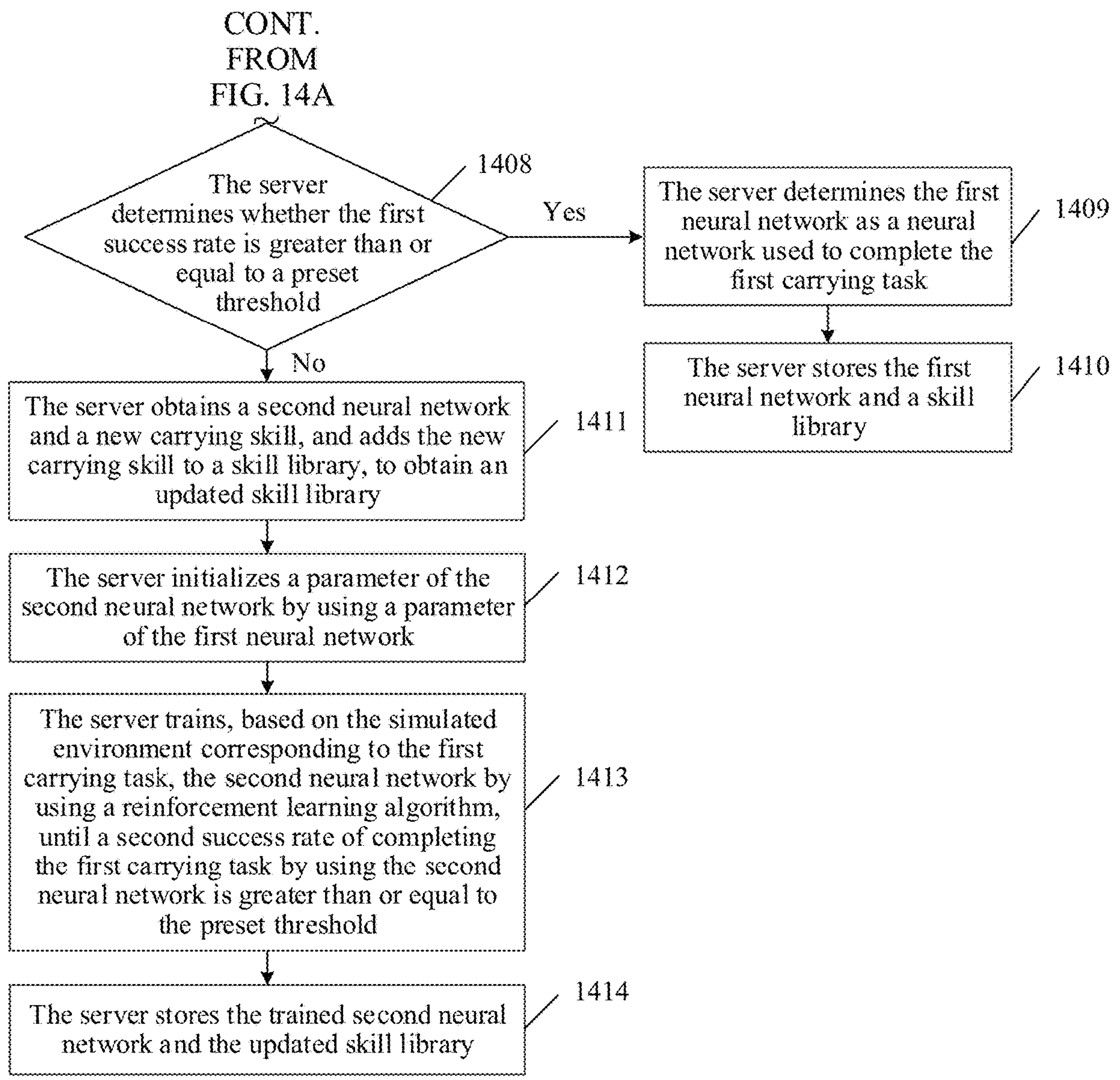

An embodiment of this application further provides a neural network obtaining method, to show an implementation used when the neural network obtaining method provided in any one of FIG. 3A to FIG. 12 is applied to the freight field. FIG. 14A and FIG. 14B are a schematic flowchart of a neural network obtaining method according to an embodiment of this application. The method may include the following steps.

1401. A server obtains a first carrying task.

1402. The server obtains a first neural network.

1403. The server obtains a control instruction by using a carrying skill selected by using the first neural network, to control an intelligent device to execute the first carrying task.

1404. The server determines whether a loss function of the first neural network is converged; and if the loss function is not converged, performs step 1405; or if the loss function is converged, performs step 1407.

1405. The server trains, based on a simulated environment corresponding to the first carrying task, the first neural network by using a reinforcement learning algorithm.

1406. The server determines whether the loss function of the first neural network can be converged; and if the loss function of the first neural network cannot be converged, re-performs step 1402; or if the loss function of the first neural network can be converged, obtains the mature first neural network.

1407. The server obtains a first success rate of completing the first carrying task by using the first neural network.

1408. The server determines whether the first success rate is greater than or equal to a preset threshold; and if the first success rate is greater than or equal to the preset threshold, performs step 1409; or if the first success rate is less than the preset threshold, performs step 1411.

1409. The server determines the first neural network as a neural network used to complete the first carrying task.

1410. The server stores the first neural network and a skill library.

1411. The server obtains a second neural network and a new carrying skill, and adds the new carrying skill to a skill library, to obtain an updated skill library.

1412. The server initializes a parameter of the second neural network by using a parameter of the first neural network.

1413. The server trains, based on the simulated environment corresponding to the first carrying task, the second neural network by using a reinforcement learning algorithm, until a second success rate of completing the first carrying task by using the second neural network is greater than or equal to the preset threshold.

1414. The server stores the trained second neural network and the updated skill library.

In this embodiment of this application, step 1401 to step 1414 are similar to step 301 to step 314 in the embodiment corresponding to FIGS. 3A and 3B, and a difference lies in that, in step 1401 to step 1414, a neural network used to complete a carrying task is a hyponym of the neural network, and the carrying skill is a hyponym of the skill in the skill library. For specific implementations of step 1401 to step 1414, refer to the descriptions of step 301 to step 314 in FIGS. 3A and 3B. Details are not described herein again.

In this embodiment of this application, in the foregoing manner, in a process of learning how to complete a carrying task, a new carrying skill may be incrementally learned to expand a carrying skill library. Therefore, dependence on a carrying skill library obtained in a pre-training phase is greatly reduced, that is, requirements for a training environment in the pre-training phase are reduced. In addition, incrementally learning the new carrying skill implements carrying-skill expandability of the carrying skill library, so that a capability of completing a new carrying task can be obtained, and a limitation of a current carrying skill learning method is overcome.

Figure 15A:
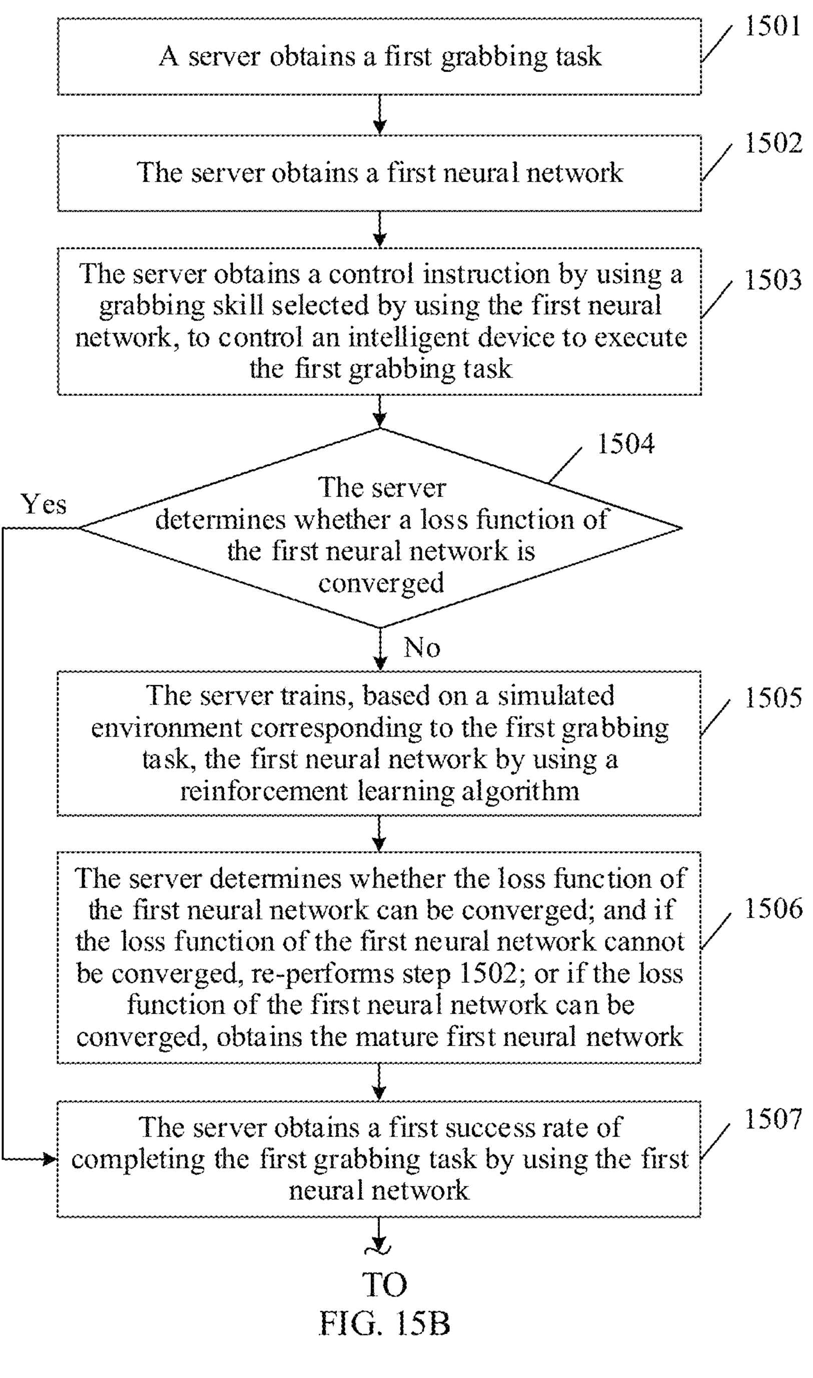
FIG. 15A and FIG. 15B are a still further schematic flowchart of a neural network obtaining method according to an embodiment of this application.
Figures 15B, 16:
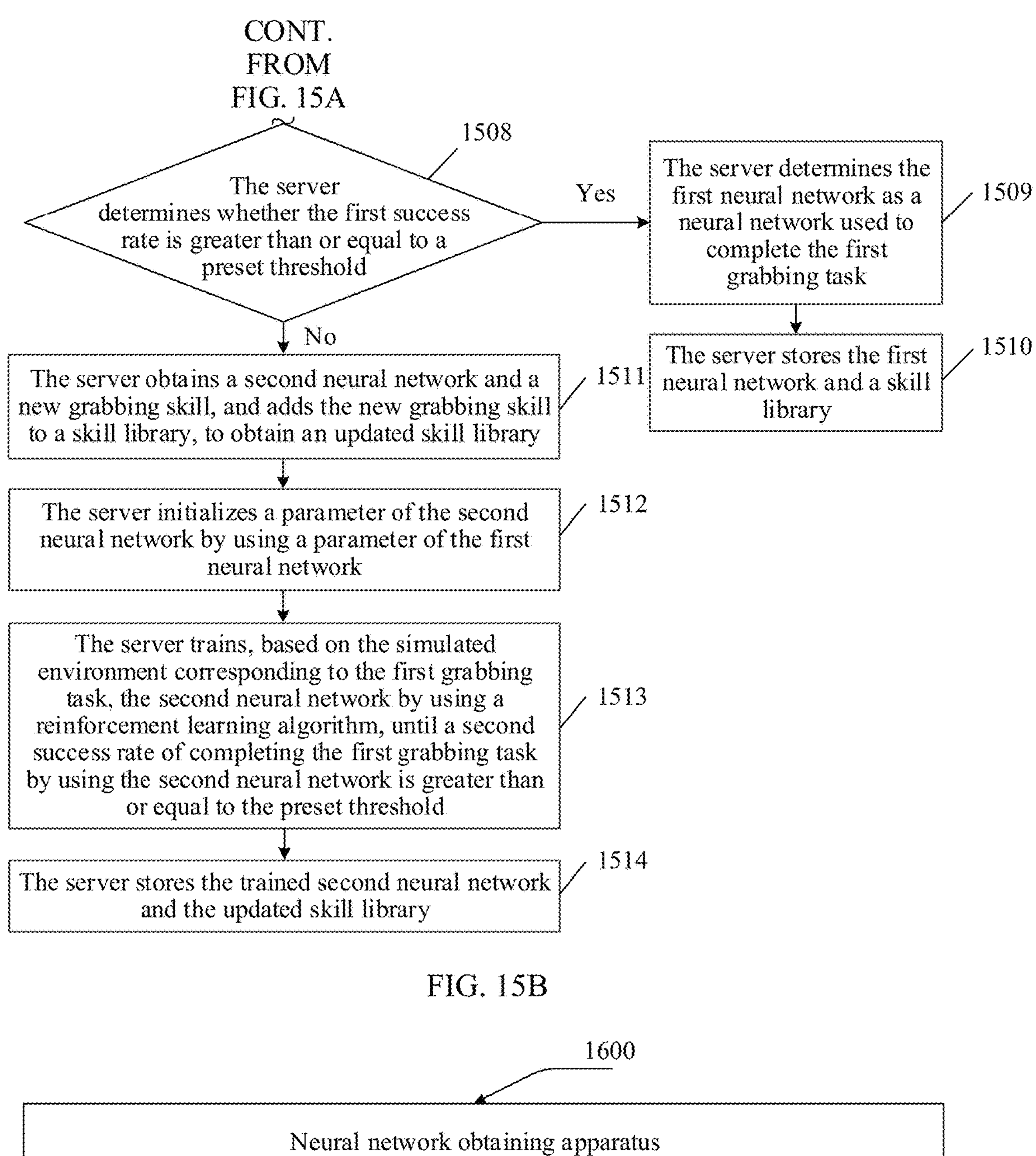
FIG. 16 is a schematic structural diagram of a neural network obtaining apparatus according to an embodiment of this application.

An embodiment of this application further provides a neural network obtaining method, to show an implementation used when the neural network obtaining method provided in any one of FIG. 3A to FIG. 12 is applied to an intelligent mechanical arm having a grabbing function. FIG. 15A and FIG. 15B are a schematic flowchart of a neural network obtaining method according to an embodiment of this application. The method may include the following steps.

1501. A server obtains a first grabbing task.

1502. The server obtains a first neural network.

1503. The server obtains a control instruction by using a grabbing skill selected by using the first neural network, to control an intelligent device to execute the first grabbing task.

1504. The server determines whether a loss function of the first neural network is converged; and if the loss function is not converged, performs step 1505; or if the loss function is converged, performs step 1507.

1505. The server trains, based on a simulated environment corresponding to the first grabbing task, the first neural network by using a reinforcement learning algorithm.

1506. The server determines whether the loss function of the first neural network can be converged; and if the loss function of the first neural network cannot be converged, re-performs step 1502; or if the loss function of the first neural network can be converged, obtains the mature first neural network.

1507. The server obtains a first success rate of completing the first grabbing task by using the first neural network.

1508. The server determines whether the first success rate is greater than or equal to a preset threshold; and if the first success rate is greater than or equal to the preset threshold, performs step 1509; or if the first success rate is less than the preset threshold, performs step 1511.

1509. The server determines the first neural network as a neural network used to complete the first grabbing task.

1510. The server stores the first neural network and a skill library.

1511. The server obtains a second neural network and a new grabbing skill, and adds the new grabbing skill to a skill library, to obtain an updated skill library.

1512. The server initializes a parameter of the second neural network by using a parameter of the first neural network.

1513. The server trains, based on the simulated environment corresponding to the first grabbing task, the second neural network by using a reinforcement learning algorithm, until a second success rate of completing the first grabbing task by using the second neural network is greater than or equal to the preset threshold.

1514. The server stores the trained second neural network and the updated skill library.

In this embodiment of this application, step 1501 to step 1514 are similar to step 301 to step 314 in the embodiment corresponding to FIGS. 3A and 3B, but a difference lies in that, in step 1501 to step 1514, a neural network used to complete a grabbing task is a hyponym of the neural network, and the grabbing skill is a hyponym of the skill in the skill library. For specific implementations of step 1501 to step 1514, refer to the descriptions of step 301 to step 314 in FIGS. 3A and 3B. Details are not described herein again.

In this embodiment of this application, in the foregoing manner, in a process of learning how to complete a grabbing task, a new grabbing skill may be incrementally learned to expand a grabbing skill library. Therefore, dependence on a grabbing skill library obtained in a pre-training phase is greatly reduced, that is, requirements for a training environment in the pre-training phase are reduced. In addition, incrementally learning the new grabbing skill implements grabbing-skill expandability of the grabbing skill library, so that a capability of completing a new grabbing task can be obtained, and a limitation of a current grabbing skill learning method is overcome.

It should be understood that FIG. 13A to FIG. 15B show only three specific application scenarios of the neural network obtaining method provided in any one of FIG. 3A to FIG. 12. However, in an actual case, the neural network obtaining method provided in any one of FIG. 3A to FIG. 12 may be further applied to more other application scenarios. For example, the method may be applied to obtaining of a neural network configured in a chess and card robot. For another example, the method may be applied to obtaining of a neural network configured in an intelligent sweeping robot or another scenario. Other application scenarios are not listed herein.

Based on the embodiments corresponding to FIG. 1 to FIG. 15B, to better implement the foregoing solutions in the embodiments of this application, the following further provides related devices configured to implement the foregoing solutions. Specifically, FIG. 16 is a schematic structural diagram of a neural network obtaining apparatus according to an embodiment of this application. The neural network obtaining apparatus 1600 may include an obtaining unit 1601, a training unit 1602, and a storage unit 1603. The obtaining unit 1601 is configured to obtain a first success rate of completing a first task by using a first neural network. The first neural network is used to select, from a skill library, a skill used to complete the first task. The obtaining unit 1601 is further configured to: when the first success rate is less than a preset threshold, obtain a second neural network and a new skill, and add the new skill to the skill library to update the skill library. The second neural network is used to select, from an updated skill library, the skill used to complete the first task. The training unit 1602 is configured to train, based on a simulated environment corresponding to the first task, the second neural network by using a reinforcement learning algorithm, until a second success rate of completing the first task by using the second neural network is greater than or equal to the preset threshold. The storage unit 1603 is configured to store the trained second neural network and the updated skill library.

In this embodiment of this application, the obtaining unit 1601 can obtain the first success rate of completing the first task by using the first neural network. When the first success rate is less than the preset threshold, the obtaining unit 1601 obtains the second neural network and the new skill, and adds the new skill to the skill library to obtain the updated skill library. Then, the training unit 1602 trains the second neural network based on the simulated environment corresponding to the first task, until the second success rate of completing the first task by using the second neural network is greater than or equal to the preset threshold. Then, the storage unit 1603 stores the trained second neural network and the updated skill library. In a process of learning how to complete a task, new skills can be learned incrementally to expand the skill library. Therefore, dependence on the skill library obtained in a pre-training phase is greatly reduced, that is, requirements for a training environment in the pre-training phase are reduced. In addition, incrementally learning the new skills achieves expandability of the skills in the skill library, so that a capability of completing the new tasks can be obtained, and a limitation of a current skill learning method is overcome.

In a possible design, the training unit 1602 is specifically configured to: input environment status information into the second neural network, to obtain a skill selected by using the second neural network, where the environment status information includes status information of an intelligent device and information about a surrounding environment of the intelligent device in the simulated environment corresponding to the first task; obtain a control instruction by using the skill selected by using the second neural network, to control the intelligent device to execute the first task, and obtain data for executing the first task by the intelligent device; and update, based on the obtained data for executing the first task by the intelligent device, parameters of the second neural network by using the reinforcement learning algorithm In this embodiment of this application, a specific implementation in which the training unit 1602 trains the second neural network is provided, thereby improving implementability of this solution.

In a possible design, the training unit 1602 is further configured to: when the skill selected by using the second neural network is the new skill, update, based on the obtained data for executing the first task by the intelligent device, a parameter of the new skill by using a reinforcement learning algorithm.

In this embodiment of this application, in the foregoing manner, a comparatively large degree of distinction can be maintained between different skills in the updated skill library, thereby reducing storage redundancy of the updated skill library. In addition, if a parameter that is not a newly generated skill is also updated, an evolution direction of a skill in the updated skill library is out of control. Updating only the newly generated skill helps guide the new skill to learn a skill requirement gap between the first task and the second task.

In a possible design, the training unit 1602 is specifically configured to update the parameters of the second neural network by using a first reinforcement learning algorithm. The first reinforcement learning algorithm is a proximal policy optimization PPO algorithm, a trust region policy optimization TRPO algorithm, or a temporal-difference TD algorithm.

In this embodiment of this application, in the foregoing manner, a specific implementation of the reinforcement learning algorithm used by the second neural network is provided, so that implementability of this solution is improved. In addition, a person skilled in the art has more options, so that implementation flexibility of this solution is improved.

In a possible design, the training unit 1602 is specifically configured to update the parameter of the new skill by using a second reinforcement learning algorithm. The second reinforcement learning algorithm is a deep deterministic policy gradient DDPG algorithm, a deep Q-network DQN algorithm, a PPO algorithm, or a soft actor-critic SAC algorithm.

In this embodiment of this application, in the foregoing manner, a specific implementation of the reinforcement learning algorithms used by the second neural network and the new skill is provided, thereby improving implementability of this solution. In addition, a person skilled in the art has more options, so that implementation flexibility of this solution is improved.

Figure 17:
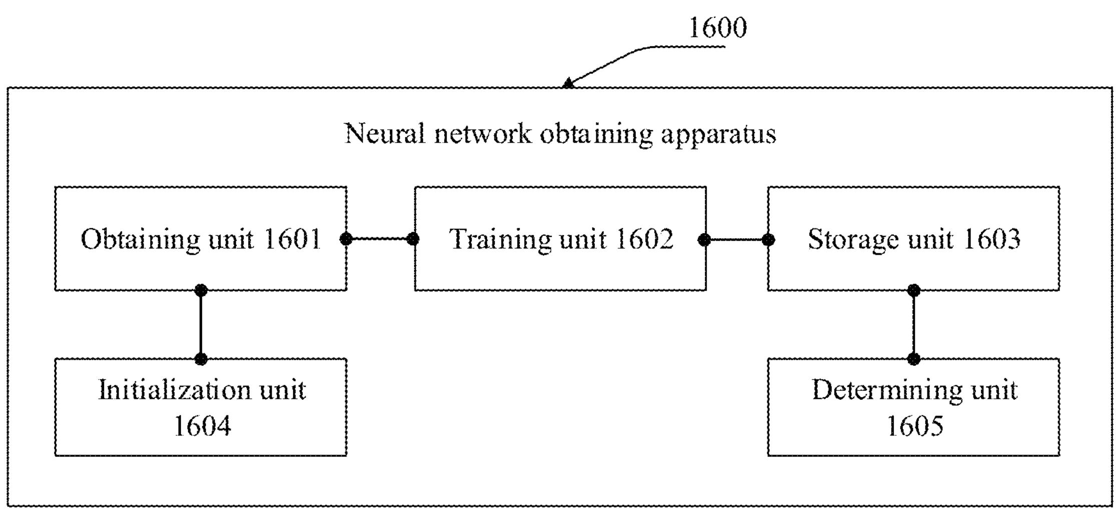
FIG. 17 is another schematic structural diagram of a neural network obtaining apparatus according to an embodiment of this application.

In a possible design, FIG. 17 is a schematic structural diagram of the neural network obtaining apparatus according to this embodiment of this application. The neural network obtaining apparatus 1600 further includes an initialization unit 1604, configured to initialize a parameter of a second neural network by using a parameter of a first neural network. The first neural network is obtained by performing, based on a simulated environment corresponding to a second task, training by using a reinforcement learning algorithm. Semantic information of the second task is similar to semantic information of the first task.

In this embodiment of this application, the initialization unit 1604 initializes the parameter of the second neural network by using the parameter of the first neural network that has been obtained through training, so that a capability learned by the first neural network can be directly inherited, thereby shortening a time for training the second neural network, and improving efficiency of training the second neural network.

In a possible design, referring to FIG. 17, the first neural network and a skill library are obtained by performing, based on a simulated environment corresponding to a second task, training by using a reinforcement learning algorithm. Semantic information of the second task is similar to semantic information of the first task. The neural network obtaining apparatus 1600 further includes: a determining unit 1605, configured to: when a first success rate is greater than or equal to a preset threshold, determine the first neural network as a neural network used to complete the first task. The storage unit 1603 is further configured to store the first neural network and the skill library.

In this embodiment of this application, the obtaining unit 1601 can obtain the first success rate of executing the first task by using the first neural network. When the first success rate is greater than or equal to the preset threshold, the determining unit 1605 determines the first neural network as the neural network used to execute the first task. The storage unit 1603 stores the first neural network and the skill library, to configure the first neural network and the skill library in an intelligent device that executes the first task. In this way, integrity of this solution is improved. When the first neural network is a neural network trained based on the simulated environment corresponding to the second task, an upper-layer neural network and a lower-layer skill library are reused, thereby shortening a time for training a neural network training, saving training resources, and greatly improving neural network training efficiency.

In a possible design, the obtaining unit 1601 is specifically configured to: input environment status information into the first neural network, to obtain a skill selected by using the first neural network, where the environment status information includes the status information of the intelligent device and the information about the surrounding environment of the intelligent device in the simulated environment corresponding to the first task; obtain a control instruction by using the skill selected by using the first neural network, to control the intelligent device to execute the first task; repeat the foregoing steps until a quantity of times the first task is completed by using the first neural network reaches a first quantity of times; count a quantity of times a result of completing the first task is a success in the first quantity of times, to obtain a second quantity of times; and calculate the first success rate based on the first quantity of times and the second quantity of times.

In this embodiment of this application, in the foregoing manner, the neural network obtaining apparatus controls, in the simulator by using the first neural network, the intelligent device to repeatedly execute the first task, that is, obtains the first success rate by restoring a real scenario, to improve accuracy of the first success rate.

In a possible design, the obtaining unit 1601 is further configured to obtain a control instruction by using a skill selected by using the first neural network, to control the intelligent device to execute the first task, so as to determine whether a loss function of the first neural network is converged in the simulated environment corresponding to the first task. The first neural network is obtained by performing, based on a simulated environment corresponding to the second task, training by using a reinforcement learning algorithm. Semantic information of the second task is similar to semantic information of the first task The training unit 1602 is further configured to: when the loss function of the first neural network is not converged, train, based on the simulated environment corresponding to the first task, the first neural network by using a reinforcement learning algorithm, until a convergence condition of the loss function of the first neural network is met, to obtain the mature first neural network.

The obtaining unit 1601 is specifically configured to: obtain a success rate of completing the first task by using the mature first neural network, and use the success rate as the first success rate.

In this embodiment of this application, pre-training can increase a probability that the first success rate is greater than or equal to the preset threshold, thereby reducing a probability of generating a new second neural network and a new skill, avoiding an operation of training the second neural network and the new skill, saving resources of the neural network obtaining apparatus, and improving neural network and skill generation efficiency.

In a possible design, the obtaining unit 1601 is specifically configured to: obtain semantic information of the first task, and obtain semantic information of a second task, where the semantic information of the second task is similar to the semantic information of the first task, and the first neural network is obtained by performing, based on a simulated environment corresponding to the second task, training by using a reinforcement learning algorithm; and obtain the first success rate based on a similarity between the semantic information of the first task and the semantic information of the second task, where a higher similarity indicates a higher first success rate.

In this embodiment of this application, the first success rate of completing the first task by using the first neural network is determined by obtaining the similarity between the first task and the second task. In this way, another implementation of obtaining the first success rate is provided, and an application scenario of this solution is extended. In addition, in this manner, the first task no longer needs to be executed repeatedly by using the first neural network, thereby improving efficiency of obtaining the first success rate.

In a possible design, the skill in the skill library is a driving skill, the skill in the skill library is a carrying skill, or the skill in the skill library is a grabbing skill.

In this embodiment of this application, a plurality of specific implementations of the skill are provided in the foregoing manner, thereby extending an application scenario of this solution, and improving comprehensiveness of this solution.

In a possible design, the skill in the skill library is a driving skill, and data that is obtained by a server and that is used by the intelligent device to execute the first task includes any one or more pieces of information: a driving speed, a driving path, a driving collision status, or a driving destination of the intelligent device. Alternatively, the skill in the skill library is a carrying skill, and data that is obtained by a server and that is used by the intelligent device to execute the first task includes any one or more pieces of information: a carrying path, a carrying speed, or a collision status of the intelligent device. Alternatively, the skill in the skill library is a grabbing skill, and data that is obtained by a server and that is used by the intelligent device to execute the first task includes any one or more pieces of information: a grabbing path, a grabbing speed, or a grabbing destination location of the intelligent device.

In this embodiment of this application, in the foregoing manner, specific content of operation behavior information is further provided, thereby improving executability of this solution. In addition, specific content of the operation behavior information in different fields is provided, thereby improving implementation flexibility of this solution.

It should be noted that content such as information exchange and an execution process between the modules/units in the neural network obtaining apparatus 1600 is based on a same concept as the steps in the method embodiment corresponding to FIGS. 3A and 3B in this application. For specific content, refer to the descriptions in the foregoing method embodiment of this application. Details are not described herein again.

Figure 18:
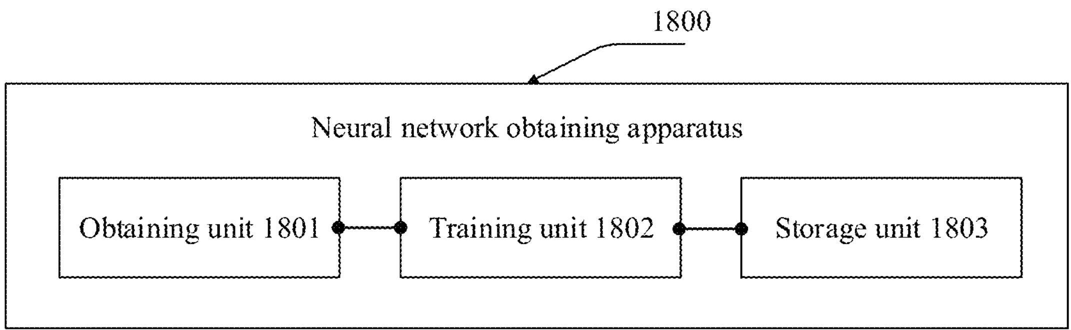
FIG. 18 is still another schematic structural diagram of a neural network obtaining apparatus according to an embodiment of this application.

An embodiment of this application further provides another neural network obtaining apparatus. For details, refer to FIG. 18. FIG. 18 is a schematic structural diagram of a neural network obtaining apparatus according to an embodiment of this application. The neural network obtaining apparatus 1800 may include an obtaining unit 1801, a training unit 1802, and a storage unit 1803. The obtaining unit 1801 is configured to obtain a first success rate of completing a first driving task by using a first neural network. The first neural network is used to select, from a skill library, a driving skill used to complete the first driving task. The obtaining unit 1801 is further configured to: when the first success rate is less than a preset threshold, obtain a second neural network and a new driving skill, and add the new driving skill to the skill library to update the skill library. The second neural network is used to select, from the updated skill library, a driving skill used to complete the first driving task. The training unit 1802 is configured to train, based on a simulated environment corresponding to the first driving task, the second neural network by using a reinforcement learning algorithm, until a second success rate of completing the first driving task by using the second neural network is greater than or equal to the preset threshold. The storage unit 1803 is configured to store the trained second neural network and the updated skill library.

In a possible design, the training unit 1802 is specifically configured to: input environment status information into the second neural network, to obtain a driving skill selected by using the second neural network, where the environment status information includes status information of an automobile and information about a surrounding environment of the automobile in the simulated environment corresponding to the first driving task; obtain a control instruction by using the driving skill selected by using the second neural network, to control the automobile to execute the first driving task, and obtain data for executing the first driving task by the automobile; and update, based on the obtained data for executing the first driving task by the automobile, parameters of the second neural network by using the reinforcement learning algorithm.

In a possible design, the training unit 1802 is further configured to: when the driving skill selected by using the second neural network is the new driving skill, update, based on the obtained data for executing the first driving task by the automobile, a parameter of the new driving skill by using a reinforcement learning algorithm.

In a possible design, the training unit 1802 is specifically configured to update the parameters of the second neural network by using a first reinforcement learning algorithm. The first reinforcement learning algorithm is a proximal policy optimization PPO algorithm, a trust region policy optimization TRPO algorithm, or a temporal-difference TD algorithm.

In a possible design, the training unit 1802 is specifically configured to update the parameter of the new driving skill by using a second reinforcement learning algorithm. The second reinforcement learning algorithm is a deep deterministic policy gradient DDPG algorithm, a deep Q-network DQN algorithm, a PPO algorithm, or a soft actor-critic SAC algorithm.

Figure 19:
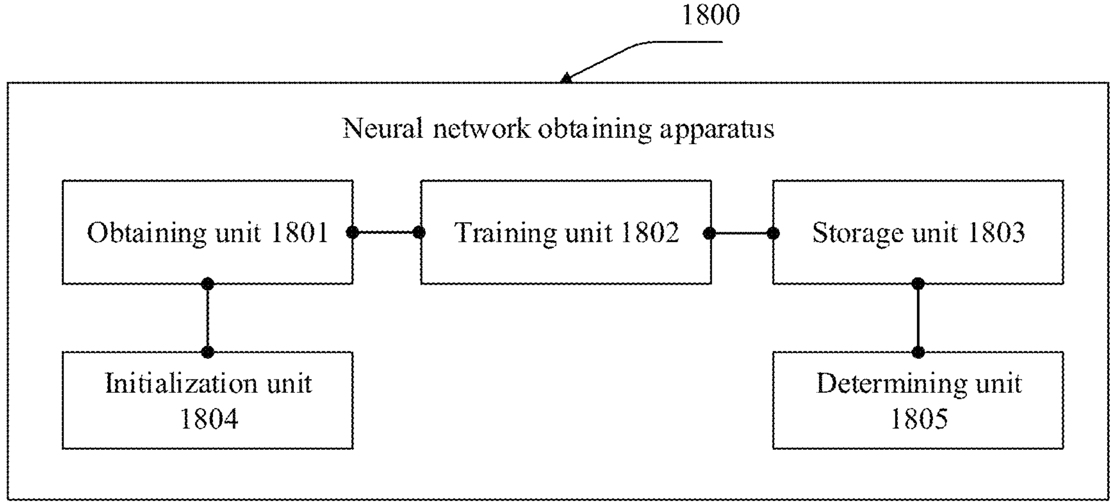
FIG. 19 is yet another schematic structural diagram of a neural network obtaining apparatus according to an embodiment of this application.

In a possible design, FIG. 19 is a schematic structural diagram of the neural network obtaining apparatus according to this embodiment of this application. The neural network obtaining apparatus 1800 further includes: an initialization unit 1804, configured to initialize a parameter of the second neural network by using a parameter of a first neural network. The first neural network is obtained by performing, based on a simulated environment corresponding to a second driving task, training by using a reinforcement learning algorithm. Semantic information of the second driving task is similar to semantic information of the first driving task.

In a possible design, referring to FIG. 19, the first neural network and the skill library are obtained by performing, based on a simulated environment corresponding to a second driving task, training by using a reinforcement learning algorithm. Semantic information of the second driving task is similar to semantic information of the first driving task. The neural network obtaining apparatus 1800 further includes: a determining unit 1805, configured to: when a first success rate is greater than or equal to a preset threshold, determine the first neural network as a neural network used to complete the first driving task. The storage unit 1803 is further configured to store the first neural network and the skill library.

In a possible design, the obtaining unit 1801 is specifically configured to: input environment status information into the first neural network, to obtain a driving skill selected by using the first neural network, where the environment status information includes the status information of the automobile and the information about the surrounding environment of the automobile in the simulated environment corresponding to the first driving task; obtain a control instruction by using the driving skill selected by using the first neural network, to control the automobile to execute the first driving task; repeat the foregoing steps until a quantity of times the first driving task is completed by using the first neural network reaches a first quantity of times; count a quantity of times a result of completing the first driving task is a success in the first quantity of times, to obtain a second quantity of times; and calculate the first success rate based on the first quantity of times and the second quantity of times.

In a possible design, the obtaining unit 1801 is further configured to obtain a control instruction by using a driving skill selected by using the first neural network, to control the automobile to execute the first driving task, so as to determine whether a loss function of the first neural network is converged in the simulated environment corresponding to the first driving task. The first neural network is obtained by performing, based on a simulated environment corresponding to a second driving task, training by using a reinforcement learning algorithm. Semantic information of the second driving task is similar to semantic information of the first driving task.

A training unit 1802 is further configured to: when the loss function of the first neural network is not converged, train, based on the simulated environment corresponding to the first driving task, the first neural network by using a reinforcement learning algorithm, until a convergence condition of the loss function of the first neural network is met, to obtain the mature first neural network The obtaining unit 1801 is specifically configured to: obtain a success rate of completing the first driving task by using the mature first neural network, and use the success rate as the first success rate.

In a possible design, the obtaining unit 1801 is specifically configured to: obtain semantic information of a first driving task, and obtain semantic information of a second driving task, where the semantic information of the second driving task is similar to the semantic information of the first driving task, and the first neural network is obtained by performing, based on a simulated environment corresponding to the second driving task, training by using a reinforcement learning algorithm; and obtain the first success rate based on a similarity between the semantic information of the first driving task and the semantic information of the second driving task, where a higher similarity indicates a higher first success rate.

It should be noted that content such as information exchange and an execution process between the modules/units in the neural network obtaining apparatus 1800 is based on a same concept as the method embodiment corresponding to FIG. 12 in this application. For specific content, refer to the descriptions in the foregoing method embodiment of this application. Details are not described herein again.

Figure 20:
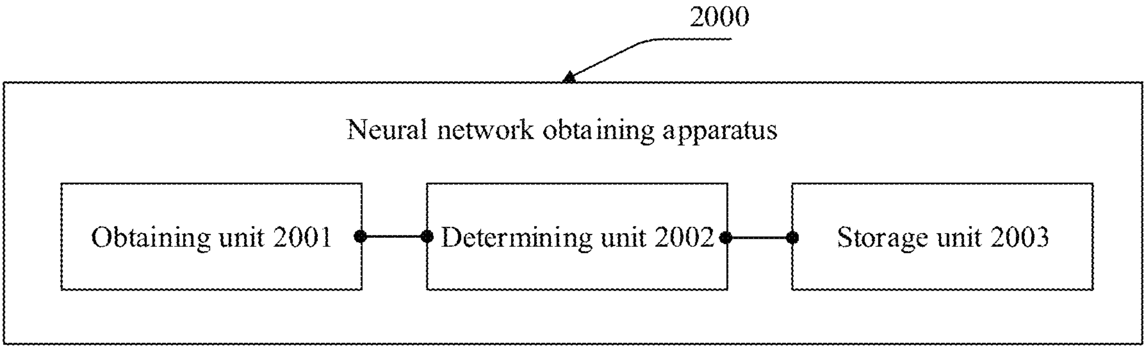
FIG. 20 is still yet another schematic structural diagram of a neural network obtaining apparatus according to an embodiment of this application.

An embodiment of this application further provides another neural network obtaining apparatus. For details, refer to FIG. 20. FIG. 20 is a schematic structural diagram of a neural network obtaining apparatus according to an embodiment of this application. The neural network obtaining apparatus 2000 may include an obtaining unit 2001, a determining unit 2002, and a storage unit 2003. The obtaining unit 2001 is configured to obtain a first success rate of completing a first task by using a first neural network. The first neural network is used to select, from a skill library, a skill used to complete the first task. The first neural network and the skill library are obtained by performing, based on a simulated environment corresponding to a second task, training by using a reinforcement learning algorithm, and semantic information of the second task is similar to semantic information of the first task. The determining unit 2002 is configured to: when the first success rate is greater than or equal to a preset threshold, determine the first neural network as a neural network used to complete the first task. The storage unit 2003 is configured to store the first neural network and the skill library.

Figure 21:
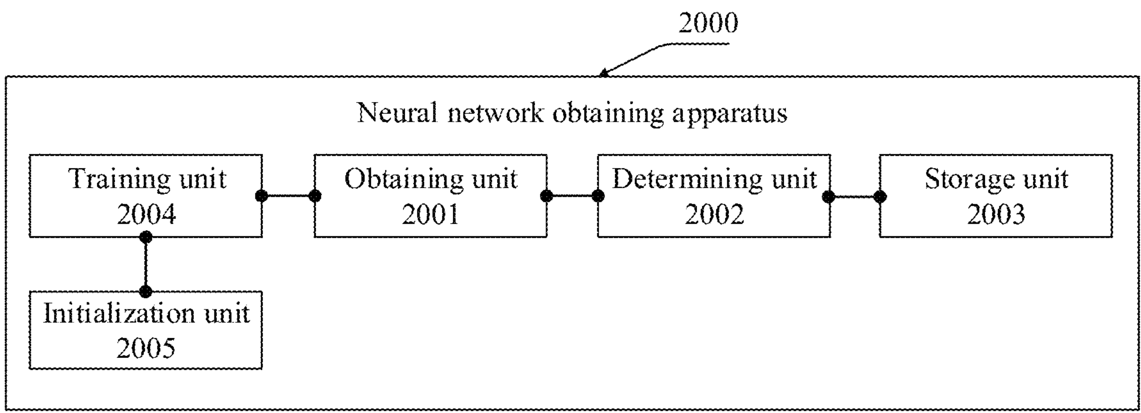
FIG. 21 is a further schematic structural diagram of a neural network obtaining apparatus according to an embodiment of this application.

In a possible design, FIG. 21 is a schematic structural diagram of the neural network obtaining apparatus according to this embodiment of this application. The obtaining unit 2001 is further configured to: when the first success rate is less than the preset threshold, obtain a second neural network and a new skill, and add the new skill to the skill library to update the skill library. The second neural network is used to select, from an updated skill library, a skill used to complete the first task. The neural network obtaining apparatus 2000 further includes: a training unit 2004, configured to train, based on a simulated environment corresponding to the first task, the second neural network by using a reinforcement learning algorithm, until a second success rate of completing the first task by using the second neural network is greater than or equal to the preset threshold. The trained second neural network and the updated skill library are stored.

In a possible design, referring to FIG. 21, the training unit 2004 is specifically configured to: input environment status information into the second neural network, to obtain a skill selected by using the second neural network, where the environment status information includes status information of an intelligent device and information about a surrounding environment of the intelligent device in the simulated environment corresponding to the first task; obtain a control instruction by using the skill selected by using the second neural network, to control the intelligent device to execute the first task, and obtain data for executing the first task by the intelligent device; and update, based on the obtained data for executing the first task by the intelligent device, parameters of the second neural network by using the reinforcement learning algorithm.

In a possible design, referring to FIG. 21, the training unit 2004 is further configured to: when the skill selected by using the second neural network is the new skill, update, based on the obtained data for executing the first task by the intelligent device, a parameter of the new skill by using a reinforcement learning algorithm.

In a possible design, referring to FIG. 21, the training unit 2004 is specifically configured to update the parameters of the second neural network by using a first reinforcement learning algorithm. The first reinforcement learning algorithm is a proximal policy optimization PPO algorithm, a trust region policy optimization TRPO algorithm, or a temporal-difference TD algorithm.

In a possible design, referring to FIG. 21, the training unit 2004 is specifically configured to update the parameter of the new skill by using a second reinforcement learning algorithm. The second reinforcement learning algorithm is a deep deterministic policy gradient DDPG algorithm, a deep Q-network DQN algorithm, a PPO algorithm, or a soft actor-critic SAC algorithm.

In a possible design, referring to FIG. 21, the neural network obtaining apparatus 2000 further includes: an initialization unit 2005, configured to initialize a parameter of the second neural network by using a parameter of the first neural network.

In a possible design, the obtaining unit 2001 is specifically configured to: input the environment status information into the first neural network, to obtain a skill selected by using the first neural network, where the environment status information includes the status information of the intelligent device and the information about the surrounding environment of the intelligent device in the simulated environment corresponding to the first task; obtain a control instruction by using the skill selected by using the first neural network, to control the intelligent device to execute the first task; repeat the foregoing steps until a quantity of times the first task is completed by using the first neural network reaches a first quantity of times; count a quantity of times a result of completing the first task is a success in the first quantity of times, to obtain a second quantity of times; and calculate the first success rate based on the first quantity of times and the second quantity of times.

In a possible design, referring to FIG. 21, the obtaining unit 2001 is further configured to obtain a control instruction by using a skill selected by using the first neural network, to control the intelligent device to execute the first task, so as to determine whether a loss function of the first neural network is converged in the simulated environment corresponding to the first task. The training unit 2004 is further configured to: when the loss function of the first neural network is not converged, train, based on the simulated environment corresponding to the first task, the first neural network by using a reinforcement learning algorithm, until a convergence condition of the loss function of the first neural network is met, to obtain the mature first neural network. The obtaining unit 2001 is specifically configured to obtain a success rate of completing the first task by using the mature first neural network, and use the success rate as the first success rate.

In a possible design, the obtaining unit 2001 is specifically configured to: obtain semantic information of the first task, and obtain semantic information of a second task; and obtain the first success rate based on a similarity between the semantic information of the first task and the semantic information of the second task. A higher similarity indicates a higher first success rate.

In a possible design, the skill in the skill library is a driving skill, the skill in the skill library is a carrying skill, or the skill in the skill library is a grabbing skill.

It should be noted that content such as information exchange and an execution process between the modules/units in the neural network obtaining apparatus 2000 is based on a same concept as the method embodiment corresponding to FIGS. 3A and 3B in this application. For specific content, refer to the descriptions in the foregoing method embodiment of this application. Details are not described herein again.

Figure 22:
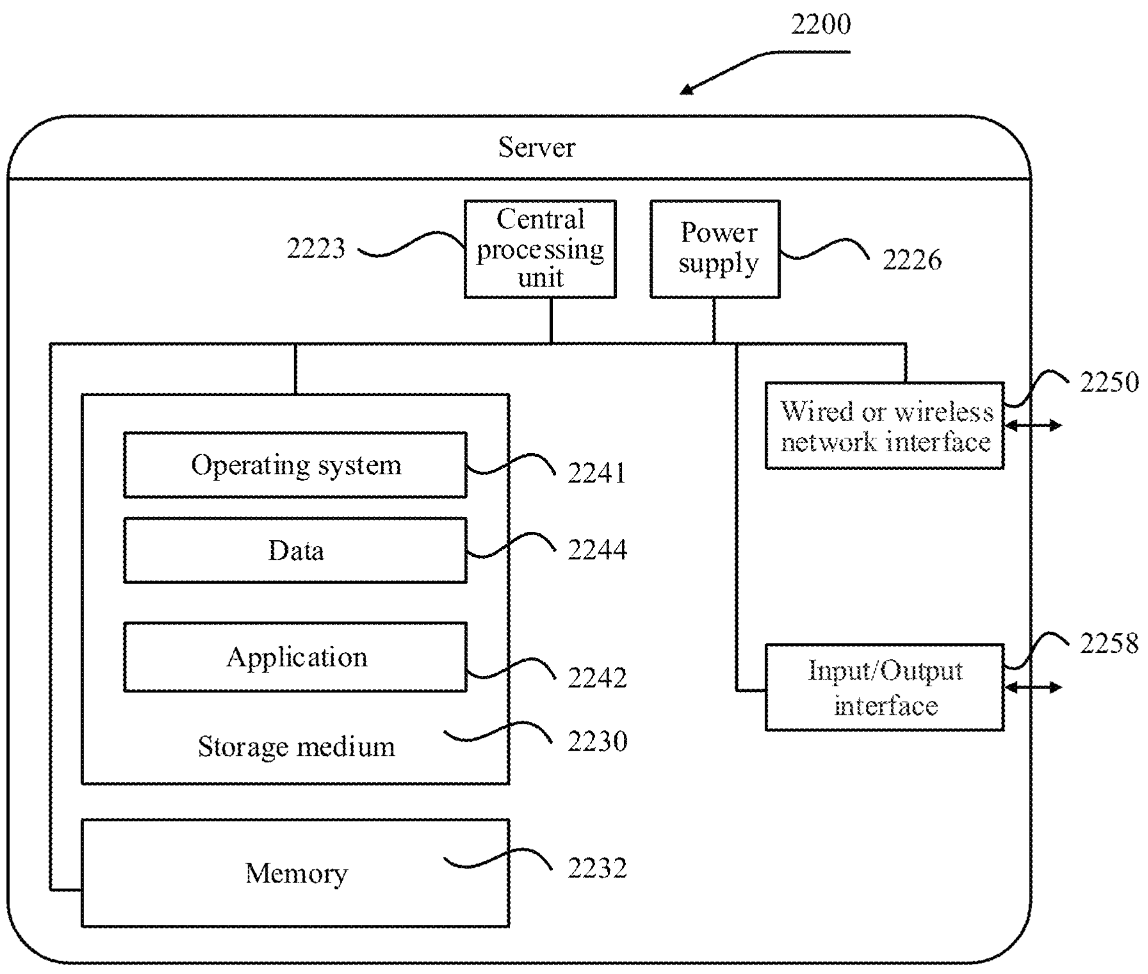
FIG. 22 is a schematic structural diagram of a server according to an embodiment of this application.

An embodiment of this application further provides a server. FIG. 22 is a schematic structural diagram of the server according to this embodiment of this application. The neural network obtaining apparatus 1600 described in the embodiment corresponding to FIG. 16 or FIG. 17 may be deployed on the server 2200, to implement the functions of the server in any one of the embodiments corresponding to FIG. 3A to FIG. 12. Alternatively, the neural network obtaining apparatus 1800 described in the embodiment corresponding to FIG. 18 or FIG. 19 may be deployed on the server 2200, to implement the functions of the server in any one of the embodiments corresponding to FIG. 3 FIG. 12. Alternatively, the neural network obtaining apparatus 2000 described in the embodiment corresponding to FIG. 20 or FIG. 21 may be deployed on the server 2200, to implement functions of the server in any one of the embodiments corresponding to FIG. 3A to FIG. 12. Specifically, the server 2200 is implemented by one or more servers. The server 2200 may greatly differ due to different configurations or performance, and may include one or more central processing units (CPU) 2223 (for example, one or more processors), a memory 2232, one or more storage media 2230 (for example, one or more mass storage devices) that store an application 2242 or data 2244. The memory 2232 and the storage medium 2230 may perform temporary storage or permanent storage. A program stored in the storage medium 2230 may include one or more modules (which are not shown in the figure). Each module may include a series of instruction operations in the server. Still further, the central processing unit 2223 may be configured to communicate with the storage medium 2230, to perform, on the processing device 2200, a series of instruction operations in the storage medium 2230. However, it should be understood that the server shown in FIG. 22 is merely an example server. Alternatively, the memory 2232 and the storage medium 2230 may not be included in the server 2200, but an external memory is disposed outside the server 2200, in other words, the memory 2232 and the storage medium 2230 are independent of the central processing unit 2223. For example, an external memory is used in an in-vehicle server.

The server 2200 may further include one or more power supplies 2226, one or more wired or wireless network interfaces 2250, one or more input/output interfaces 2258, and/or one or more operating systems 2241, for example, Windows Server™, Mac OS X™, Unix™, Linux™ and FreeBSD™.

In this embodiment of this application, the central processing unit 2223 is configured to perform the neural network obtaining method performed by the server in the embodiment corresponding to FIGS. 3A and 3B, or is configured to perform the neural network obtaining method performed by the server in the embodiment corresponding to FIG. 13A and FIG. 13B. It should be noted that, for specific implementations of performing, by the central processing unit 2223, the neural network obtaining method, reference may be made to the descriptions in the method embodiments corresponding to FIG. 3A and FIG. 13B. Details are not described herein again.

An embodiment of this application further provides a computer program product. When the computer program product is run on a computer, the computer is enabled to perform the steps performed by the servers in the methods described in the embodiments shown in FIG. 3A to FIG. 12, or the computer is enabled to perform the steps performed by the server in the method described in the embodiment shown in FIG. 13A and FIG. 13B.

An embodiment of this application further provides a computer-readable storage medium. The computer-readable storage medium stores a program used for signal processing. When the program is run on a computer, the computer is enabled to perform the steps performed by the servers in the methods described in the embodiments shown in FIG. 3A to FIG. 12, or the computer is enabled to perform the steps performed by the server in the method described in the embodiment shown in FIG. 13A and FIG. 13B.

An execution device, a training device, a terminal device, or a communications device provided in this embodiment of this application may be specifically a chip. The chip includes a processing unit and a communications unit. The processing unit may be, for example, a processor. The communications unit may be, for example, an input/output interface, a pin, or a circuit. The processing unit may execute a computer executable instruction stored in a storage unit, so that a chip in the server performs the neural network obtaining method described in the embodiments shown in FIG. 3A to FIG. 12, or a chip in the server performs the neural network obtaining method described in the embodiment shown in FIG. 13A and FIG. 13B. Optionally, the storage unit may be a storage unit in the chip, such as a register or a buffer, or the storage unit may be a storage unit in the server but outside the chip, such as a read-only memory (ROM) or another type of static storage device capable of storing static information and instructions, or a random access memory (RAM).

Figure 23:
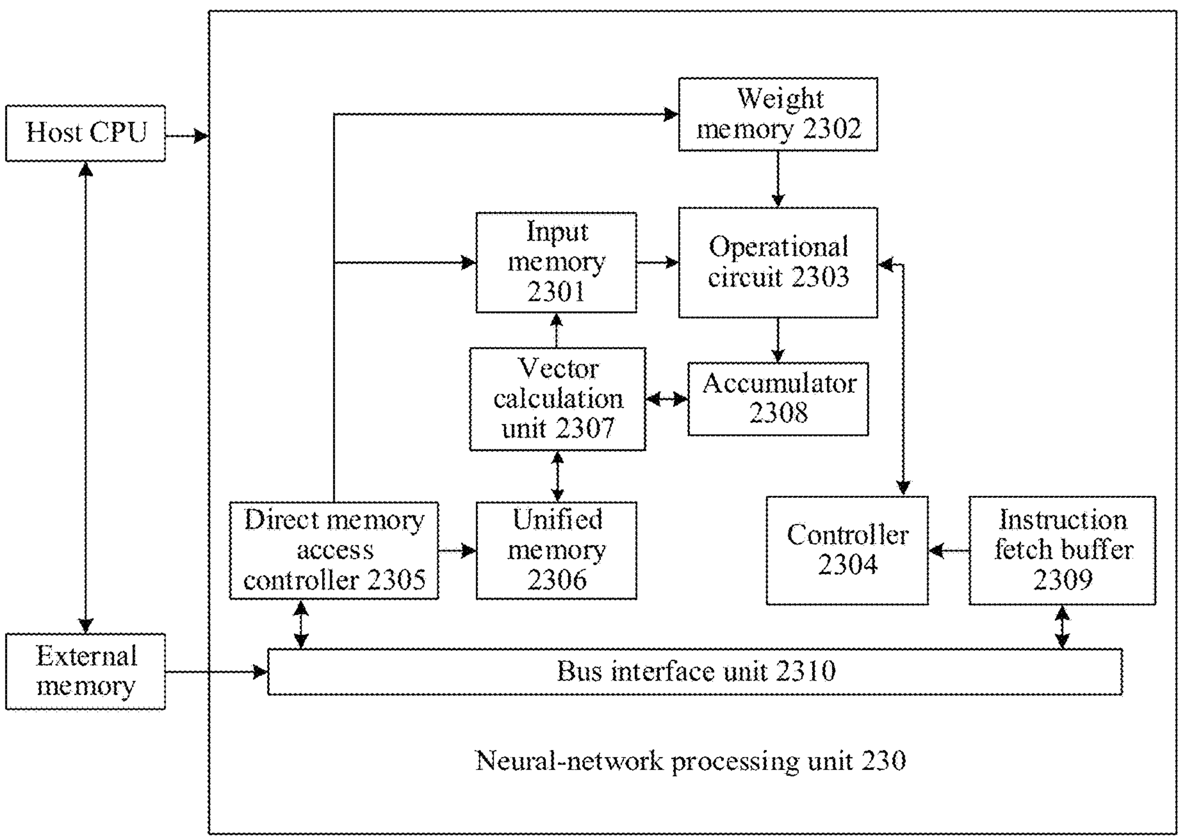
FIG. 23 is a schematic structural diagram of a chip according to an embodiment of this application.

Specifically, FIG. 23 is a schematic structural diagram of a chip according to an embodiment of this application. The chip may be a neural network processing unit NPU 230. The NPU 230 is mounted to a main CPU (Host CPU) as a coprocessor, and the host CPU allocates a task. A core part of the NPU is an operational circuit 2303. The operational circuit 2303 is controlled by a controller 2304 to extract matrix data in a memory and perform a multiplication operation.

In some implementations, a plurality of process engines (PE) are included in the operational circuit 2303. In some implementations, the operational circuit 2303 is a two-dimensional systolic array. The operational circuit 2303 may alternatively be a one-dimensional systolic array or another electronic circuit that can perform mathematical operations such as multiplication and addition. In some implementations, the operational circuit 2303 is a general-purpose matrix processor.

For example, it is assumed that there are an input matrix A, a weight matrix B, and an output matrix C. The operational circuit fetches corresponding data of the matrix B from a weight memory 2302 and buffers the data on each PE in the operational circuit. The operational circuit stores, into an accumulator (accumulator) 2308, some matrix results or final matrix results obtained by performing matrix operation on data of the matrix A fetched from an input memory 2301 and the matrix B.

A unified memory 2306 is configured to store input data and output data. Weight data is directly transferred to the weight memory 2302 by using a direct memory access controller (DMAC) 2305. The input data is also transferred to the unified memory 2306 by using the DMAC.

BIU is the abbreviation for bus interface unit. The bus interface unit 2310 is configured to perform interaction between an AXI bus, and the DMAC and an instruction fetch buffer (IFB) 2309.

The bus interface unit 2310 (BIU) is configured for the instruction fetch buffer 2309 to obtain an instruction from an external memory, and is further configured for the direct memory access controller 2305 to obtain raw data of the input matrix A or the weight matrix B from the external memory.

The DMAC is mainly configured to: transfer input data in an external memory to the unified memory 2306, transfer the weight data to the weight memory 2302, or transfer the input data to the input memory 2301.

A vector calculation unit 2307 includes a plurality of operation processing units. When necessary, further processing is performed on an output of the operational circuit, such as vector multiplication, vector addition, an exponential operation, a logarithmic operation, or value comparison. The vector calculation unit 2307 is mainly configured to perform network computing, such as batch normalization (batch normalization), pixel-level summation, and upsampling of a feature plane, on a non-convolutional/fully-connected layer in a neural network.

In some implementations, the vector calculation unit 2307 can store, into the unified cache 2306, a processed output vector. For example, the vector calculation unit 2307 may apply a linear function and/or a non-linear function to the output of the operational circuit 2303, for example, perform linear interpolation on a feature plane extracted at a convolutional layer. For another example, a linear function and/or a non-linear function is applied to a vector of an accumulated value to generate an activation value. In some implementations, the vector calculation unit 2307 generates a normalized value, a pixel-level sum, or a normalized value and a pixel-level sum. In some implementations, the processed output vector can be used as an activation input of the operational circuit 2303, for example, can be used at a subsequent layer in the neural network.

The instruction fetch buffer (instruction fetch buffer) 2309 connected to the controller 2304 is configured to store an instruction used by the controller 2304.

The unified memory 2306, the input memory 2301, the weight memory 2302, and the instruction fetch buffer 2309 are all on-chip memories. The external memory is private for a hardware architecture of the NPU.

When the first neural network, the skill, the new skill, or the skill selected by using the second neural network is specifically a neural network, an operation at each layer in the neural network may be performed by the operational circuit 2303 or the vector calculation unit 2307.

The processor mentioned above may be a general-purpose central processing unit, a microprocessor, an ASIC, or one or more integrated circuits that are used to control execution of the program in the method in the first aspect.

In addition, it should be noted that the foregoing described apparatus embodiment is merely an example. The units described as separate parts may or may not be physically separate; and parts displayed as units may or may not be physical units, may be located in one position, or may be distributed on a plurality of network units. Some or all of the modules may be selected based on actual requirements to achieve the objectives of the solutions of the embodiments. In addition, in the accompanying drawings of the apparatus embodiments provided in this application, connection relationships between the modules indicate that the modules have communication connections with each other, and may be specifically implemented as one or more communications buses or signal wires.

Based on the descriptions of the foregoing implementations, a person skilled in the art may clearly learn that this application may be implemented by using software and necessary universal hardware, or by using dedicated hardware, including a dedicated integrated circuit, a dedicated CLU, a dedicated memory, a dedicated component, and the like. All functions completed by a computer program may usually be easily implemented by using corresponding hardware. In addition, diverse specific hardware structures may be used to implement a same function, for example, an analog circuit, a digital circuit, or a dedicated circuit. However, in most cases, it is better to implement this application by using a software program. Based on such an understanding, the technical solutions of this application essentially or the part contributing to the prior art may be implemented in a form of a software product. The software product is stored in a readable storage medium, such as a floppy disk of a computer, a USB flash drive, a removable hard disk, a ROM, a RAM, a magnetic disk, or an optical disc of a computer, and includes several instructions for instructing a computer device (which may be a personal computer, a server, a network device, or the like) to perform the methods in the embodiments of this application.

All or some of the foregoing embodiments may be implemented by using software, hardware, firmware, or any combination thereof. When software is used to implement the embodiments, all or some of the embodiments may be implemented in a form of a computer program product.

The computer program product includes one or more computer instructions. When the computer program instructions are loaded and executed on the computer, all or some of the procedures or functions according to the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a soft disk, a hard disk, or a magnetic tape), an optical medium (for example, a DVD), a semiconductor medium (for example, a solid-state drive (SSD)), or the like.

What is claimed is:

1. A neural network obtaining method, wherein the method comprises:

obtaining a first success rate of completing a first task using a first neural network, wherein the first neural network is used to select, from a skill library, a skill used to complete the first task, wherein each skill in the skill library comprises a skill neural network;

obtaining, when the first success rate is less than a preset threshold, a second neural network and a new skill, and adding the new skill to the skill library to update the skill library, wherein the second neural network is used to select, from the updated skill library, a skill used to complete the first task, wherein the new skill comprises a new skill neural network having new skill parameters;

training, based on a simulated environment corresponding to the first task, the second neural network and the new skill by using a reinforcement learning algorithm, until a second success rate of completing the first task by using the second neural network is greater than or equal to the preset threshold, wherein the training, based on a simulated environment corresponding to the first task, the second neural network and the new skill by using a reinforcement learning algorithm, comprises: when the skill selected by the second neural network from the updated skill library is the new skill, updating, by using a reinforcement learning algorithm, the new skill parameters of the new skill neural network according to the obtained data for executing the first task; and storing the trained second neural network and the updated skill library, wherein the first neural network and the second neural network each comprise an input layer, a pooling layer, and a neural network layer.

2. The method according to claim 1, wherein the training, based on a simulated environment corresponding to the first task, the second neural network by using a reinforcement learning algorithm comprises:

inputting environment status information into the second neural network to obtain a skill selected by using the second neural network, wherein the environment status information comprises status information of an intelligent device and information about a surrounding environment of the intelligent device in the simulated environment corresponding to the first task;

obtaining a control instruction by using the skill selected by using the second neural network, to control the intelligent device to execute the first task, and obtaining data for executing the first task by the intelligent device; and updating, based on the obtained data for executing the first task by the intelligent device, parameters of the second neural network by using the reinforcement learning algorithm.

3. The method according to claim 2, wherein the updating parameters of the second neural network by using the reinforcement learning algorithm comprises:

updating the parameters of the second neural network by using a first reinforcement learning algorithm, wherein the first reinforcement learning algorithm is one of a proximal policy optimization (PPO) algorithm, a trust region policy optimization (TRPO) algorithm, and a temporal-difference (TD) algorithm.

4. The method according to claim 1, wherein the updating the new skill parameters of the new skill neural network by using the reinforcement learning algorithm comprises:

updating the new skill parameters by using a second reinforcement learning algorithm, wherein the second reinforcement learning algorithm is one of a deep deterministic policy gradient DDPG algorithm, a deep Q-network DQN algorithm, a PPO algorithm, and a soft actor-critic SAC algorithm.

5. The method according to claim 1, wherein the method further comprises:

initializing a parameter of the second neural network by using a parameter of the first neural network, wherein the first neural network is obtained by performing, based on a simulated environment corresponding to a second task, training by using a reinforcement learning algorithm, and semantic information of the second task is similar to semantic information of the first task.

6. The method according to claim 1, wherein the first neural network and the skill library are obtained by performing, based on a simulated environment corresponding to a second task, training by using a reinforcement learning algorithm, and semantic information of the second task is similar to semantic information of the first task; and the method further comprises:

determining, when the first success rate is greater than or equal to the preset threshold, the first neural network as a neural network used to complete the first task; and storing the first neural network and the skill library.

7. The method according to claim 1, wherein the obtaining a first success rate of completing a first task by using a first neural network comprises:

inputting the environment status information into the first neural network to obtain a skill selected by using the first neural network, wherein the environment status information comprises the status information of the intelligent device and the information about the surrounding environment of the intelligent device in the simulated environment corresponding to the first task;

obtaining a control instruction by using the skill selected by using the first neural network to control the intelligent device to execute the first task;

repeating the foregoing steps until a quantity of times the first task is completed by using the first neural network reaches a first quantity of times;

counting a quantity of times a result of completing the first task is a success in the first quantity of times to obtain a second quantity of times; and calculating the first success rate based on the first quantity of times and the second quantity of times.

8. The method according to claim 7, wherein before the inputting the environment status information into the first neural network, the method further comprises:

obtaining a control instruction by using a skill selected by using the first neural network to control the intelligent device to execute the first task, so as to determine whether a loss function of the first neural network is converged in the simulated environment corresponding to the first task, wherein the first neural network is obtained by performing, based on a simulated environment corresponding to a second task, training by using a reinforcement learning algorithm, and semantic information of the second task is similar to semantic information of the first task; and training, when the loss function of the first neural network is not converged, based on the simulated environment corresponding to the first task, the first neural network by using a reinforcement learning algorithm, until a convergence condition of the loss function of the first neural network is met, to obtain the mature first neural network; and the obtaining a first success rate of completing a first task by using a first neural network comprises:

obtaining a success rate of completing the first task by using the mature first neural network, and using the success rate as the first success rate.

9. The method according to claim 1, wherein the obtaining a first success rate of completing a first task by using a first neural network comprises:

obtaining semantic information of the first task, and obtaining semantic information of a second task, wherein the semantic information of the second task is similar to the semantic information of the first task, and the first neural network is obtained by performing, based on a simulated environment corresponding to the second task, training by using a reinforcement learning algorithm; and obtaining the first success rate based on a similarity between the semantic information of the first task and the semantic information of the second task, wherein a higher similarity indicates a higher first success rate.

10. The method according to claim 1, wherein a skill in the skill library is one of a driving skill, a carrying skill, and a skill in the skill library is a grabbing skill.

11. A server comprising a processor, coupled to a non-transitory memory, storing program instructions which when executed by the processor, cause the processor to perform the operations, comprising:

obtaining a first success rate of completing a first task by using a first neural network, wherein the first neural network is used to select, from a skill library, a skill used to complete the first task, wherein each skill in the skill library comprises a skill neural network;

obtaining, when the first success rate is less than a preset threshold, a second neural network and a new skill, and adding the new skill to the skill library to update the skill library, wherein the second neural network is used to select, from the updated skill library, a skill used to complete the first task, wherein the new skill comprises a new skill neural network having new skill parameters;

training, based on a simulated environment corresponding to the first task, the second neural network and the new skill by using a reinforcement learning algorithm, until a second success rate of completing the first task by using the second neural network is greater than or equal to the preset threshold, wherein the training, based on a simulated environment corresponding to the first task, the second neural network and the new skill by using a reinforcement learning algorithm, comprises: when the skill selected by the second neural network from the updated skill library is the new skill, updating, by using a reinforcement learning algorithm, the new skill parameters of the new skill neural network according to the obtained data for executing the first task; and storing the trained second neural network and the updated skill library, wherein the first neural network and the second neural network each comprise an input layer, a pooling layer, and a neural network layer.

12. The server according to claim 11, wherein the training, based on a simulated environment corresponding to the first task, the second neural network by using a reinforcement learning algorithm comprises:

inputting environment status information into the second neural network, to obtain a skill selected by using the second neural network, wherein the environment status information comprises status information of an intelligent device and information about a surrounding environment of the intelligent device in the simulated environment corresponding to the first task;

obtaining a control instruction by using the skill selected by using the second neural network, to control the intelligent device to execute the first task, and obtaining data for executing the first task by the intelligent device; and updating, based on the obtained data for executing the first task by the intelligent device, parameters of the second neural network by using the reinforcement learning algorithm.

13. The server according to claim 12, wherein the updating parameters of the second neural network by using the reinforcement learning algorithm comprises:

updating the parameters of the second neural network by using a first reinforcement learning algorithm, wherein the first reinforcement learning algorithm is one of a proximal policy optimization (PPO) algorithm, a trust region policy optimization (TRPO) algorithm, and a temporal-difference (TD) algorithm.

14. The server according to claim 11, wherein the updating the new skill parameters of the new skill neural network by using the reinforcement learning algorithm comprises:

updating the new skill parameters by using a second reinforcement learning algorithm, wherein the second reinforcement learning algorithm is one of a deep deterministic policy gradient DDPG algorithm, a deep Q-network DQN algorithm, a PPO algorithm, and a soft actor-critic SAC algorithm.

15. The server according to claim 11, wherein the method further comprises:

initializing a parameter of the second neural network by using a parameter of the first neural network, wherein the first neural network is obtained by performing, based on a simulated environment corresponding to a second task, training by using a reinforcement learning algorithm, and semantic information of the second task is similar to semantic information of the first task.

16. The server according to claim 11, wherein the first neural network and the skill library are obtained by performing, based on a simulated environment corresponding to a second task, training by using a reinforcement learning algorithm, and semantic information of the second task is similar to semantic information of the first task; and the method further comprises:

determining, when the first success rate is greater than or equal to the preset threshold, the first neural network as a neural network used to complete the first task; and storing the first neural network and the skill library.

17. The server according to claim 11, wherein the obtaining a first success rate of completing a first task by using a first neural network comprises:

inputting the environment status information into the first neural network to obtain a skill selected by using the first neural network, wherein the environment status information comprises the status information of the intelligent device and the information about the surrounding environment of the intelligent device in the simulated environment corresponding to the first task;

obtaining a control instruction by using the skill selected by using the first neural network, to control the intelligent device to execute the first task;

repeating the foregoing steps until a quantity of times the first task is completed by using the first neural network reaches a first quantity of times;

counting a quantity of times a result of completing the first task is a success in the first quantity of times, to obtain a second quantity of times; and calculating the first success rate based on the first quantity of times and the second quantity of times.

18. The server according to claim 11, wherein the obtaining a first success rate of completing a first task by using a first neural network comprises:

obtaining semantic information of the first task, and obtaining semantic information of a second task, wherein the semantic information of the second task is similar to the semantic information of the first task, and the first neural network is obtained by performing, based on a simulated environment corresponding to the second task, training by using a reinforcement learning algorithm; and obtaining the first success rate based on a similarity between the semantic information of the first task and the semantic information of the second task, wherein a higher similarity indicates a higher first success rate.

* * * * *